(12) United States Patent
Marder-Eppstein et al.

(10) Patent No.: US 11,457,578 B2
(45) Date of Patent: Oct. 4, 2022

(54) GROW SYSTEM

(71) Applicant: Hippo Harvest Inc., San Francisco, CA (US)

(72) Inventors: Eitan Marder-Eppstein, San Francisco, CA (US); Wim Meeussen, Redwood City, CA (US); Alexander Boenig, San Mateo, CA (US)

(73) Assignee: Hippo Harvest Inc., San Francisco, CA (US)

( * ) Notice: Subject to any disclaimer, the term of this patent is extended or adjusted under 35 U.S.C. 154(b) by 0 days.

(21) Appl. No.: 17/182,222

(22) Filed: Feb. 22, 2021

(65) Prior Publication Data

US 2021/0259160 A1   Aug. 26, 2021

Related U.S. Application Data

(60) Provisional application No. 62/979,364, filed on Feb. 20, 2020.

(51) Int. Cl.
*A01G 31/00* (2018.01)
*A01G 31/02* (2006.01)
(Continued)

(52) U.S. Cl.
CPC ............. *A01G 31/047* (2013.01); *A01G 7/02* (2013.01); *A01G 7/045* (2013.01); *A01G 9/0299* (2018.02); *A01G 9/18* (2013.01); *A01G 9/24* (2013.01); *A01G 9/246* (2013.01); *A01G 9/247* (2013.01); *A01G 9/26* (2013.01); *A01G 25/09* (2013.01); *A01G 25/16* (2013.01); *A01G 27/00* (2013.01); *A01G 27/001* (2013.01); *A01G 27/003* (2013.01);
*A01G 27/008* (2013.01); *A01G 31/02* (2013.01); *A01M 7/0089* (2013.01); *B25J 11/00* (2013.01); *B60P 3/30* (2013.01); *G05B 19/042* (2013.01); *G05D 1/0214* (2013.01); *G06F 16/25* (2019.01); *G06Q 10/06315* (2013.01); *G06Q 50/02* (2013.01); *A01M 7/0025* (2013.01);
(Continued)

(58) Field of Classification Search
CPC ...... A01G 9/0299; A01G 27/00; A01G 31/00; A01G 31/02
See application file for complete search history.

(56) References Cited

U.S. PATENT DOCUMENTS

2018/0365137 A1* 12/2018 Millar ..................... G06F 8/31
2018/0368344 A1* 12/2018 Marshall ................ A01G 31/02
(Continued)

FOREIGN PATENT DOCUMENTS

WO   WO-2019222860 A1 * 11/2019 ............ B25J 9/0084

*Primary Examiner* — Kristen C Hayes
(74) *Attorney, Agent, or Firm* — Kwan & Olynick LLP

(57) ABSTRACT

A grow system. The system includes growing plants in grow modules that are individually moveable. The plants grow in trays where roots never touch the water supply. The plumbing to the grow modules is a low flow, one way flow continual drip system that is hands free. A mobile robot can navigate around a growspace, bring any grow module from one location to another, and perform growspace operations. The growspace is a control space with data source zones and a control space manager. The control space manager can collect data and control different variables across different data source zones in order to determine optimal policies and conditions for data source growth and generation.

20 Claims, 39 Drawing Sheets

(51) Int. Cl.
*A01G 31/04* (2006.01)
*G06F 16/25* (2019.01)
*A01G 7/02* (2006.01)
*A01G 7/04* (2006.01)
*A01G 9/18* (2006.01)
*A01G 9/24* (2006.01)
*G05B 19/042* (2006.01)
*G06Q 10/06* (2012.01)
*G06Q 50/02* (2012.01)
*A01G 27/00* (2006.01)
*A01G 9/029* (2018.01)
*A01G 9/26* (2006.01)
*A01G 25/09* (2006.01)
*A01G 25/16* (2006.01)
*A01M 7/00* (2006.01)
*B60P 3/30* (2006.01)
*G05D 1/02* (2020.01)
*B25J 11/00* (2006.01)

(52) U.S. Cl.
CPC .............. *G05B 2219/23133* (2013.01); *G05D 2201/0201* (2013.01)

(56) References Cited

U.S. PATENT DOCUMENTS

2021/0127594 A1* 5/2021 Millar .................... H05B 45/22
2021/0137028 A1* 5/2021 Zelkind ................. G06N 20/00

* cited by examiner

GROW SYSTEM

CROSS-REFERENCE TO RELATED APPLICATIONS

This application claims priority to Provisional U.S. Patent Application No. 62/979,364, titled "Growspace Operating System," filed on Feb. 20, 2020, by Eitan Marder-Eppstein et al., which is incorporated herein by reference in its entirety and for all purposes.

TECHNICAL FIELD

The present disclosure relates generally to agriculture, and more specifically to hydroponic farming systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions.

Operating a hydroponic growspace today comes with a number of challenges that place significant burdens on farmers and leads to increased costs and/or inefficient food production. For example, current hydroponic systems have high manual labor costs for maintenance of crops. If farmers want to reduce labor costs, they can purchase traditional manufacturing equipment, which is very expensive. In addition, current hydroponic systems produce a lot of waste and have pest management problems. Last, current hydroponic systems do not have the ability to easily evolve because obtaining granular data can be taxing on farmers.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a system. The system comprises a grow module, a plumbing infrastructure, a grow space, and a mobile robot. The plumbing infrastructure includes a global water source and a water transport mechanism. The grow space includes one or more variable controllers configured for adjusting one or more variables in the grow space. The grow space also includes one or more sensors for gathering data. The grow space also includes a data source zone configured to house the grow module. The grow space also includes a grow space manager. The grow space manager includes a variability generator configured for determining degrees of adjustment to the one or more variables for the data source zone. The grow space manager also includes a data aggregator configured to collect or store data gathered from the one or more sensors. The mobile robot is configured to perform transport or task automation within the grow space. The mobile robot includes one or more sensors, a mobility mechanism, a processor, and memory.

Another aspect of the present disclosure relates to a system. The system comprises a grow module. The grow module includes a growing tray, a nutrient water source, a buffer mat, a membrane, a top cover, a separation mechanism configured to provide an air gap between the top cover and the membrane, and a grow medium.

Yet another aspect of the present disclosure relates to a plumbing system. The system comprises a global water source, a one way water transport mechanism, a growing tray, and a local buffer. The local buffer is configured to create a local water source to be used by the growing tray. The local water source is decoupled from the global water source such that cross-contamination of water from the local water source and the global water source is prevented. The local buffer is further configured to continuously provide water to the growing tray on demand without the need for filtering or dumping of used or excess water.

Yet another aspect of the present disclosure relates to a growspace automation system. The system comprises a growspace and a mobile robot. The growspace includes one or more localization structures. The mobile robot includes one or more sensors, a mobility mechanism, a processor, memory; and a plurality of mobility modules. The plurality of mobility modules includes a localization module, a path planning module, and a motion control module.

Yet another aspect of the present disclosure relates to a control space operating system. The system comprises a control space and a control space manager. The control space includes one or more variable controllers configured for adjusting one or more variables in the control space. The control space also includes one or more sensors for gathering data. Last, the control space further includes one or more data source zones. Each data source zone is configured to house a data source. The control space manager includes a variability generator configured for determining degrees of adjustment to the one or more variables across different data source zones or for each data source zone. The control space manager also includes a policy implementer configured for determining an optimal policy for a specified criteria. Last, the control space manager further includes a data aggregator configured to collect or store data gathered from the one or more sensors.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
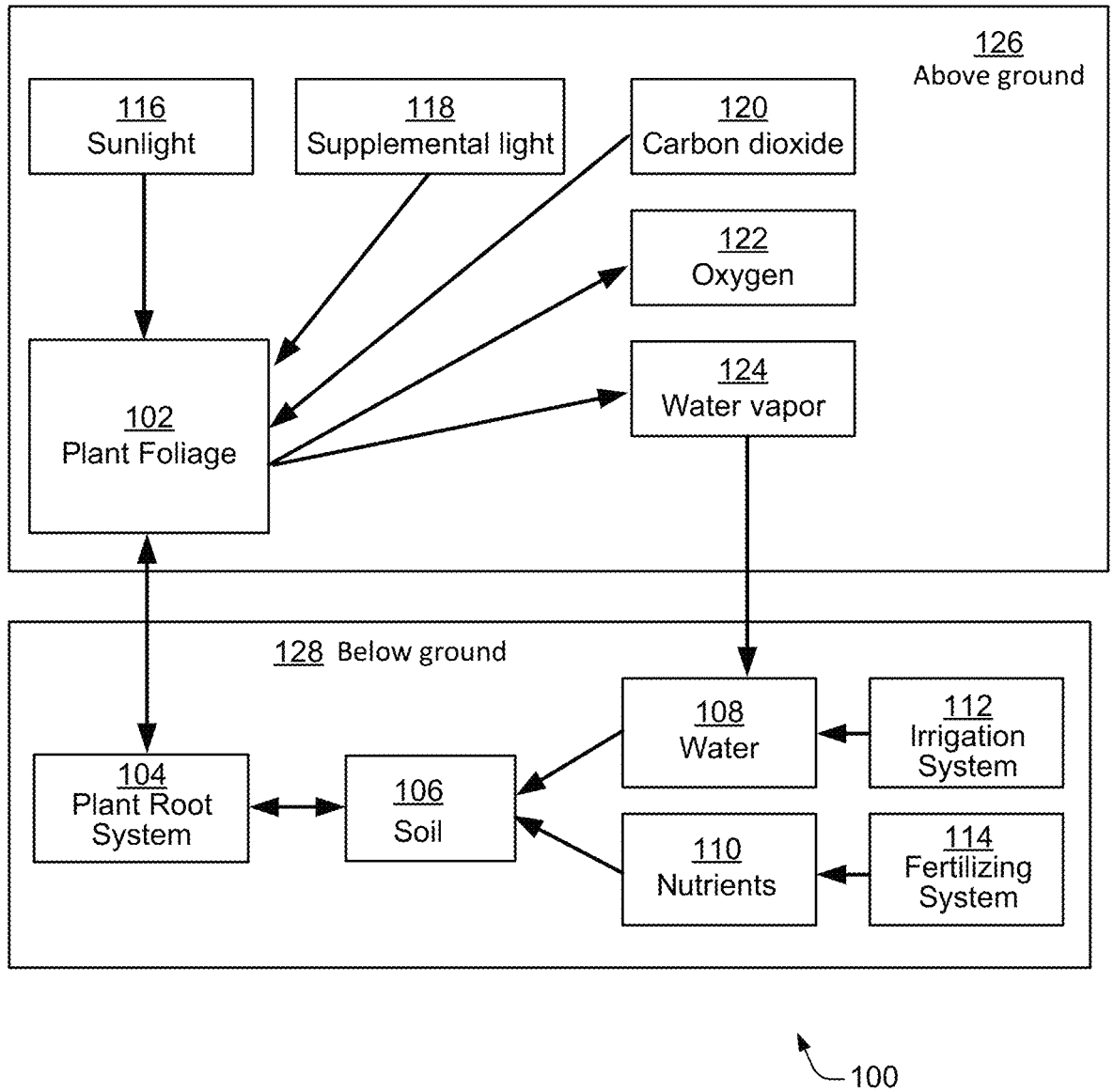
FIG. 1 illustrates a simple diagram showing one example of a typical plant growing cycle, in accordance with embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular hydroponic grow systems. However, it should be noted that the techniques of the present disclosure apply to a wide variety of different grow systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a growing tray in a variety of contexts. However, it will be appreciated that a system can use multiple growing trays while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, plant roots may be connected to nutrient water, but it will be appreciated that a variety of layers, such as grow mediums and buffer mats, may reside between the plant roots and nutrient water. Consequently, a connection does not necessarily mean a direct, unimpeded connection unless otherwise noted.

EXAMPLE EMBODIMENTS

As mentioned above, current hydroponic systems have many drawbacks. For example, current hydroponic growing methods are inflexible and tightly coupled to the greenhouse infrastructure. Plants either sit stationary for the duration of their growth cycle or are transported in linear fashion on long conveyors with no ability to access plants anywhere but the beginning or end of a run. This limits current operators from changing the grow climate during different stages of a crop's production, from treating pests in a more targeted/direct fashion at the per plant level instead of spraying, and from leveraging capitally expensive fixed infrastructure (e.g. LED grow lights) as effectively as possible.

Another problem is that current hydroponic growing methods suffer from continuously degrading nutrient levels in the water, because plants take up nutrients as they grow. This creates two problems: (i) nutrient levels need to be continuously monitored and resupplied, and (ii) after some period of time water needs to get dumped and/or filtered with a reverse osmosis (RO) filter, both of which result in significant waste water. Recirculating hydroponic systems become unbalanced in their nutrient composition as plants take up more of some elements (e.g. Nitrogen, Potassium, Calcium, etc.) vs others. In addition, current hydroponic systems have salts build up in them over time that must be managed. As this happens, farmers must remove salts from the system in order to maintain balance which they often do through reverse osmosis filtration. As part of this, water with high salinity is dumped as a bi-product of reverse osmosis which can be harmful to the local watershed.

Yet another drawback is that current hydroponic growing methods operate with lower than desired oxygen saturation levels in the water supply and often use active aeration via air-stones, spray nozzles, high flow rates, or other methods to provide water rich in oxygen to plants.

Yet another drawback is the management and suppression of pests and disease. Managing pests is a large part of running a growspace where preventative measures are always best. In addition, immediate reaction and response times can often be crucial. Rodents, aphids, mites, molds, etc. can present major problems in growspace settings if they cannot be kept in check. In addition, recirculating water systems are an easy mode of transmission for disease, which can spread extremely quickly in these environments. Growspaces (and hydroponic operations generally, including warehouse systems) are constantly concerned with pathogens in their water supply because entire crops can be lost to disease because many current systems use grow tubs that sit on the ground, making them easy targets for these types of pests.

Another drawback can be capital expenditure. If growspaces want to reduce labor costs, they can look into automation. However, with current technology, automation to reduce labor costs is inflexible and capital intensive. Those growspaces that are automated use traditional process manufacturing techniques, e.g., conveyor belts, cart+rail, or raft systems that are expensive to install, crop specific (e.g. only work with lettuce or tomatoes, not both), and extremely difficult to reconfigure/move once put in place.

Yet another drawback is the lack of data. Getting good, granular data on crop production can be hard. Growspace farmers today struggle to answer questions like "How much labor went into this unit of produce (e.g. head of lettuce, single tomato, etc.)?", "What operations were applied to it and when? (e.g. pest control, pruning, transplanting)", "What is the unit cost of production for the produce we grow?" Traditional methods of tracking labor/materials often rely on immediate data entry that is challenging for farmers that are out in the field, wearing gloves, around lots of water, and unable to regularly interact with electronic devices like phones or computers while working.

The lack of data is often compounded by the slow rate of learning. Experimentation cycles are slow. When farmers want to experiment to improve production in growspaces today they are limited by their fixed infrastructure. Process improvements, tweaks to growing methods, and modifications to growing hardware are often impossible or prohibitively expensive because they imply retooling of the entire growspace. Often, farmers will wait until they build a new growspace to make changes based on learnings from their last operation which leads to improvement cycles that take years.

Last, one other major drawback with current hydroponic systems is the inability to support diversification. Growspaces that have automation built into them are only capable of growing a small set of crops (often just one) that are aligned with the tooling they have. If a growspace growing lettuce loses a major customer, but finds a replacement that wants tomatoes instead, there is no easy way to switch. The cost of retooling and effort of reconfiguring a growspace prevents growers from making that kind of change. In addition, farmers cannot grow multiple crops or change what they grow based on the time of year or market patterns without changing automation systems. (e.g. Farmers cannot ramp up tomato production in the winter, but then swap it out for lettuce in the summer as field tomatoes flood the market).

The systems and techniques disclosed herein may help to address the above mentioned issues by providing a novel grow system that can be vertically integrated with a low flow plumbing system, robotic transport, centralized processing of produce, and scheduling/monitoring/tracking software. In addition, the systems and techniques disclosed herein provide many advantages over current hydroponic systems. According to various embodiments, the commercial grow methods and systems presented herein provide flexible systems for plant growth where plants can be accessed randomly, moved to different locations/climates within the grow space, and easily taken in and out of fixed infrastructure like plumbing. According to various embodiments, the commercial growing methods and systems presented herein provide a one-way nutrient supply to plants in parallel, resulting strong guarantees about water composition/quality in its recirculating system. This simplifies nutrient management and avoids the need for dumping and/or filtering of water. According to various embodiments, the commercial growing methods and systems presented herein always provide maximum oxygen saturation in the water. At the same time, the growing methods and systems provided herein avoid the need for active aeration while still providing plants with oxygen rich water. This means the disclosed methods and systems have higher dissolved oxygen content in the water at the root zone, promoting better plant growth, given the high volume to surface area ratio for water as compared to grow tubs. In some embodiments, the grow modules disclosed are built on tables that are lifted off the ground, with cones on the legs to protect against rodents.

The systems and techniques disclosed herein provide many advantages over current hydroponic systems on a more macro level as well. For example, in some embodiments, the disclosed automation systems are modular, requiring less up-front capital investment and allowing for gradual expansion of a grow operation. In some embodiments, the automation systems disclosed are decoupled from the crops being grown, which means that the techniques and systems work across many different crop types (e.g. lettuce, tomatoes, strawberries, etc.). In some embodiments, the grow systems are easily integrated into a mobile system, e.g., having supporting structures and lift alignments to allow automated transport using mobile robots instead of conveyors, which eliminates the need for reconfiguring conveyors. In some embodiments, the grow system uses growing trays that allow for random access to plants. By contrast, current conveyor and raft systems only allow farmers to access plants that are at the beginning or end of the conveyor or raft system. In such current systems, if anything happens (e.g., disease) to plants in the middle, it is very difficult for growers to take action or even identify that the problem exists using traditional automation processes.

According to various embodiments, the grow systems comprise a number of distinct components/modules/subsystems that operate together. However, it should be noted that techniques of the present disclosure do not require all components/modules/subsystems described. For example, in some embodiments, a grow system according to the present disclosure can include a single component or subsystem or any combination of the different components and subsystems described herein. The different components/modules/subsystems are described in detail below.

FIG. 1 illustrates a simple diagram showing one example of a typical plant growing cycle, in accordance with embodiments of the present disclosure. In FIG. 1, a typical plant growing cycle 100 includes a plant root system 104 that is anchored in soil 106 to provide stability to plant foliage 102. Plant root system 104 absorbs both water 108 and nutrients 110 from soil 106, and disposes of any plant waste products into soil 106. Water 108 is provided by precipitation from the atmosphere, by an irrigation system 112, or by a combination of both. Nutrients 110 can be present in soil 106, or be added by a fertilizing system 114. Plant foliage 102 absorbs carbon dioxide 120 from the atmosphere, which is either naturally present or artificially added, and releases oxygen 122 into the atmosphere. In addition, plant foliage 102 evaporates water 108 into the atmosphere. The main energy source for plants is either sunlight 116, supplemental light 118, or a combination of both. Plant root system 104, soil 106, water 108, nutrients 110, irrigation system 112, and fertigation system 114 typically occur below ground 128. Plant foliage 102, sunlight 116, supplemental light 118, carbon dioxide 120, oxygen 122, and water vapor 124 are typically present above ground 126.

According to various embodiments, the commercial growing method described herein is hydroponic. In some embodiments, there is no soil in the system and plants receive sustenance from nutrient rich water that is delivered to their roots via the low flow plumbing system. In some embodiments, plants are grown together in individual grow modules that are replicated across the farm and operate on the principles described herein.

Figure 2:
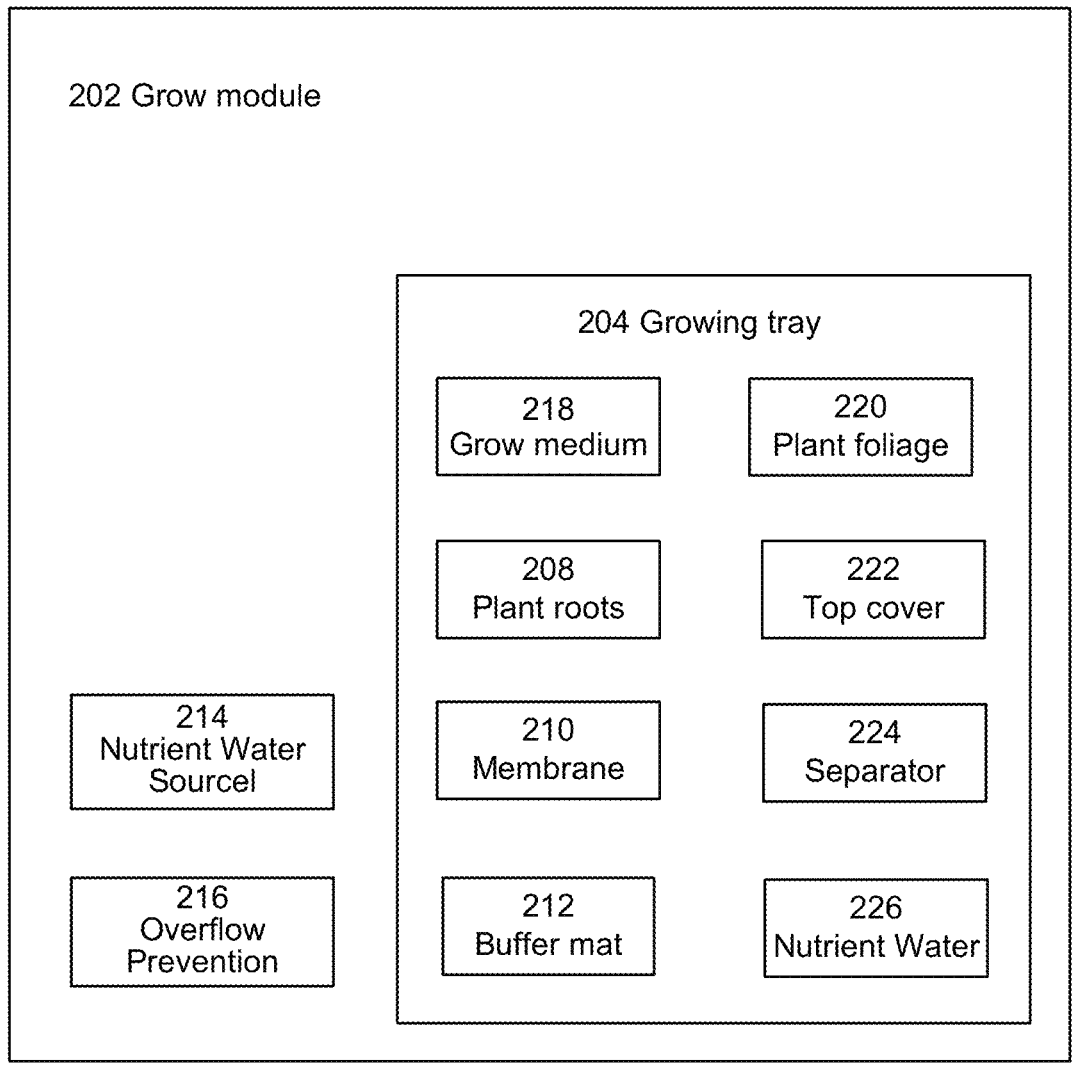
FIG. 2 illustrates a block diagram showing one example of a commercial grow system, in accordance with embodiments of the present disclosure.

FIG. 2 illustrates a block diagram showing one example of a commercial grow system, in accordance with embodiments of the present disclosure. Grow system 200 includes one or more grow modules 202. Each grow module 202 comprises a growing tray (or grow tray) 204, which contains a buffer mat 212, a membrane 210, a top cover 222, separator 224, nutrient water 226, grow medium 218, plant foliage 220, and plant roots 208. Growing tray 204 is connected to a water inflow channel 214 and/or an overflow prevention system 216. In some embodiments, grow medium 218, such as a grow plug, provides the structure for both the plant roots 208 and the plant foliage 220. There are also multiple configurations of these components that can be used in production systems where the water inflow channel 214 and water outflow channel 214 placement can adjust based on the needs of a broader plumbing system, or be removed entirely to reduce overall system maintenance and complexity.

Figure 3:
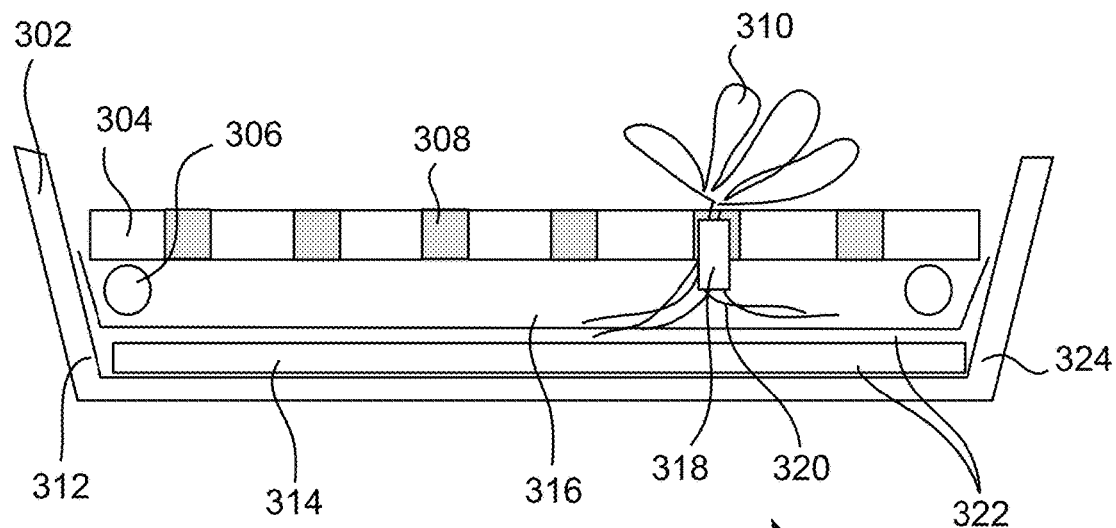
FIG. 3 illustrates an example of a grow module, in accordance with embodiments of the present disclosure.

A specific implementation of grow system 200 described above is shown in FIG. 3. FIG. 3 illustrates an example of a grow module 300, in accordance with embodiments of the present disclosure. Current hydroponic growing methods suffer from continuously degrading nutrient levels in the water, because plants take up nutrients as they grow. This creates two problems: (i) nutrient levels need to be continuously monitored and ressupplied, and (ii) nutrient water needs to continuously flow at a high rate to achieve similar nutrient levels for all plants. The commercial growing method presented herein addresses this problem by supplying a parallel nutrient water supply to all plants, which provides strong guarantees about nutrient composition/quality throughout the system, and which allows decreasing water flow to a slow dripping rate. The parallel nutrient water delivery 322 is achieved through a horizontal movement of nutrient water 322 through buffer mat 314, which is underneath plant roots 320. During this horizontal flow, plant roots 320 do not touch nutrient water 322, allowing it to stay pristine. After the horizontal movement, nutrient water 322 will move up vertically to membrane 316 and plant roots 320. The vertical movement will give each plant in the system its own supply of nutrient water 322, untouched by other plants in the system. The vertical flow also ensures that nutrient water 322 that has come in contact with plant roots 320, will not flow back to buffer mat 314, since it cannot fight the vertical flow of nutrient water 322. The result is that the composition of nutrient water 322 at buffer mat 314 level remains pristine, eliminating the need for fast flow rates and eliminating the need for continuous management of nutrient water 322 composition.

The example method described below addresses the problem of continuously degrading nutrient levels in the nutrient water, the need to continuously monitor and resupply nutrients, the need to dump nutrient water, and the need to filter water with a reverse osmosis (RO) filter. According to various embodiments, the root cause of degrading nutrient levels is the direct contact between plant roots 320 and nutrient water 322. This causes the nutrient levels to become sub-optimal, and causes some elements to build up to higher and higher concentrations in the water, requiring either a water discharge or requiring expensive filtering.

According to various embodiments, plant growth is accelerated by providing plant roots 320 directly with the optimal mixture of nutrients and water, such that the plant never lacks any nutrients, and so the plant needs to spend less energy on root growth as compared to plant growth in traditional soil. To achieve this, a pre-mixed solution of nutrient water 322 is provided to plant roots 320 by a water and nutrient flow through inflow channel 312 into growing tray 302, through buffer mat 314, through membrane 316, and to plant roots 320. It is critical in this system that any nutrient water 322 that comes in contact with plant roots 320 cannot flow back out of growing tray 302, because once plant roots 320 touch the nutrient water, the levels of nutrients in the water are altered, and the nutrient mixture is not optimal anymore.

In some embodiments, the example method described in this section addresses the problem of low dissolved oxygen levels in water, without the need for active aeration systems or precise leveling of grow systems. Reaching saturation levels of oxygen is especially important in warm conditions, when plants need additional oxygen to support their accelerated metabolism. At the same time, warmer water is not able to dissolve as much oxygen as colder water, causing plant stress and reducing growth and resilience to warm weather. In some embodiments, the example growing methods described herein are able to reach saturation levels of oxygen in the water at all times, by creating a large surface area to total volume ratio between nutrient water 322 and the surrounding air. In some embodiments, this is achieved by using a separation mechanism, or separator, such as spacer frame 306, that keeps top cover 304 suspended above membrane 316, ensuring that there is an air-gap between membrane 316 and top cover 304. Spacer frame 306 achieves this by forming a physical barrier between membrane 316 and top cover 304. Spacer frame 306 sits on top of membrane 316, and top cover 304 sits on top of spacer frame 306. Spacer frame 306 only contacts membrane 316 at the outer edges, leaving as much surface as possible open for plant roots 320. In this air gap created by spacer frame 306, plant roots 320 have space to grow, and fresh air coming through plant holes 308 in top cover 304 can reach all plant roots 320 and supply the maximum oxygen for plant growth. The transfer of oxygen to nutrient water 322 is enabled by a very large surface of shallow water that sits in contact with air in plant roots 320 zone. Because membrane 316 prevents plant roots 320 from growing down into nutrient water 322, buffer mat 314 provides nutrient water 322 even in non-level conditions through capillary action, and water outflow channel 324 prevents the water level from rising. Thus, plant roots 320 are not submerged in water, but merely coated in a thin layer of water, thereby creating a large surface area to absorb oxygen from the air.

It is important for plants in hydroponics systems to be physically supported, since plant roots 320 cannot provide the same level of support as for plants grown in soil. Often this is achieved by adding net pots or other additional components to the grow system. However, every component added increases the cost and complexity of the system, and increases maintenance and cleaning overhead. In some embodiments, example grow methods described herein achieves full plant support through a specific organization of the existing module components. Top cover 304, spacer frame 306 and membrane 316 together hold the plant in place throughout the growth cycle and during transport. Top cover 304 makes contact with grow plug 318, because plant holes 308 are only slightly larger than grow plug 318. This contact with top cover 304 provides lateral support to grow plug 318, preventing the plants from sliding sideways. In addition, because spacer frame 306 raises the height of top cover 304, top cover 304 contacts grow plug 318 at a higher point, preventing the plant from tipping over. The weight of the plant is supported by membrane 316, because grow plug 318 sits directly on top of membrane 316. This setup also reduces the cost of transplanting the plants into the system at the start of the grow cycle, because the grow plug of each plant can be directly dropped into a hole of top cover 304, without having to first assemble a grow plug and net pot. This saves both on materials and labor for transplanting at the start of the growing cycle. In addition, this design also makes composting grow plugs 318 easier at the end of the grow cycle, because they can simply be lifted out of plant holes 308 in top cover 304, without having to remove the non-compostable net pot.

According to various embodiments, nutrient water 322 contains all nutrients to allow plants to grow, but other undesirable organisms such as algae can also grow in the same nutrient water. Therefore, in some embodiments, it is important to block sunlight as much as possible from directly reaching nutrient water 322. In some embodiments, top cover 304 blocks sunlight from directly reaching membrane 316. To achieve this, top cover 304 is built out of a fully non-transparent material that blocks all visible, infrared and ultraviolet light. The area of top cover 304 is almost identical to the area of growing tray 302, ensuring that the full surface of growing tray 302 is covered. Small alignment gaps between growing tray 302 and top cover 304 are sealed by the edges of membrane 316, because the edges of membrane 316 get trapped in between the edges of growing tray 302 and the edges of top cover 304, thereby creating a light blocking seal on the edges of top cover 304. In some embodiments, to prevent light from reaching membrane 316 near plant holes 308 in top cover 304, top cover 304 has a sufficient thickness, which only leaves a small vertical shaft open between top cover 304 and the grow plugs 318, preventing all light that does not hit the grow tray at a fully vertical angle from reaching membrane 316 below top cover 304.

The techniques and mechanisms described herein rely on grow tray 302 to be leveled very accurately, to ensure that all areas of membrane 316 are in contact with nutrient water 322, while also making sure that no nutrient water 322 is pooling on top of membrane 316. In some embodiments, to avoid having to level grow trays 302 accurately, a special version of buffer mat 314 with water wicking properties through capillary action is used, in combination with a lower overall water level in grow tray 302. In areas where the water level is below membrane 316, which would normally leave membrane 316 dry, the wicking property of buffer mat 314 will move nutrient water 322 upwards to the top of buffer mat 314, making contact with membrane 316 and making membrane 316 wet. In areas where the mis-leveling of grow tray 302 would normally create pooling of nutrient water 322 on top of membrane 316, the lower overall nutrient water 322 level in grow tray 302 prevents the pooling.

Figure 4:
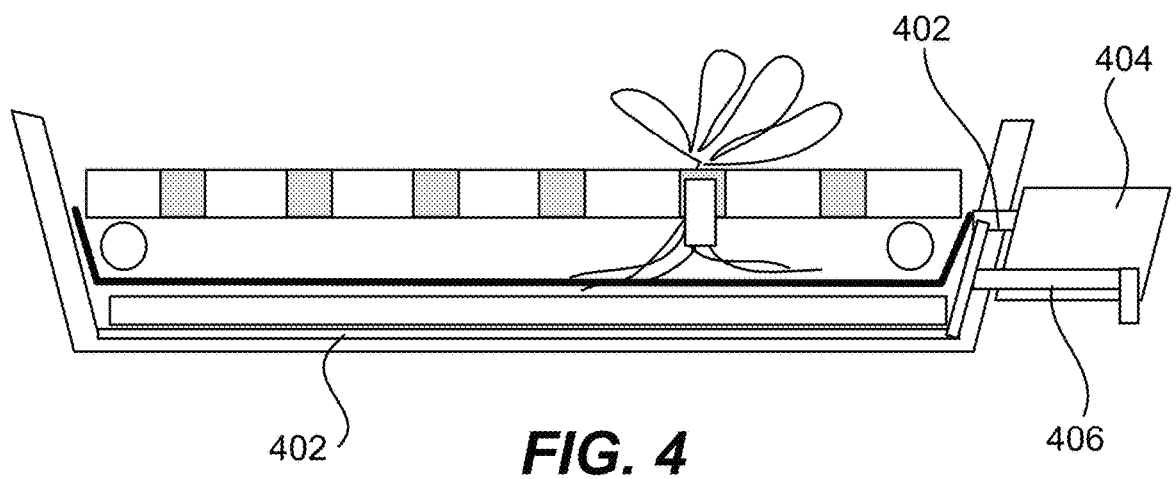
FIG. 4 illustrates an example of a grow module with a plumbing connection and a horizontal outflow channel, in accordance with embodiments of the present disclosure.
Figure 5:
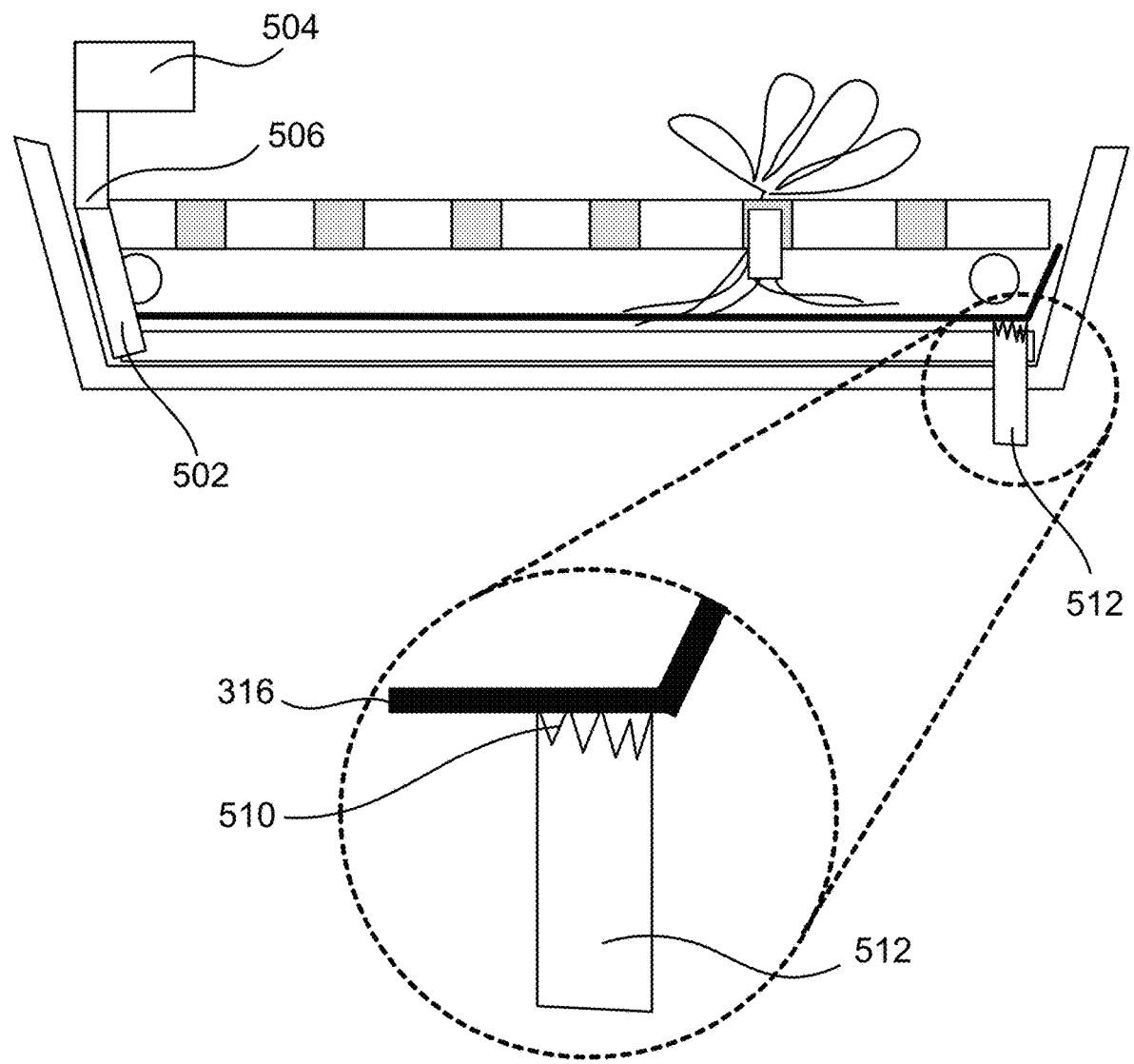
FIG. 5 illustrates an example of a grow module with a plumbing connection and a vertical outflow channel, in accordance with embodiments of the present disclosure.

FIGS. 4 and 5 illustrate examples of a grow module with different plumbing connections. In some embodiments, the grow modules in FIGS. 4 and 5, which incorporate plumbing connection 404 or plumbing connection 504, respectively, allow for variable and actively controlled flow rates of nutrient water 322 into and out of growing tray 302. In these embodiments, nutrient water 322 is channeled into grow tray 302 through a plumbing connection 404 mounted on the outside of grow tray 302, or a plumbing connection 504 mounted on the inside of grow tray 302. If plumbing connection 404 is located on the same side of growing tray 302 as the outflow channel 406, an additional inflow channel 402 is added to ensure that nutrient water 322 is directed to the other side of growing tray 302 and is forced to flow throughout the entire growing tray 302 from the end of inflow channel 402 to outflow channel 406. As nutrient water 322 flows into grow tray 302, it is important that the level of nutrient water 322 remains constant. Therefore, a horizontal outflow channel 406 or vertical outflow channel 512 is added as an implementation of an overflow prevention system 324. The outflow channels work by creating a channel that allows all nutrient water 322 that reaches a level that's higher than the desired level of nutrient water 322 in grow tray 302 to drain out of grow tray 302. It is important to set the height of this outflow channel at the same level as the desired nutrient water 322 level. In FIG. 5, outflow channel 512 is located at the opposite side of where nutrient water 322 flows into grow tray 302 from plumbing connection 504, through inflow angle 506, and into inflow channel 502. Having inflow channel 502 be on the opposite side of outflow channel 512 ensures a one way flow through grow tray 302, which provides all areas of buffer mat 314 with fresh nutrient water 322. Buffer mat 314 allows the grow module to operate without new nutrient water 322 supply for long periods of time which enables grow modules to be mobile and for plumbing to turn on and off without impacting plant health. As such, the system is compatible with a wide range of plumbing (low flow, high flow, and intermittent flow) and transport systems.

According to various embodiments, issues may occur where sediment, root mass on membrane 316, or algae build up causes the system to clog and fail to drain. The vertical overflow prevention system 512 employs flow cutouts 510 in order to avoid this clogging problem. In some embodiments, flow cutouts 510 are introduced into vertical outflow channel 512 directly below membrane 316. In some embodiments, flow cutouts 510 form a set of teeth. The gaps in between the teeth allow nutrient water 322 to flow at all times, even when the top of vertical outflow channel 512 is completely blocked off by sediment or root mass on top of the membrane 316. The tips of the teeth keep membrane 316 pushed up, thereby preventing membrane 316 from blocking the gaps in between the teeth.

Figure 6:
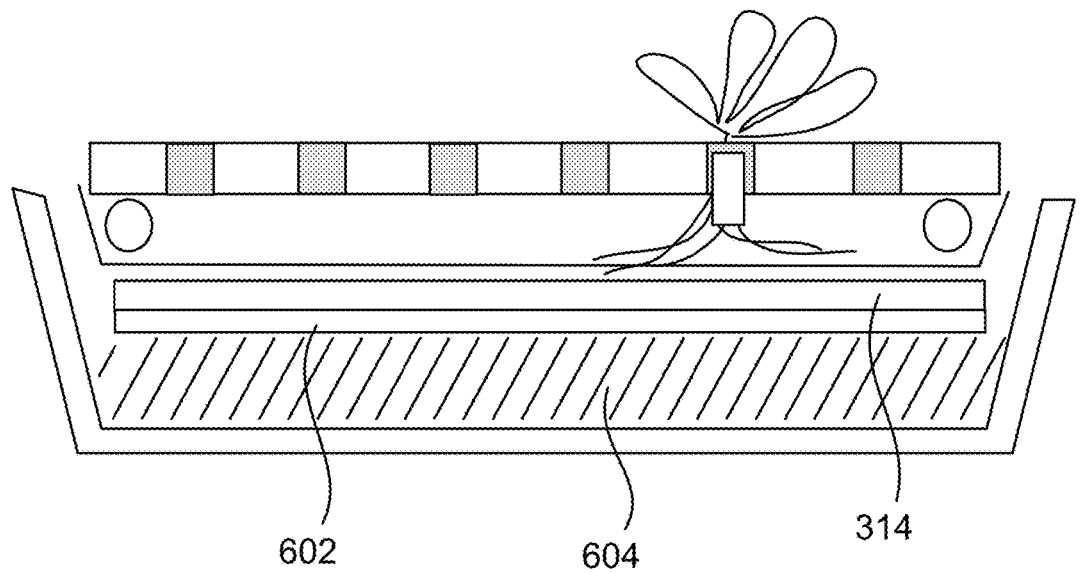
FIG. 6 illustrates an example of a grow module with a floatation layer, in accordance with embodiments of the present disclosure.

According to various embodiments, membrane grow systems use connections to plumbing to create a water flow, which is required to function properly. However, certain embodiments of the present disclosure can even operate without plumbing connections. The example membrane systems presented in FIGS. 6 and 7 can be configured to operate without a continuous flow of nutrient water 322 through grow tray 302. FIG. 6 illustrates an example of a grow module with a floatation layer 602. In FIG. 6, all nutrient water 322 needed for the plant's grow cycle is present inside nutrient solution 604, which is located inside the grow tray from the beginning of the growth cycle. In some embodiments, buffer mat 314 is made to float on top of the body of nutrient solution 604, by either constructing buffer mat 314 of a material that is lighter than water, or by adding an additional layer of material 602 that is lighter than water material underneath buffer mat 314.

Figure 7:
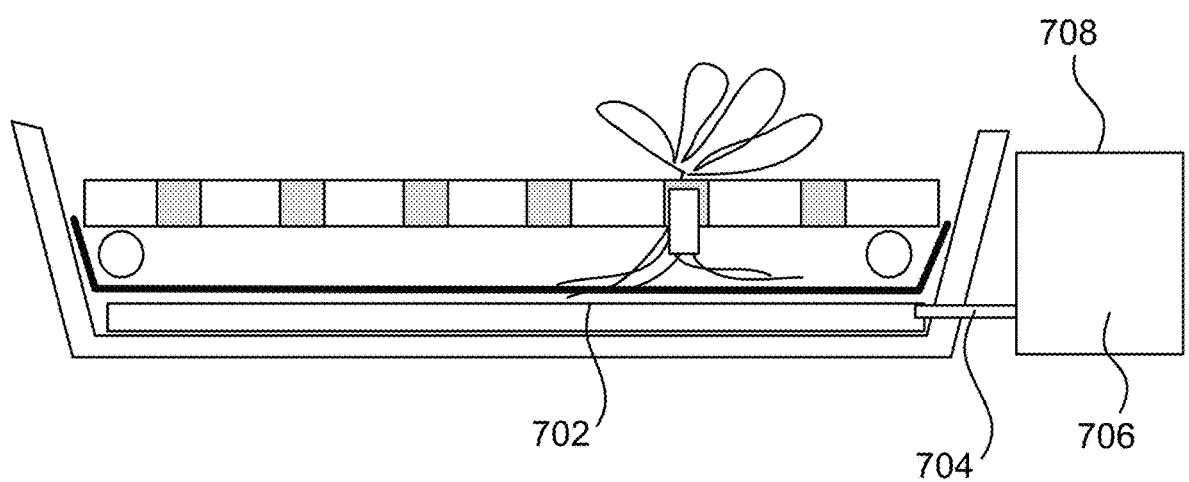
FIG. 7 illustrates an example of a grow module with an airlocked nutrient reservoir, in accordance with embodiments of the present disclosure.

FIG. 7 illustrates an example of a grow module with an airlocked nutrient reservoir 706. As shown in FIG. 7, nutrient reservoir 706 sits next to growing tray 302 and refills grow tray 302 with the same amount of nutrient water 322 as is used by the plants. This exact water flow is achieved by constructing nutrient reservoir 706 in a way that is completely air-tight (except for the inflow channel 704) and by placing an outflow channel of nutrient reservoir 706 at the exact same height as the desired nutrient solution level 702 in the grow tray 302. In some embodiments, the outflow channel is the same as the inflow channel 704. In other embodiments, the grow tray includes a separate outflow channel located at nutrient solution level 702. As long as there is sufficient nutrient water 322 in the grow tray 302, the inflow channel 704 will be submerged in nutrient water 322, which prevents air from entering the inflow channel 704, which in turn prevents nutrient water 322 from flowing out of nutrient reservoir 706. When the level of nutrient water 322 drops below the desired nutrient solution level 702, air will enter inflow channel 704, allowing additional nutrient water 322 to flow from nutrient reservoir 706 into grow tray 302, until nutrient solution level 702 is back at its desired level.

Figure 8:
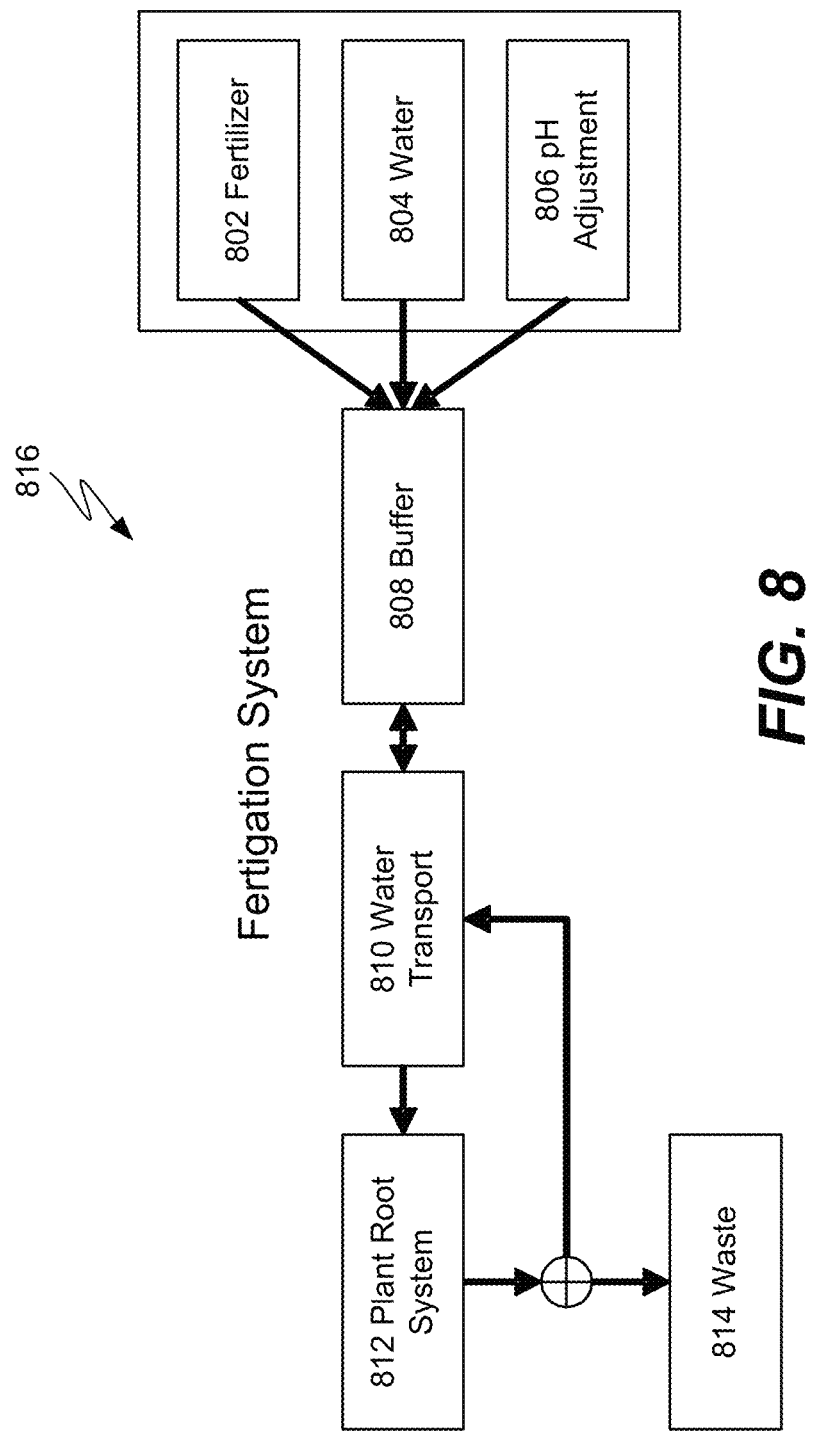
FIG. 8 illustrates a simple diagram showing one example of a typical plumbing system for hydroponic farms, in accordance with embodiments of the present disclosure.

FIG. 8 describes a typical plumbing system for hydroponic farms where fertilizer 872, water 874, and pH adjustment 876 are combined via a fertigation system 816 to make nutrient water which is stored in a buffer 878 and sent to plant root system 812 via water transport 810. Nutrient water that is not immediately taken up by plants is then either disposed of as waste 814 or returned to buffer 878 via water transport 810. Scaled versions of such systems deployed throughout the hydroponic industry require that water transport 810 be able to accommodate large flows/volumes of water and are most commonly built with large volume pipes that offer little flexibility and are costly to install and maintain. Furthermore, these systems require continuous filtration and/or dumping of nutrient water in their water transport system to avoid salt build up that occurs over time. Some systems do avoid dumping by allowing water to runoff from the system, though for the purposes of this disclosure, that is considered a form of dumping.

Figure 9:
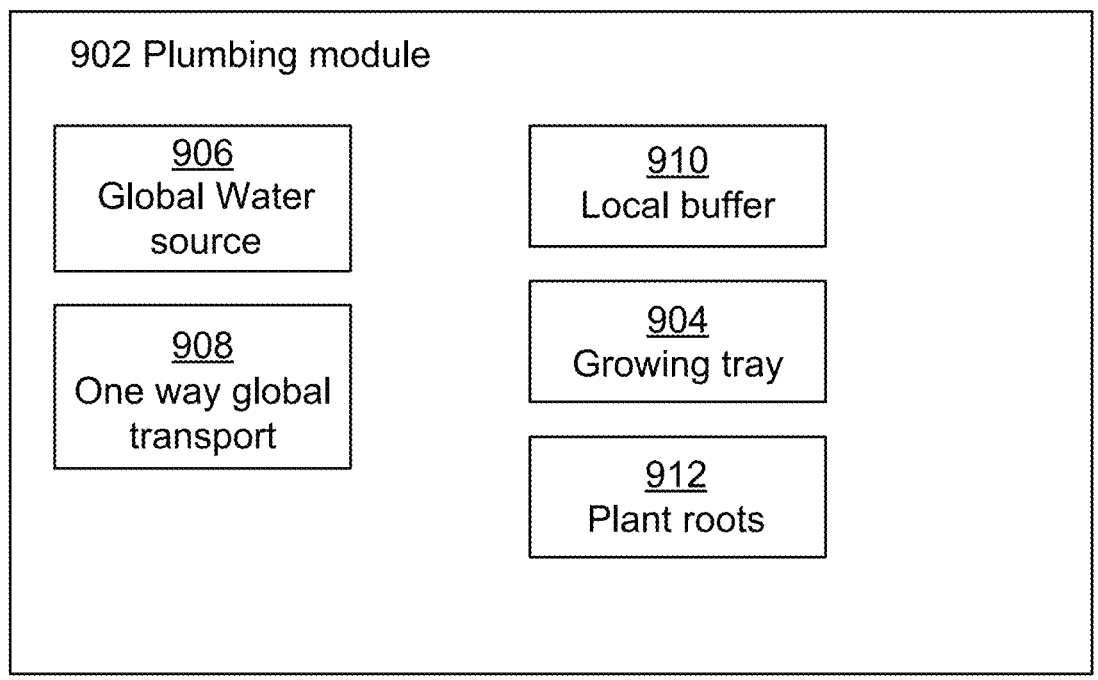
FIG. 9 illustrates a block diagram showing one example of a plumbing module, in accordance with embodiments of the present disclosure.

FIG. 9 describes a plumbing module 902 that allows for cheaper, more flexible, infrastructure as it reduces the volume of water that must be moved at any given time through a growspace. In some embodiments, this system replaces growspace wide transport of nutrient water with a two tiered approach, relying on low flow global transport coupled with local buffering. In the system, global water source 906 sends nutrient water to a local buffer 910 for use in one or more growing trays 904 located throughout the growspace. Local buffer 910 provides water to plant roots 912 which take up some nutrient water and leave the rest in local buffer 910.

In some embodiments, decoupling global transport 908 from local buffering 910 in this way allows for nutrient water to be provided to plant roots 912 independent of global flow rates and is the mechanism by which low flow requirements are achieved and also isolates global water source 906 from any contamination from local buffers 910, thereby removing the need to filter or dump water as in conventional systems. According to various embodiments, global transport 908 need only provide nutrient water to local buffer 910 or to a select number of growing trays 904 at a time, meaning global transport 908 can be sized based on the flow requirements of a single or small group of growing trays 904 and not the entire growspace.

Figure 10:
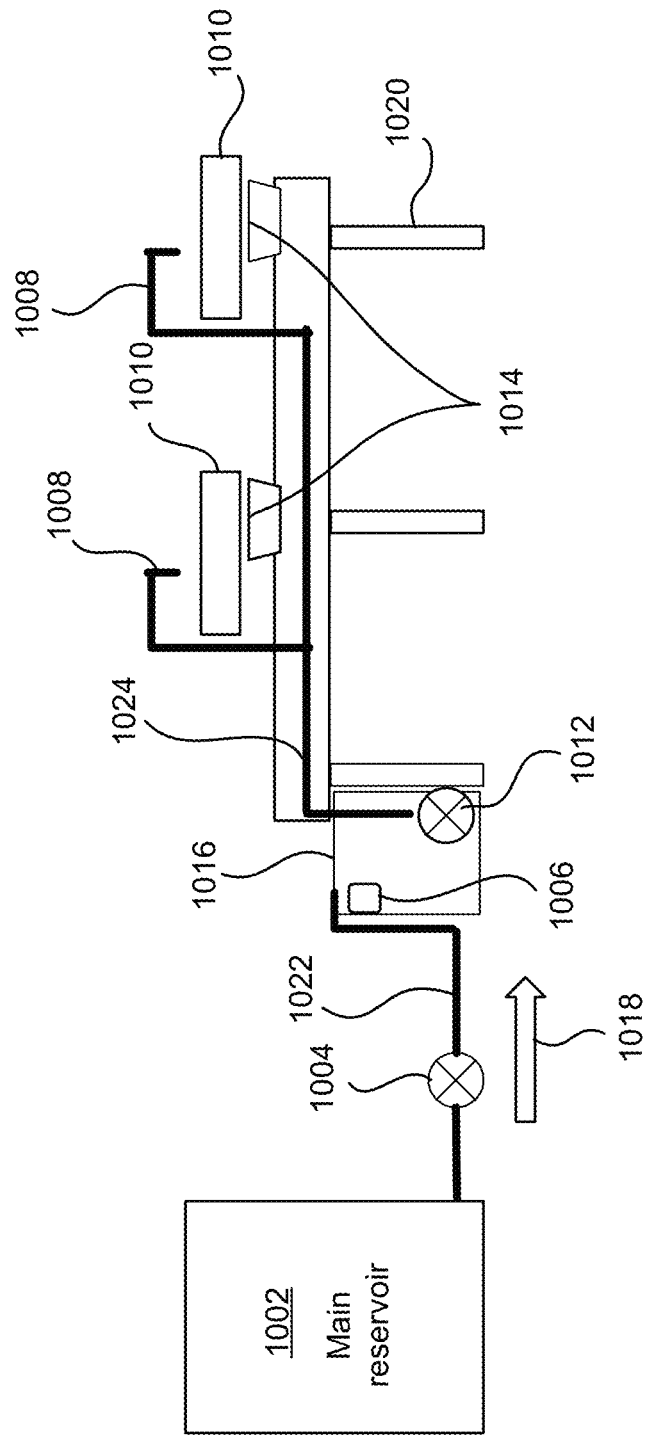
FIG. 10 illustrates an example of a plumbing system, in accordance with embodiments of the present disclosure.

A specific implementation of this system is shown in FIG. 10. In FIG. 10, main reservoir 1002 moves nutrient water to a group of growing trays located at a single dock 1020. Nutrient water flows to a dock reservoir 1016 via a supply pump 1004 and global plumbing 1022 when requested by a float valve 1006 which monitors local water levels. From there, dock circulation pump 1012 sends nutrient water through local plumbing 1024 to drippers 1008 that feed into growing trays 1010, which hold plants. Some nutrient water is taken up by the plants and the rest flows out of growing trays 1010 through drains 1014 that lead back to local plumbing 1024 where the water returns to dock reservoir 1016 for recirculation.

The low flow requirements of this system allow for cheap, low power, pumps to be used for supply pumps 1004 and dock circulation pumps 1012. It also allows for inexpensive irrigation tubing to be used for both global plumbing 1022 and local plumbing 1024, reducing cost and complexity relative to traditional systems. Finally, this system guarantees a one way flow direction 1018 between the main reservoirs 1002 and dock reservoirs 1016 which simplifies global plumbing 1022 further as there is no need for water to return to the main reservoir 1002 once it is sent out. Together, these changes represent significant improvements relative to typical hydroponic systems in cost and complexity of deployment.

Hydroponic plumbing systems today are limited in their ability to deliver nutrients to plants in a targeted fashion. With current systems, every plant on a given plumbing run, often sized to the entire growspace, will receive the same composition of nutrients. In practice, this means that growers are unable to deliver nutrients optimally to plants based on their stage of life, subspecies, or species (e.g. lettuce vs tomatoes). They are forced instead to pick nutrient compositions that strike a balance between all the plants in their growspace impacting the performance of their systems. However, not having these restrictions would be extremely advantageous to growers looking to gain advantages in growth. Changing nutrient compositions based on stage of life can lead to a more optimal formulation for a plant based on that specific stage. Changing compositions based on subspecies can allow for multiple types of a crop to be grown optimally in parallel in one growspace. Changing composition based on species type can even allow for crops like lettuce and tomatoes, which require drastically different nutrient mixes, to be grown in parallel.

Figure 11:
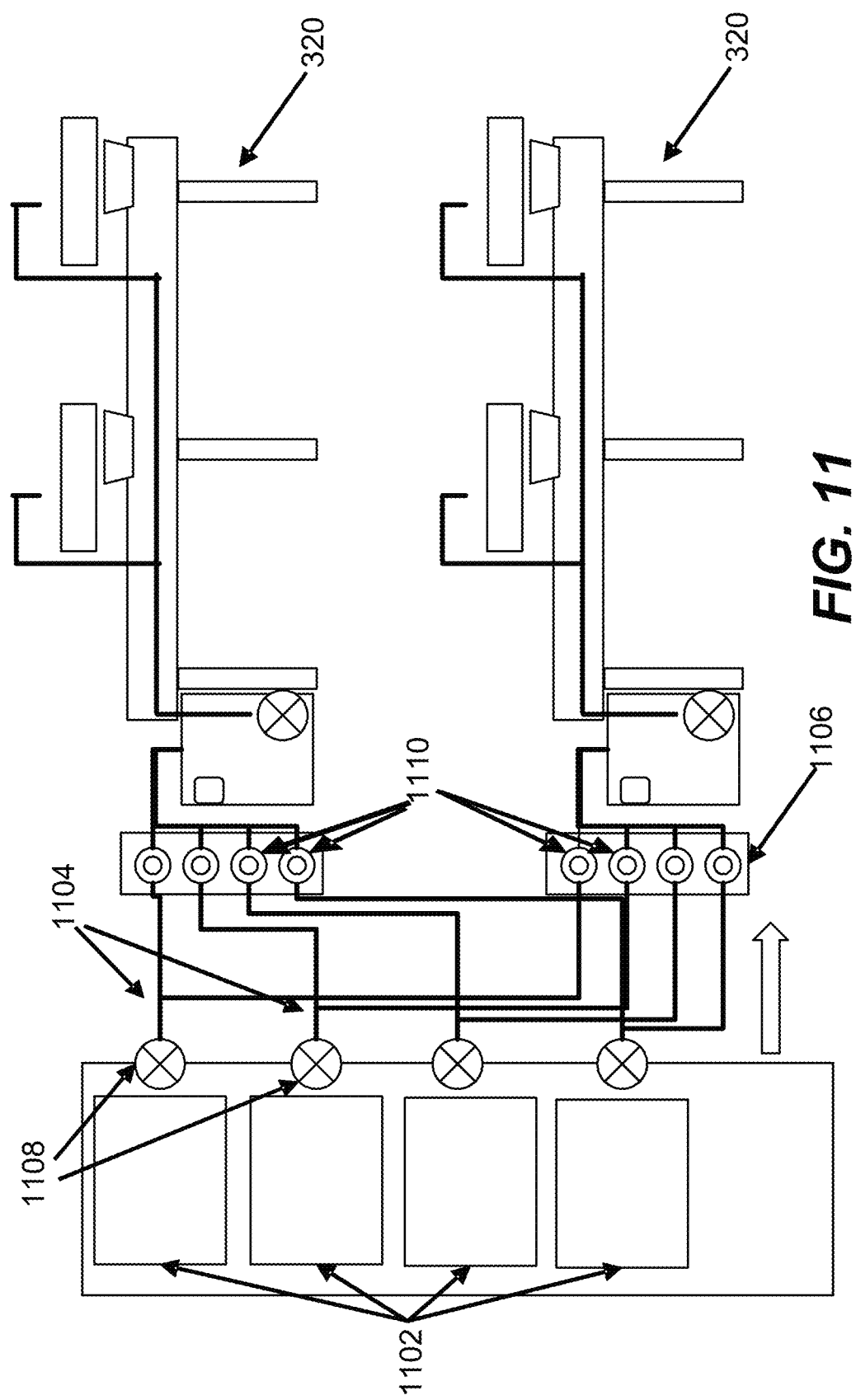
FIG. 11 illustrates an example of a plumbing system with multiple nutrient reservoirs, in accordance with embodiments of the present disclosure.

FIG. 11 presents a system configuration that replaces a single main reservoir 1002 with multiple nutrient reservoirs 1102, each capable of holding nutrient water with a unique composition. Nutrient pumps 1108 send nutrient water from each nutrient reservoir 1102 through a dedicated nutrient plumbing line 1104. Dock nutrient selector 1106 is then used to select which nutrient water to take into a given dock 1020, which follows the same local recirculation pathway outlined in FIG. 10 above. Dock nutrient selector 1106 is composed of solenoid valves 1110 for each plumbing line run that is controlled by a computer remotely to allow water flow into dock 1020 from a selected nutrient plumbing 1104 line. Each solenoid valve uses electro-magnatism to open or close based on the current that it receives. This means that they can be electrically controlled via a computer. This configuration allows each dock 1020 to select between a predetermined number of nutrient solutions based on stage of growth, plant subspecies, or other factors, as the cost of running additional nutrient plumbing lines is relatively low given the low flow requirements of transport to the docks.

The example system presented in FIG. 11 above limits the number of different nutrient water compositions that can be distributed at one time to the number of nutrient reservoirs in the system and also requires a solenoid valve be present at each dock 1020 for each unique nutrient mix supplied to the system. This is sufficient to cover a wide range of nutrient requirements, but for growspaces that require even more flexibility it is desirable to create nutrient mixes on demand. It may also be desirable to reduce the cost and complexity of the system by reducing the number of solenoid valves required in construction.

Figure 12:
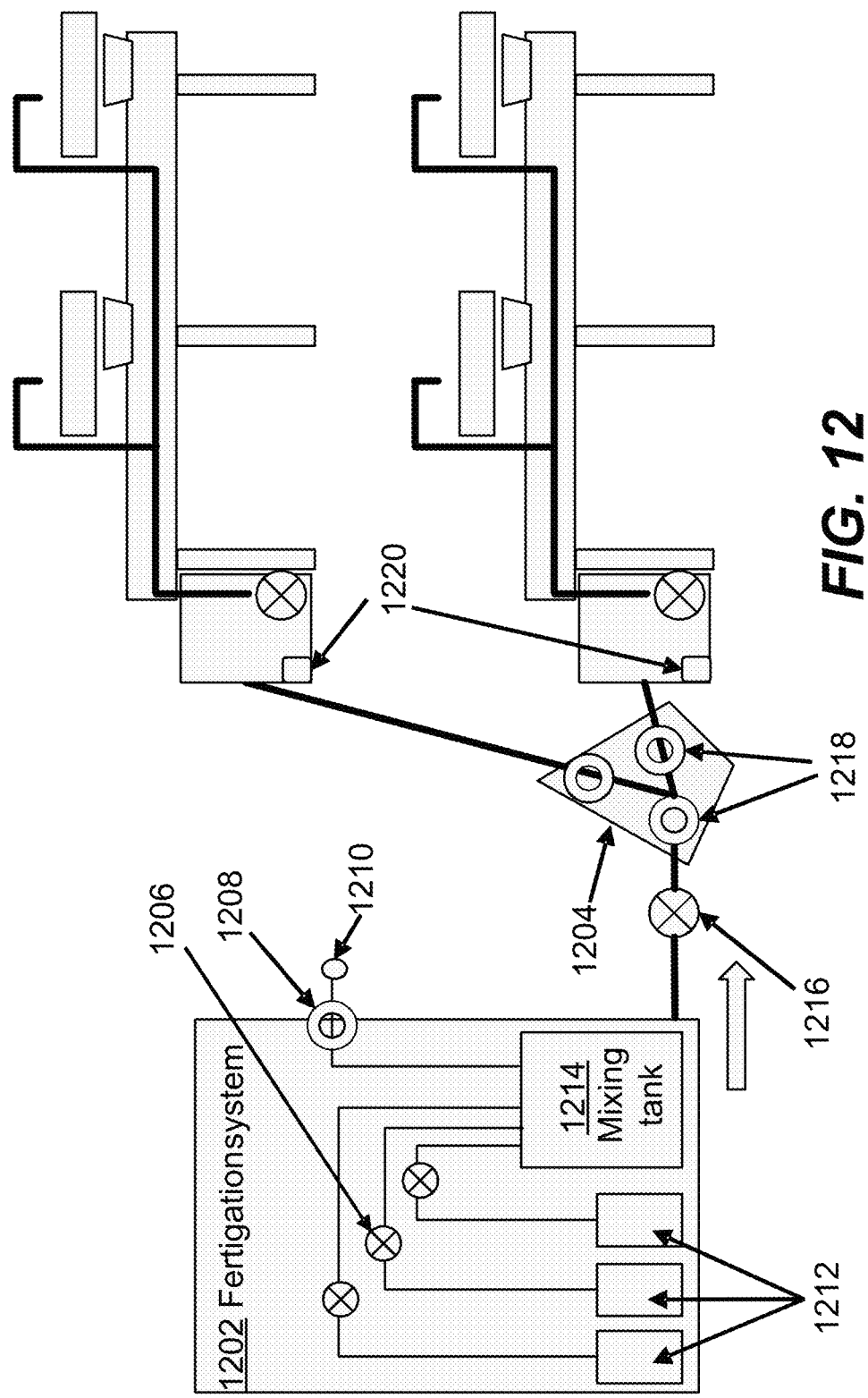
FIG. 12 illustrates an example of a plumbing system with fertigation, in accordance with embodiments of the present disclosure.

The example system configuration shown in FIG. 12 replaces the main reservoir 1002 with a fertigation system 1202 that creates nutrient mixes with a desired nutrient composition on demand for use in a growspace. Fertigation system 1202 selects nutrients from a number of concentrate tanks 1212 that are combined in desired proportions with water. Water enters the system via an external water supply 1210 (e.g. municipal water) and a computer controls the amount that enters a mixing tank 1214 via a water solenoid valve 1208. From there, computer controlled concentrate pumps 1206 pull a desired amount of concentrate from the concentrate tanks into the mixing tank to create nutrient water that can be sent to the plants.

According to various embodiments, nutrient water creation is triggered by water level sensors 1220 that are placed at each dock and determine when a batch of nutrient water is required. When a water level sensor 1220 for a dock 1020 shows as low, a mix is created by the fertigation system and delivery pump 1216 immediately moves nutrient water to dock reservoir 1016 of the dock, selected by dock selector 1204, with the water level sensor 1220 that triggered the refill. In some embodiments, dock selector 1204 comprises a dock solenoid valve 1218 per each dock that can be computer controlled. In some embodiments, this configuration eliminates the need for main reservoirs 1002 or nutrient reservoirs 1102 while also providing the flexibility to create custom nutrient mixes for delivery to a dock 1020 at any time. Furthermore, it reduces the solenoid valves requirement to just one per dock, plus one for the incoming water supply as opposed to having a solenoid for each dock multiplied by the number of nutrient mixes presented in FIG. 11. In some embodiments, the system in FIG. 12 presents a cheaper, more flexible, and more scalable system than that in FIG. 11.

The example systems presented above reduce complexity and cost of growspace plumbing relative to hydroponic operations today. However, there are still challenges in deployment as pipes must still be routed over large spaces. This problem is compounded for configurations that achieve targeted nutrient delivery where a new plumbing line is required for each nutrient composition sent through the growspace, or on-demand nutrient delivery where some nutrient water may remain in the main plumbing lines over long runs.

Figure 13:
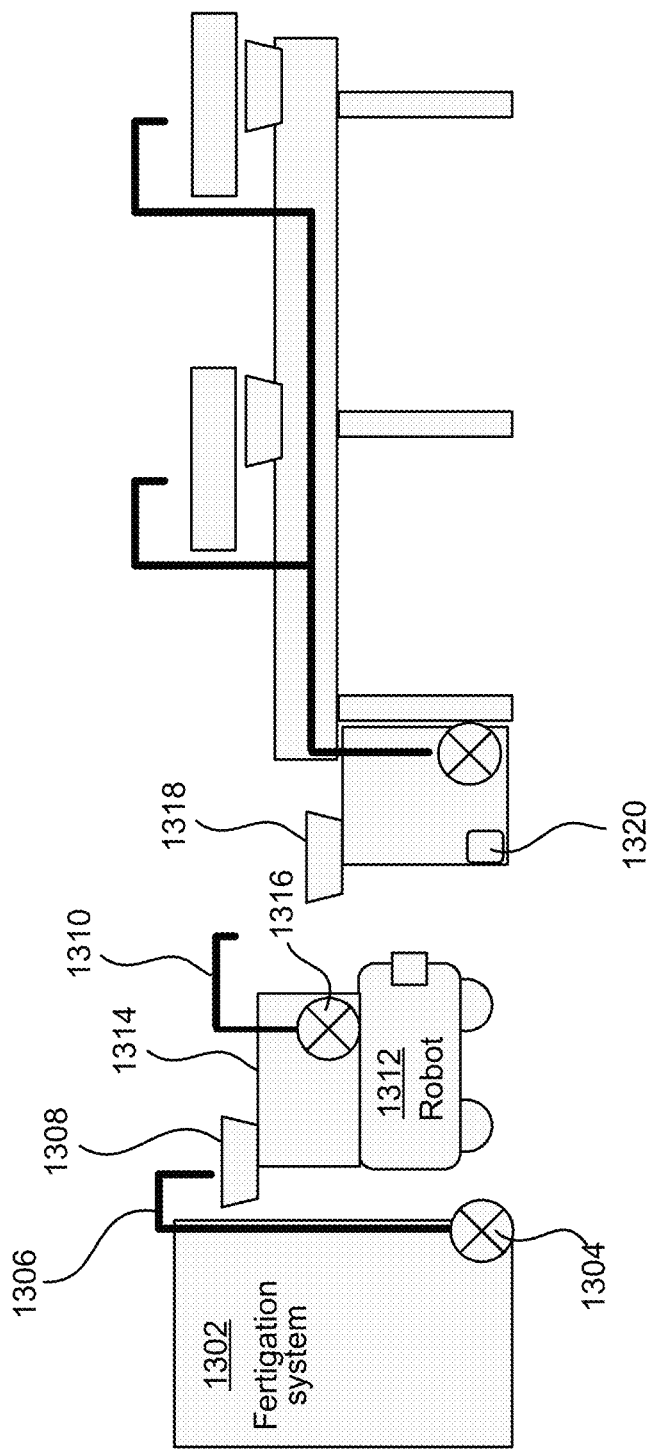
FIG. 13 illustrates an example of a plumbing system with robotic transport, in accordance with embodiments of the present disclosure.

Fortunately, the low flow requirements of the systems presented herein allow for novel configurations that avoid growspace wide plumbing altogether. Such a configuration is outlined in FIG. 13, where a robot 1312 is responsible for transporting nutrient water. In FIG. 13, a fertigation system 1302 creates nutrient water with a desired composition on demand and triggered by a low water level sensor 1320, e.g., via wireless connection, placed at a given dock 1020. The fertigation system 1302 uses a fertigation pump 1304 to send nutrient water created for dock 1020 whose water level sensor 1320 triggered the nutrient water flow through fertigation outflow 1306 and into robot inflow 1308. The nutrient water goes through robot inflow 1308 into robot reservoir 1314, at which point robot 1312 drives to the location of desired dock 1020. Once there, robot pump 1316 moves the nutrient water out through the robot outflow 1310 and into dock inflow 1318. From here, nutrient water lows to dock 1020 using a process similar to the process described above with reference to FIG. 10.

According to various embodiments, by using robot 1312 as a mechanism to transport nutrient water with no plumbing, the system gains a number of advantages. First, it reduces cost by eliminating the need for growspace wide plumbing completely. Second, it allows for unlimited nutrient mixtures to be created and transported with no additional plumbing runs, reservoirs, cost, or risk of water remaining in main plumbing lines. Third, it reduces system complexity when delivering targeted nutrients, thus avoiding the use of solenoid valves, which must be switched on and off in favor of a simple single-pump based system.

Mobile robots readily available for tasks in the warehouse, logistics, and manufacturing sectors also hold promise for automating hydroponics. However, current hydroponic plumbing systems are not compatible with this kind of transport because they do not provide a ready way for a mobile robot to move plants in and out of plumbing automatically.

Figure 14:
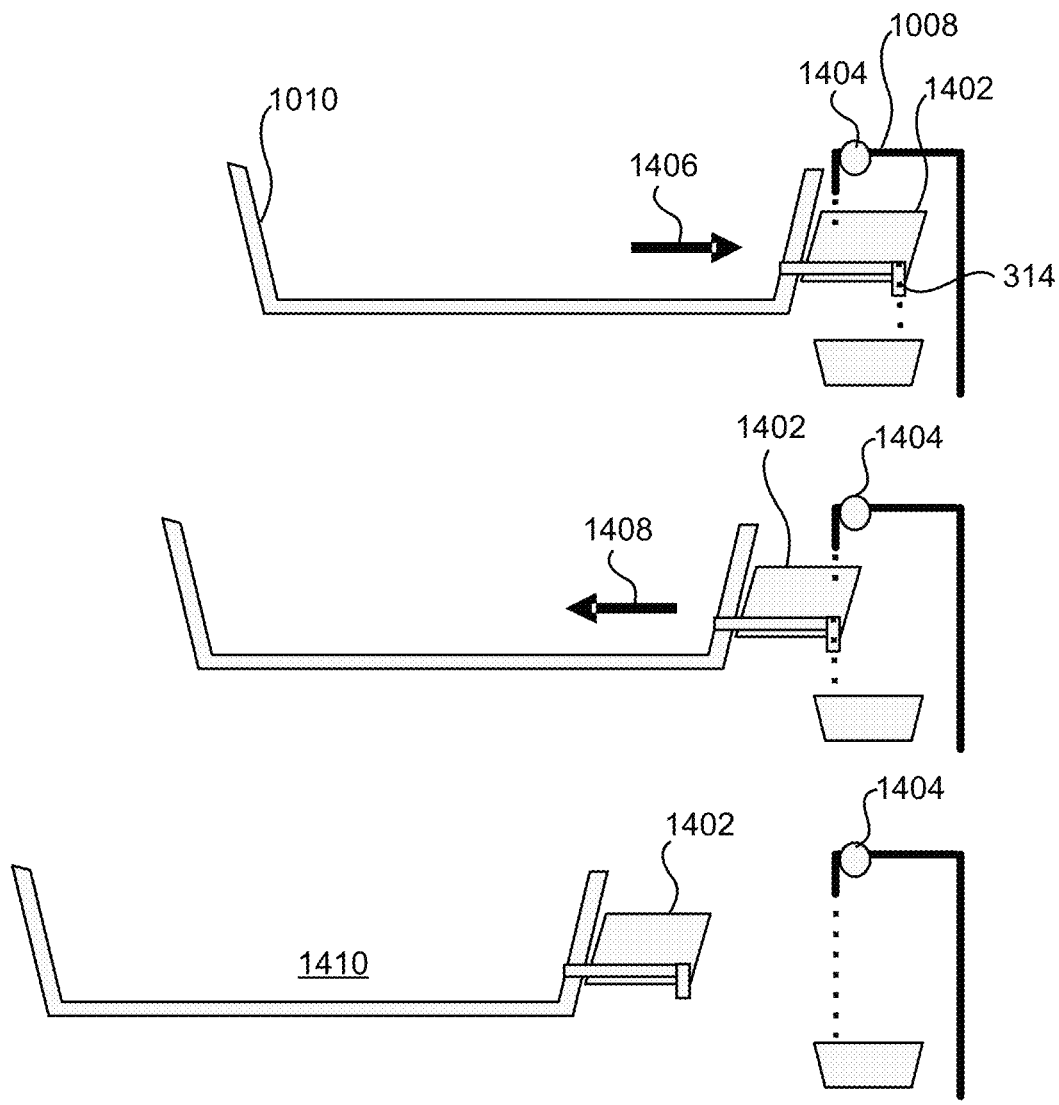
FIG. 14 illustrates a passive plumbing connection, in accordance with embodiments of the present disclosure.

FIG. 14 illustrates a passive plumbing connection. More specifically, FIG. 14 presents a configuration of dripper 1008, drain 1014, and growing tray 1010 that supports passive insertion and removal of a growing tray 1010 from a dock 1020 to support automation. In FIG. 14, grow tray plumbing connection 1402 is placed under dripper 1008 with a tolerance defined by the size of grow tray plumbing connection 1402. As long as some part of grow tray plumbing connection 1402 sits under dripper 1008 and over drain 1014, growing tray 1010 will remain "connected" to the plumbing system of dock 1020. These limits can be defined as the right limit 1406 and left limit 1408 of grow tray plumbing connection 1402. When growing tray 1010 is moved such that grow tray plumbing connection 1402 no longer sits between dripper 1008 and drain 1014, growing tray removal 1410 is achieved and growing tray 1010 is detached from plumbing. In some embodiments, to avoid splashing or spilling during insertion and removal, a flow rate limiter 1404 is placed on each dripper 1008 to ensure only a slow drip of nutrient water is flowing. Flow rate limiter 1404 limits water flow through the use of a drip emitter, which allows for small, consistent amounts of water to flow out over time. This embodiment allows for automatic removal and insertion of growing trays 1010 along with their associated plants into and out of plumbing and provides a foundation upon which plants can be moved in a growspace effectively in conjunction with plumbing systems.

Certain hydroponic grow methods (e.g. the membrane grow method) prefer low nutrient water flow rates. Traditionally, this is achieved with drip irrigation systems which use mechanical components called drip emitters to regulate water flow. These emitters can also be used as flow rate limiters 1404 for controlling drip rates for automated insertion and removal of growing trays 1010 from docks 1020. While effective, flow rate limiters 1404 are extremely prone to clogging as they provide a very narrow channel for water to flow through and any buildup of algae or other solid waste products can prevent water from reaching plants.

Thus, in some embodiments, flow rate limiters 1404 can be replaced by a configuration of a system that actively adjusts dock circulation pump 1012 via a dedicated computer controller. In such embodiments, this computer controller can run the dock circulation pump at a uniform cycle that gives short bursts of large flows of water, as opposed to small drips. This means that the volume of water moving into a growing tray via drippers 1008 is large which removes and prevents clogs as compared to when using a drip emitter. A large opening allows any solids that have built up in the system to exit dripper 1008 without clogging.

The embodiments presented above all maintain some plumbing at the dock level for recirculating water amongst growing trays 1010. While much improved over growspace wide plumbing runs, there is still a requirement for pumps, plumbing, and power at each dock 1020 for the system to function properly. Avoiding the equipment and complexity that comes from these localized plumbing systems further reduces the cost and maintenance requirements of a system.

Figure 15:
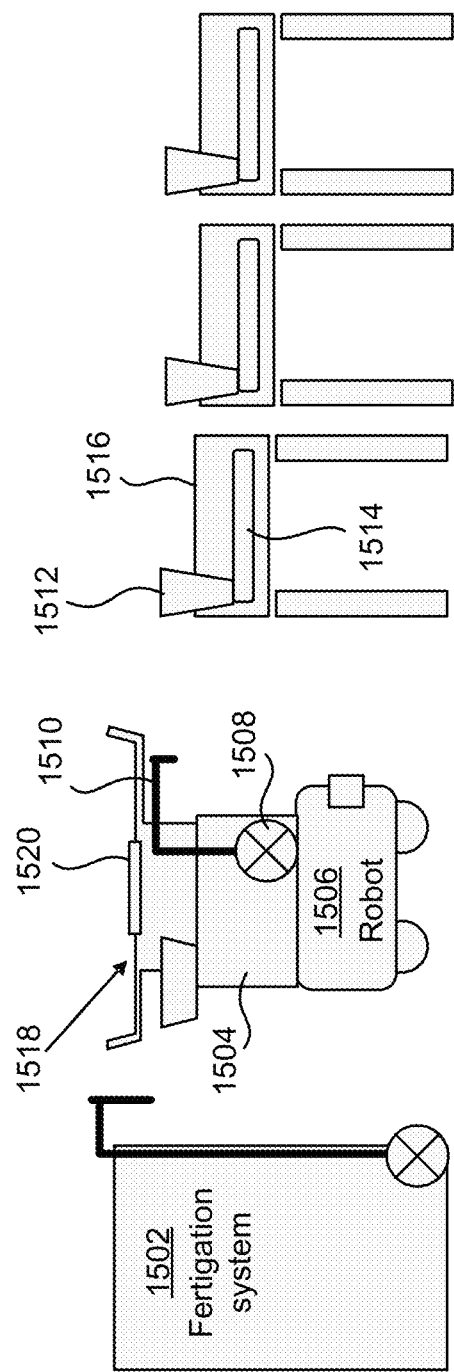
FIG. 15 illustrates an example of a plumbing system with self-contained growing trays, in accordance with embodiments of the present disclosure.

FIG. 15 presents a system configuration that removes traditional plumbing from the growspace entirely. In some embodiments, the mechanism to achieve plumbing removal is to modify each growing tray 1520 such that it is completely self-contained. Each growing tray 1516 is paired with a growing tray reservoir 1514 that can be periodically filled by robot 1506 and no outflow of water, aside from that taken up by plant roots or evaporation, occurs as the growing tray 1516 has no drain. On demand nutrient mixes provided by the fertigation system 1502 can then be transported to a growing tray reservoir 1514 via robot 1506. Fertigation system 1502 creates a desired nutrient water mix, delivers it to robot reservoir 1504 and robot 1506 navigates to a desired growing tray 1516.

In some embodiments, once robot 1506 is at growing tray 1516, it may be difficult to know how much water remains in growing tray reservoir 1514 and to determine how much water should be given to it by robot pump 1508. In some embodiments, using a water level sensor, as in FIGS. 12 and 13, would require sensors in every growing tray 1516 along with battery or electrical power which is complex and cost prohibitive. Instead, to determine how much water is required, robot 1506 uses robot lift 1518 to lift growing tray 1516 along with a weight sensor 1520 to determine how much it weighs. Robot 1506 measures the weight of growing tray 1516 and associated growing tray reservoir 1514 the first time it is filled and then measures it every subsequent time filling is desired to compute the amount of water needed.

Once the desired amount of water is known, robot pump 1508 moves water from robot reservoir 1504 through robot outflow 1510 and into growing tray inflow 1512 which flows down to growing tray reservoir 1514 where it can be accessed by plant roots. This embodiment allows pipes to be completely removed from the growspace and saves on growspace cost and deployment complexity. It also allows for more modular and flexible placement of growing trays

1516, as there is no longer a requirement for any fixed infrastructure like electricity or piping to be installed.

According to various embodiments, having exposed plumbing for automated grow tray removal, as shown in FIG. 14, allows for easy transport of growing trays by mobile robots, but can lead to problems with microorganism growth in plumbing connections (e.g. algae growth) that are exposed to light. In some embodiments, avoiding this growth is desirable as these microorganisms compete for nutrients with plants and can also become a vector for disease to spread.

Figure 16:
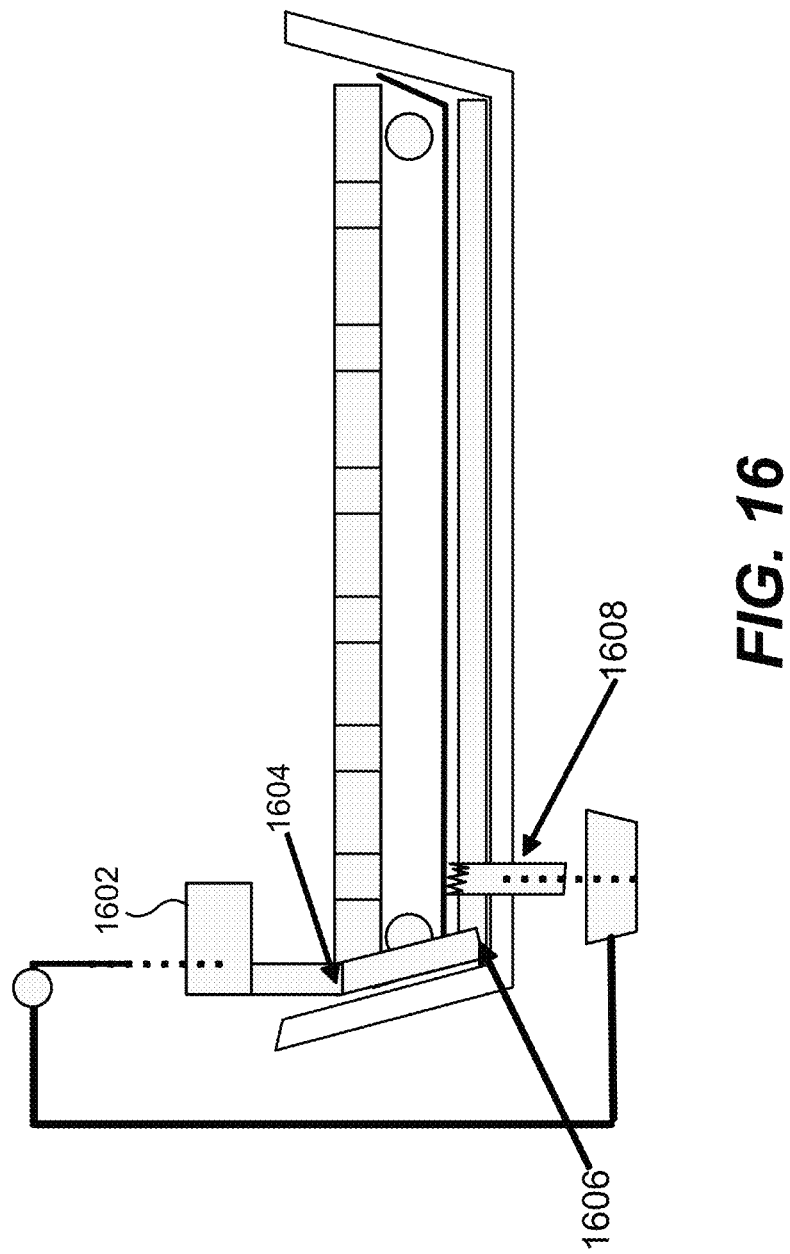
FIG. 16 illustrates an example of a plumbing system with light blocking, in accordance with embodiments of the present disclosure.

FIG. 16 presents a system configuration with plumbing designed to block light while still allowing growing trays to move in and out of plumbing in an automated fashion. Here nutrient water flows into a plumbing inflow 1602 and down through inflow angle 1604, which allows water to flow, but blocks light from entering. The nutrient water then moves out of inflow channel 1606 into the growing tray and drains out vertical outflow channel 1608 when the water in the growing tray reaches a desired height. Vertical outflow channel 1608 is also blocked from light as it is below the growing tray. The combination of inflow angle 1604 and vertical outflow channel 1608 removes light from areas in the plumbing connections where water sits for any prolonged period of time. This greatly reduces any potential for microbial growth in the plumbing system, as light is not present as an energy source for them. This reduces microbial growth and results in cleaner systems that are more robust and less susceptible to contamination.

The example systems presented above all provide uniform flow rates to growing trays. However, in some embodiments, it can be desirable to actively control water flow into growing modules. For example, when removing a growing tray from plumbing with an automated system, it is desirable to turn plumbing off to avoid any splashing that might occur. It may also be desirable to provide water to a growing tray only at certain times of the day or in a non-uniform pattern (e.g. when trying to increase the sugar content of a plant via simulating drought conditions for a time).

In some embodiments, to achieve active duty cycle plumbing, a system can introduce a computer controller capable of controlling dock circulation pump 1012. Specifically, the controller can turn dock circulation pump 1012 on and off to allow insertion and removal of growing trays 1010 without splashing. It can also do the same to provide low flow rates to growing trays 1010 for the hydroponic methods that require them as mentioned above.

The system presented in FIG. 10 above requires that water be pumped from a main reservoir 1002 to a dock reservoir 1016 with supply pump 1004 and dock circulation pump 1012, respectively. These pumps require electrical power and are a potential point of failure in the system. In other words, if a pump fails, water is no longer sent to the plants. As such, in some embodiments, it may be desirable to avoid the need for pumps with a gravity based approach to water supply.

Figure 17:
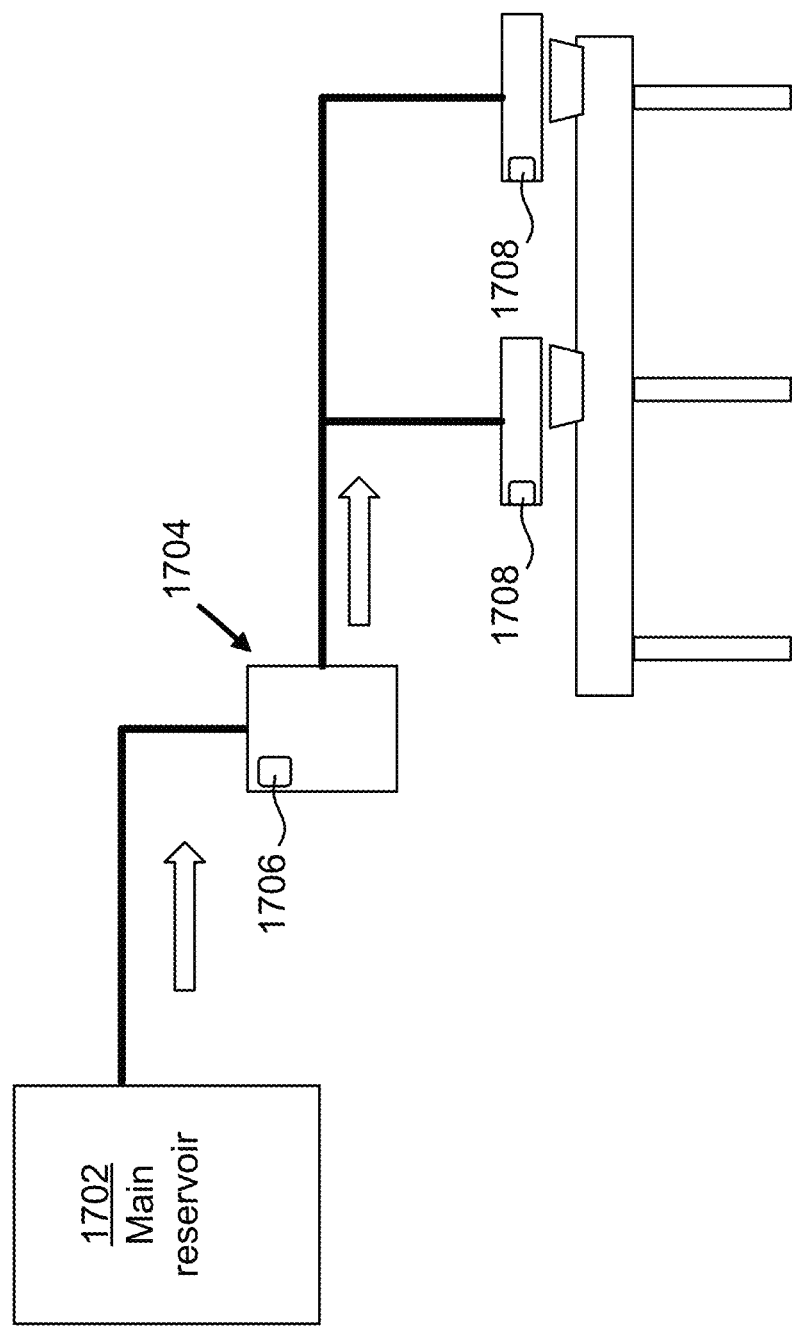
FIG. 17 illustrates an example of a plumbing system with gravity flow, in accordance with embodiments of the present disclosure.

FIG. 17 shows a configuration of a system that places a main reservoir 1702 above a dock reservoir 1704, which allows water to flow via gravity. Dock float valve 1706 allows water into dock reservoir 1704 when it falls below a desired level. From there, water flows via gravity from dock reservoir 1704 to the growing trays which are placed below dock reservoir 1704. The growing trays are also outfitted with growing tray float valves 1708, which measure the water level in the growing trays and allows water to flow in from dock reservoir 1704 when the water level is low enough to trigger growing tray float valve 1708. This system configuration avoids the need for pumps and associated electrical infrastructure throughout the growspace. It also provides a more reliable mechanism for moving water as pumps can fail. However, gravity flow is reliable even in the case of power loss.

Current transport systems such as conveyor transport systems are under-utilized, because plants do not move for most of their growth cycle, which means the transport system sits idle most of the time. To address this problem, in some embodiments, the systems disclosed herein separate the transport system into a mobility-only robot that runs at very high duty cycles. This means that the transport system never sits idle. Additionally, this means that many fewer moving parts are needed to build the transport system, since the transport system is shared across all grow spots in the farm, while current transport systems are dedicated to each grow spot in the farm.

Figure 18:
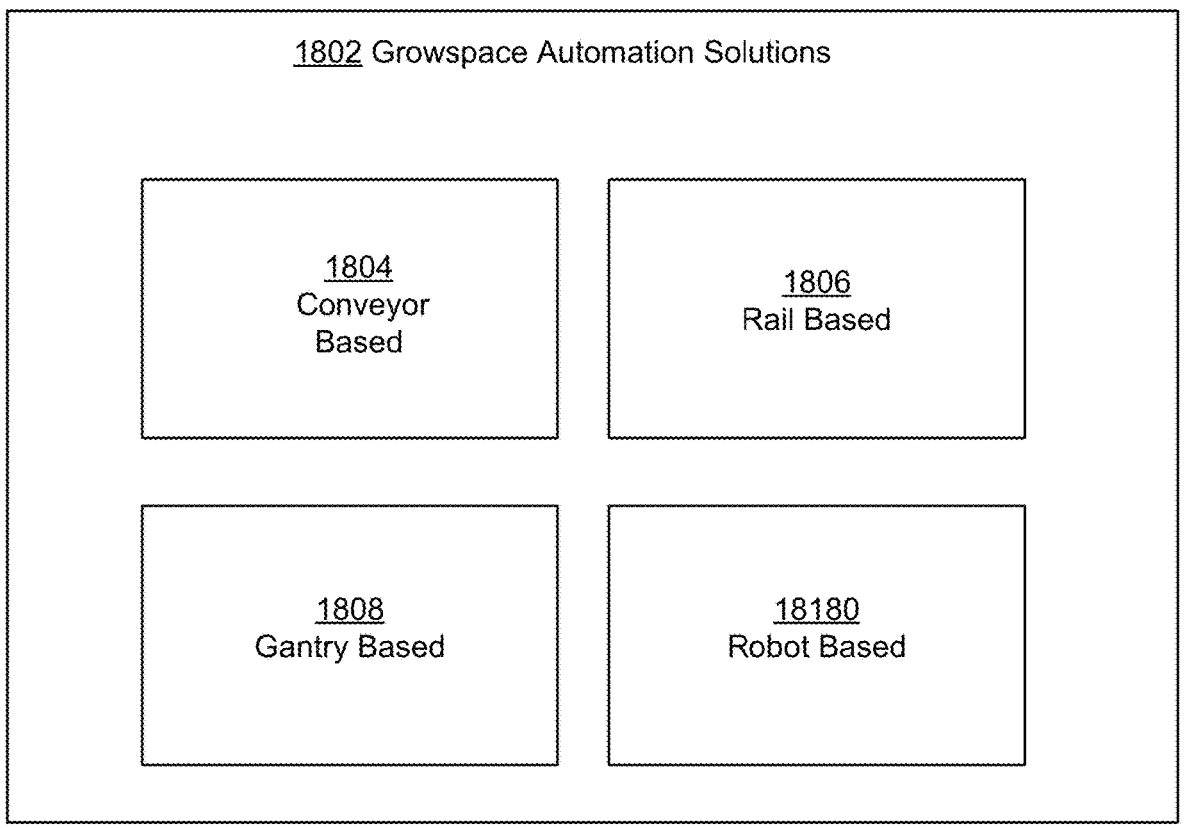
FIG. 18 illustrates a simple diagram showing one example of a typical growspace automation solution, in accordance with embodiments of the present disclosure.

Many controlled environment agriculture (CEA) growspaces rely on automation solutions to improve the efficiency and reliability of their operations. FIG. 18 outlines the four major growspace automation solutions 1802 commonly deployed today: conveyor based 1804, rail based 1806, gantry based 1808 and robot based 1810 automation. Conveyor based automation 1804 moves plants through a growspace using either mechanical conveyors or raft based systems where plants are floated in conveyor fashion on water and pushed. Rail based automation 1806 systems leave the plants where they are and send automated carts into the growspace on rails to service them in place. Gantry based systems 1808 rely on an overhead gantry that moves above the growspace and drops down to pick plants up and move them. Robot based systems 1810 use mobile robots capable of navigating a growspace to pick up plants.

Conveyor based 1804, rail based 1806, and gantry based 1808 systems all require large amounts of fixed infrastructure that is often expensive to be placed into a growspace. The size of this infrastructure increases linearly with the size of the growspace. As the square footage of a growspace goes up, so too does the cost of core automation systems. These types of systems are also inflexible making it difficult to meaningfully change how a growspace operates without expensive retrofitting or re-working of its underlying automation systems. Furthermore, such systems are often custom built for each growspace they occupy which increases complexity of deployment.

More recently, robot based 1810 automation solutions have been deployed in the industry to attempt to reduce the cost and complexity of automation while increasing flexibility. While promising, current systems rely on localization solutions that are challenging to make robust. One common approach is to use a simultaneous localization and mapping (SLAM) solution to allow robots to keep track of where they are within a growspace. Another is to augment an existing growspace environment with markers or beacons placed in known locations that the robot can use as references for its own position. These approaches place few requirements on the structure of the growspace itself, often being added after the fact, which presents challenges in achieving robustness and accuracy. SLAM may fail or become inaccurate when an environment has repeating features or changes due to new objects or equipment being placed. And with markers or beacons, it is difficult to make strong guarantees about accuracy throughout the growspace with variabilities in coverage, visibility, and spacing. Often, failures are frequent enough that human operators are employed to help robots recover from localization failures increasing operational costs.

Figure 19:
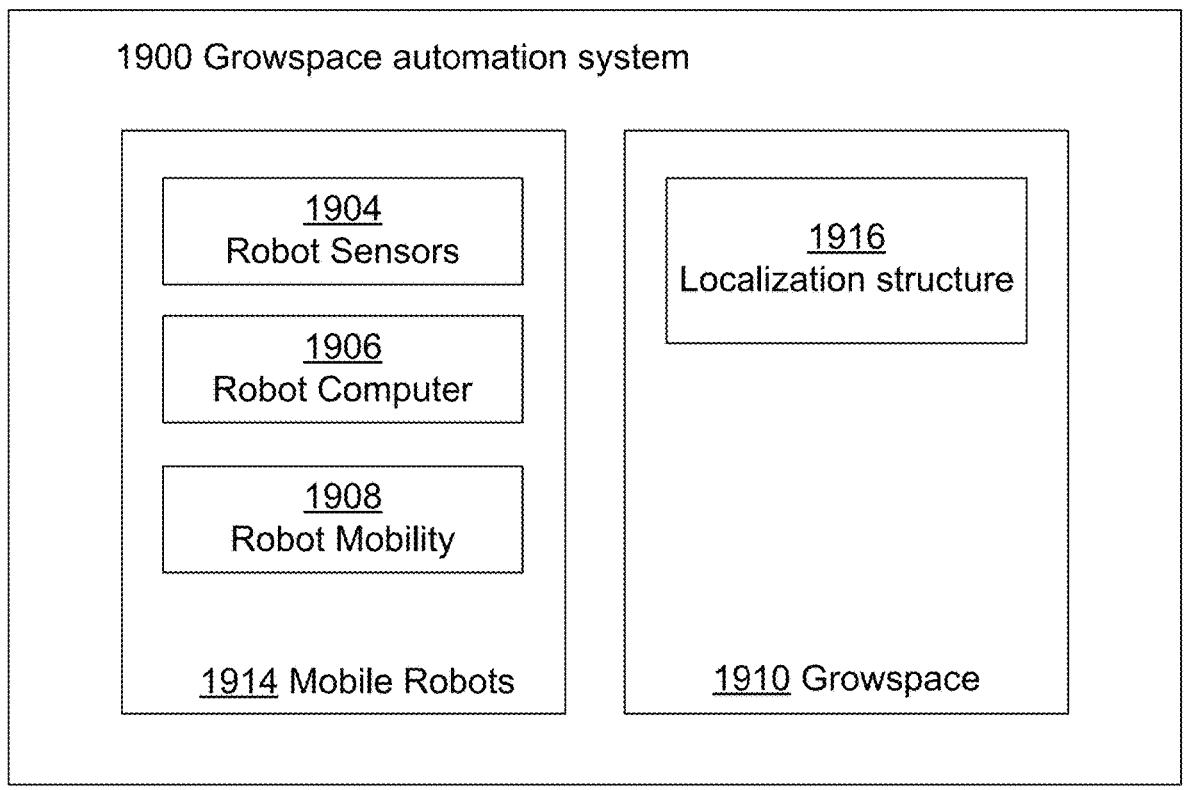
FIG. 19 illustrates a block diagram showing one example of a growspace automation system, in accordance with embodiments of the present disclosure.

FIG. 19 illustrates one example of a growspace automation system. FIG. 19 presents a mobile robot 1914 based growspace automation system 1900 that localizes off the structure of growspace 1910 without the requirement for SLAM, added markers, or beacons. In some embodiments, growspace 1910 is designed from the ground up to ensure that any structure or support that is within the field of view of robot sensors 1904 is placed strategically to support localization efforts. The subset of growspace 1910 that is within the field of view of robot sensors 1904 represents localization structure 1916 of growspace 1910. To localize, robot sensors 1904 send information about the world to robot computer 1900 which compares this sensor information to a digital representation of the localization structure. By matching sensor readings with corresponding locations in localization structure 1916, the robot can determine its position in the environment. From there, the robot computer computes desired commands to send to robot mobility mechanism 1908 to move mobile robots 1914 through growspace 1910.

As localization structure 1916 is designed with localization techniques in mind, it allows for less computationally intensive software to be used as compared to current techniques and also gives guarantees about accuracy and robustness of the system. In some embodiments, this removes the need for human operators, provides more accurate and consistent placement of items moved within growspace 1910 by mobile robots 1914. It also removes the need for any retrofitting after construction of growspace 1910 is complete, as growspace 1910 itself is localization structure 1916.

Figure 20A:
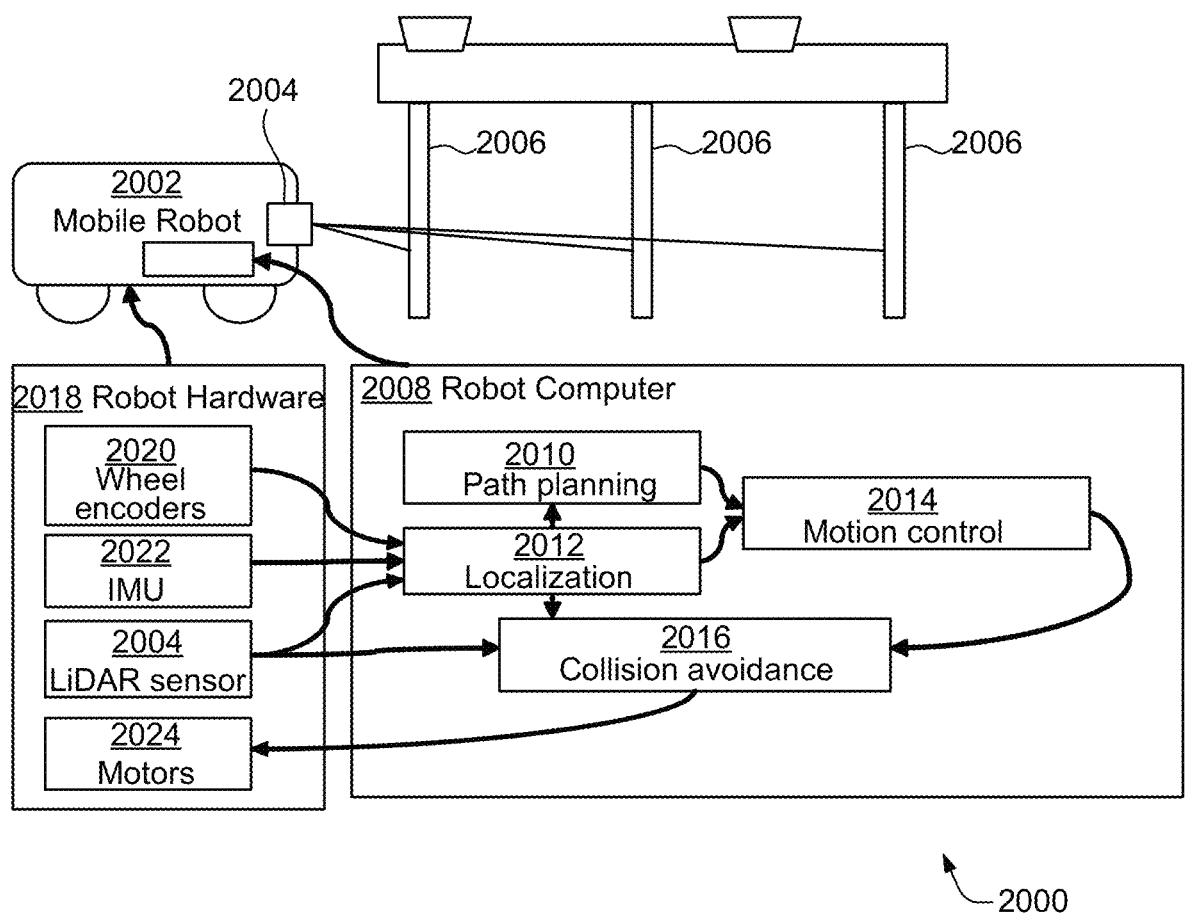
FIG. 20A illustrates an example growspace automation system, in accordance with embodiments of the present disclosure.

A specific implementation of this system is shown in FIG. 20A. FIG. 20A illustrates an example growspace automation system 2000. System 2000 includes a mobile robot 2002 equipped with robot hardware 2018, and robot computer 2008. Robot hardware 2018 includes a LiDAR sensor 2004, wheel encoders 2020, inertial measurement unit (IMU) 2022, and motors 2024. Robot hardware 2002 is controlled by software running on the robot computer 2008. The robot computer 2008 contains four main software modules: localization 2012, path planning 2010, motion control 2014, and collision avoidance 2016. These modules work together to provide navigation capabilities that allow mobile robot 2002 to move freely through the growspace.

In some embodiments, one of the core components upon which the navigation system is built is localization 2012, as it provides vital information about the position of mobile robot 2002 to other software modules. To determine its location within the growspace, mobile robot 2002 uses LiDar sensor 2004 to take information in about growspace 210 in the form of a scan containing distances and intensities of LiDAR hit points on objects in the horizontal plane of the sensor. Localization supports 2006 are used throughout growspace 210 to encode points of interest in localization structure 216. The placement of localization supports 2006 in growspace 210 is chosen to simplify the localization problem compared to traditional approaches that must deal with simultaneous localization and mapping, marker placement, or dynamic environments and ensures supports are spaced to allow easy data association to LiDAR hit points. Localization supports 2006 are also spread throughout growspace 210 such that strong guarantees are made about visibility to them for LiDar sensor 2004. At any location of mobile robot 2002 in the growspace, LiDar sensor 2004 is guaranteed to see at least two supports within two meters of distance that lie on separate LiDAR scan lines ensuring stability and accuracy for the localization system. This is shown in FIG. 20B, where localization supports 2006 are visible for any location in the growspace that the robot may traverse represented by nodes 2026 and edges 2028 in a graph structure that spans the growspace.

To localize mobile robot 2002, localization module 2012 takes in data from wheel encoders 2020 on the mobile robot that give an approximate measure of distance traveled along with information from IMU 2022 that gives an estimate of the robot's orientation using a gyroscope. These two measures are fused together to compute an odometry estimate that is used as the starting point for an optimization process that works off LiDar sensor 2004. To achieve this, hit points from scans produced by LiDar sensor 2004 are matched with a digital representation of localization support 2006 locations stored on robot computer 2008 within localization module 2012. First, a distance check is used to focus attention on likely location of localization supports 2006 given the current location of mobile robot 2002. Next, intensity filtering is performed on hit points to remove any that fall outside of the ranges known to be returned by localization supports 2006 themselves. Finally, a modified gradient descent process starting from the best guess of the robot's current location given by the odometry computation described above is used to find a robot pose that minimizes the error of the sensor readings taken by LiDar sensor 2004. Specifically, as localization supports 2006 are cylindrical, the gradient descent process used for matching employs a cylindrical model that more accurately matches the shape of the scan in the physical environment and results in a more accurate prediction than a standard gradient descent process which would match points alone. The result of this optimization is the likely pose of mobile robot 2002 within growspace 210. These steps lead to a stable, reliable, accurate, and computationally efficient localization process.

Figure 20B:
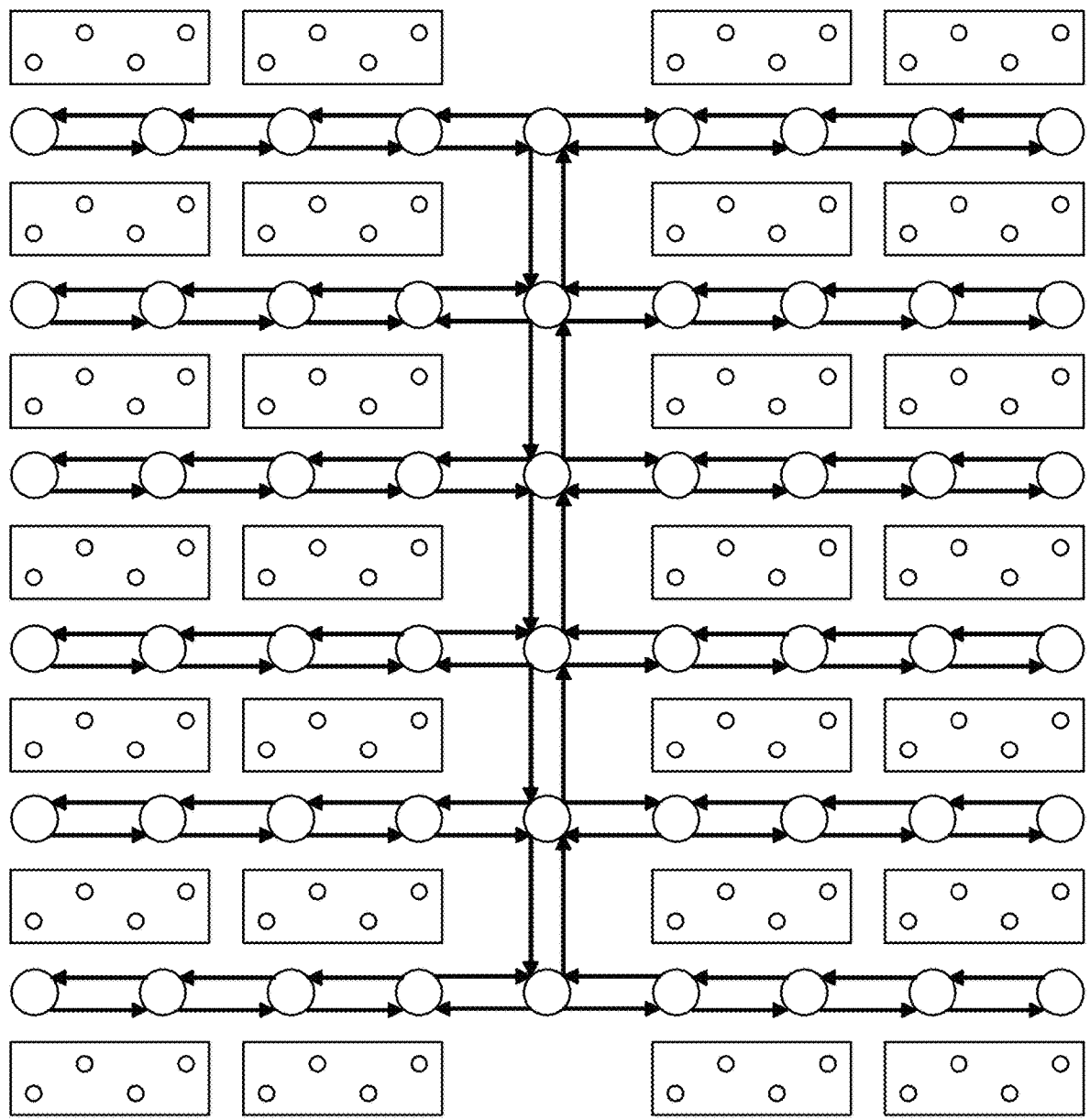
FIG. 20B illustrates an example graph based representation of a growspace, in accordance with embodiments of the present disclosure.

Once computed, the localization estimate is provided to path planning component 2010, which holds a graph based representation of the growspace in which it can plan trajectories shown in FIG. 20B. FIG. 20B illustrates an example graph based representation of a growspace. Each node 2026 in the graph represents a valid position for the robot and edges 2028 represent motion primitives (chains of pre-computer accelerations and velocities) that connect valid positions to each other and have a cost associated with the distance traveled between nodes. This representation is sparse and leads to quick planning times where a plan from one part of the growspace to another can be represented as a graph search problem. To plan, the current location of the robot provided from localization module 2012 is mapped to a node 2026 in the graph as a starting point for planning and an end location is also selected and mapped to a node 2026 in the graph. From there, the problem of planning is a search of the lowest cost path from start to end which is achieved via a modified AStar graph search. The modified AStar algorithm uses a standard heuristic of metric distance to determine the order in which to explore the graph, but is modified to support different footprints or configurations of the robot without requiring an additional graph. Specifically, traversability constraints are encoded in each edge 2028 in the graph for different robot configurations and are evaluated during graph traversal. If a constraint is not satisfied, the modified AStar algorithm will treat the edge as non-traversable and attempt to find another path through the graph. The nodes and edges returned by this planner are then converted via a lookup from motion primitives into set points which contain positions and velocities that can be passed on to motion control module 2014.

Figure 20C:
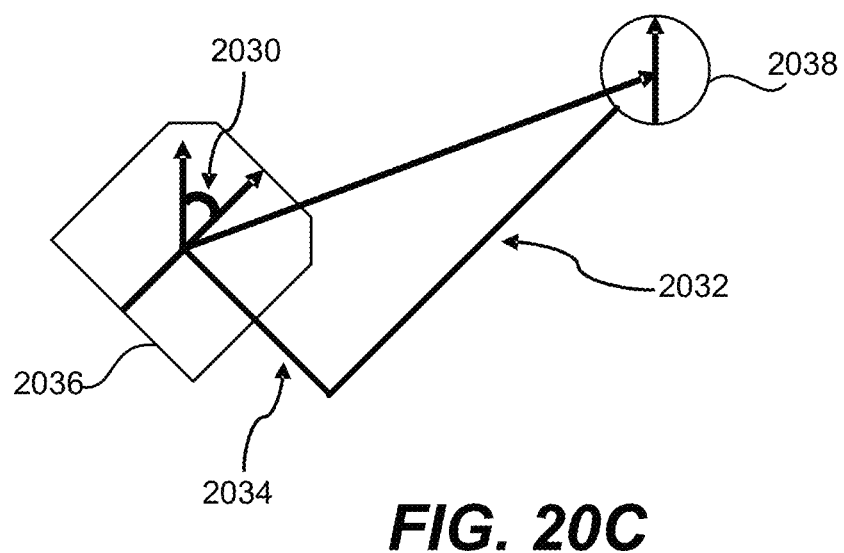
FIG. 20C illustrates an example trajectory of a mobile robot to a set point, in accordance with embodiments of the present disclosure.

Motion control module 2014 is passed a trajectory of set poses containing desired positions and velocities for mobile robot 2002 to achieve along with the latest estimate of the robot's position from localization module 2012. To follow this trajectory, motion control module 2014 employs three different proportional integral derivative (PID) controllers that compute the current error of robot 2036 relative to a set point 2038 on the trajectory as shown in FIG. 20C. FIG. 20C illustrates an example trajectory of a mobile robot to a set point. The controller computes error in the forward 2032, sideways 2034, and angular 2030 directions from robot 2036 to the closest set point 2038. The PID responsible for forward error controls the linear velocity produced by the motion control system and the PIDs responsible for sideways and angular error are combined to produce a desired angular velocity command. As the robot moves past its current set point 2038, a new one is selected from the trajectory and the process repeats.

Before sending velocity commands to the robot's motors 2024, collision avoidance module 2016 checks to ensure that they will not cause the robot to collide with anything in its environment. It does this by taking information from LiDar sensor 2004 about obstacles sensed and forward simulating the robot's path based on its current trajectory and commands output by motion control module 2014 along with its current location provided by localization module 2012. If a collision is detected, collision avoidance module 2016 will scale the velocity commands produced by motion control module 2014 to ensure that the robot will stop before hitting the obstacle. Collision avoidance module 2016 then sends desired velocities to motor controllers that move the robot's motors 2024 based on that input.

According to various embodiments, this system configuration requires little computational power from robot computer 2008, uses a LiDAR sensor 2004 that is robust in all lighting conditions, as well as total darkness, and is cost effective in that localization support 2006 can be readily made from any material that reflects light well. All this makes it cost effective, easy to deploy, and robust compared to robot based automation solutions that have been deployed in growspaces 210 to date which spend significant processing power building maps of their environment and/or processing markers in images. Furthermore, this system provides strong guarantees about its accuracy across the entire grow space as the localization supports 2006 are designed in conjunction with localization software 2012 which is another advantage over traditional systems whose accuracy often varies greatly in different parts of the environment.

Figure 21:
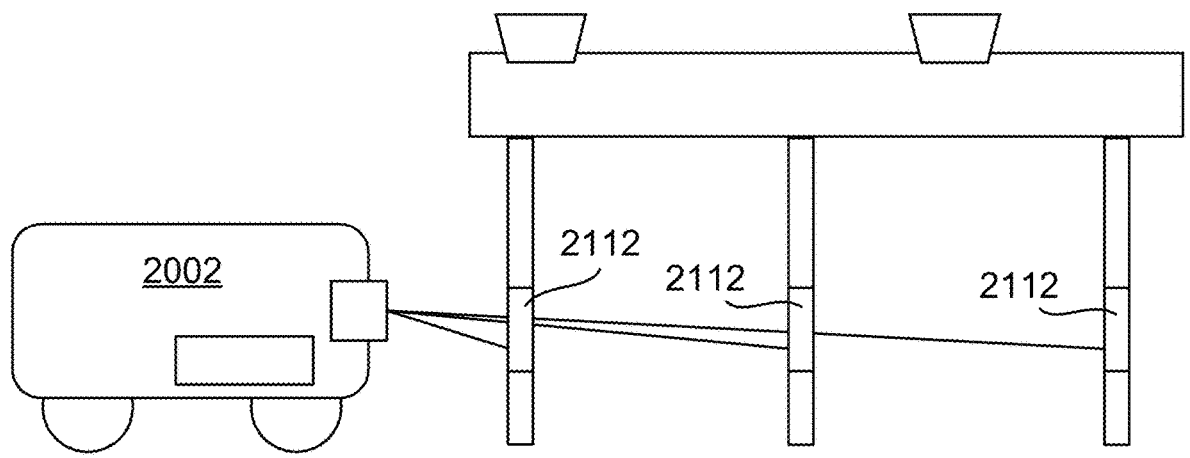
FIG. 21 illustrates an example grow system with localization, in accordance with embodiments of the present disclosure.

Some embodiments for robot localization and navigation within a growspace 210 uses a filtering process based on distance and intensities to determine whether a LiDAR hit point is likely to have fallen on a localization support 2006. This is typically a robust process, but can struggle when objects enter a growspace and create hit points near localization supports 2006 (e.g., when people walk close to a localization support 2006). FIG. 21 shows an embodiment of the system that makes localization robust even in the presence of a wide range of dynamic objects. In this embodiment, reflectors 2112 are placed around localization supports 2006 that return light sent out by LiDar sensor 2004 at known high intensity ranges. These reflectors 2112 allow the intensity filtering process to be extremely restrictive, filtering out any LiDAR hit points that fall outside of the range returned by reflectors 2112. With this in place, any outliers from dynamic objects that might have ended up being used for gradient descent are removed leading to a more robust localization process.

Figure 22A:
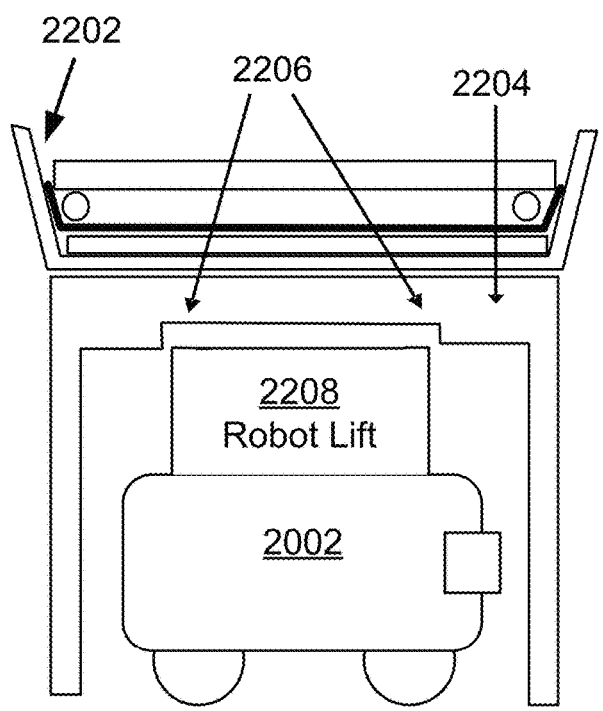
FIGS. 22A-22C illustrate examples of a grow system with mobile robot transport, in accordance with embodiments of the present disclosure.

According to various embodiments, tracking the position of a mobile robot 2002 within a growspace 210 provides a foundation for automation, but does not inherently allow for the movement of plants within the environment. FIG. 22A shows an example of a system that enables a mobile robot 2002 to move groups of plants around a growspace 210. In this embodiment, a robot lift 2208 is attached to mobile robot 2002. Robot lift 2208 can travel up and down (e.g. using linear actuators) and connect to support lift connections 2206 anywhere in the growspace. Once connected, mobile robot 2002 can move anything sitting on top of support lift connection 2206 through a growspace 210. Plants grown in growing trays 2202 sit on top of growing tray supports 2204 that incorporate support lift connections 2206 into their design.

According to various embodiments, to move a growing tray 2202 within growspace 210, mobile robot 2002 positions itself under the support lift connection 2206 associated with growing tray support 2204 for the desired growing tray 2202. Robot lift 2208 then lifts growing tray support 2204 off the ground by pushing up on support lift connection 2206. Once robot lift 2208 is in its extended position, growing tray 2202 is effectively attached to mobile robot 2002 and ready for transport. Mobile robot 2002 can then navigate to another point in growspace 210. Once there, robot lift 2208 moves down, placing growing tray support 2204 back onto the ground and completing the transport operation.

The embodiment described in the section above provides a mechanism for a mobile robot 2002 to move a growing tray 2202 throughout a growspace 210 in an automated fashion. However, it can be challenging to meet high accuracy requirements for growing tray 2202 placement as robot lift 2208 will place growing tray 2202 with a maximum error equivalent to that of the tolerance of support lift connection 2206. In some embodiments, making support lift connection 2206 large can lead to a case where growing tray 2202 is positioned inaccurately, e.g., if there is any error in growing tray 2202 pickup either from localization, mobile robot control, or movement of support lift connection 2102 while robot lift 2208 is extending.

Figure 22B:
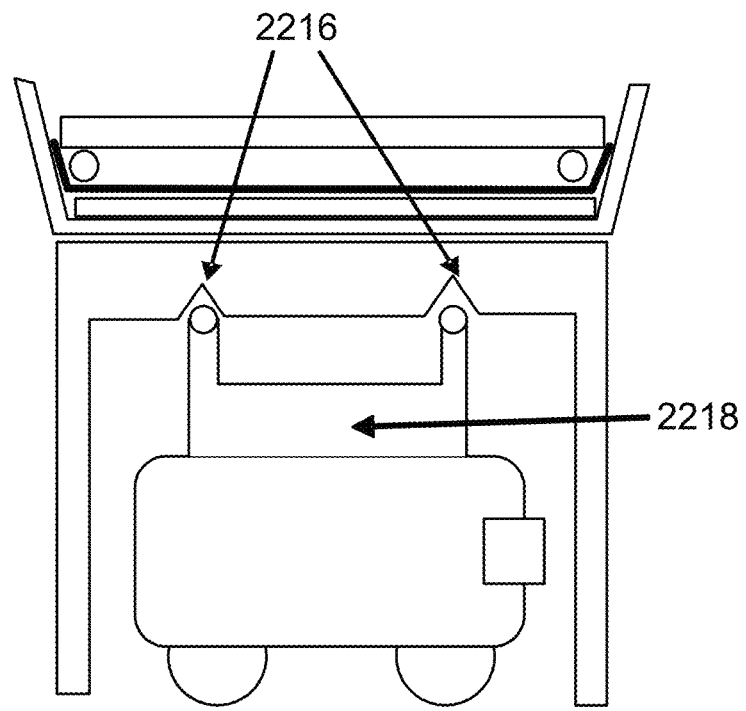

In some embodiments, to ensure accurate placement of growing trays 2202 and to remove any error caused from the lift process itself a different kind of lift mechanism may be employed. FIG. 22B illustrates a system that uses a self-aligning lift 2218 to attach to a self-aligning connection 2216 during pickup and dropoff operations. Self-aligning connections 2216 are shaped so that they use gravity to mechanically align with self-aligning lift 2218 when picked up. Specifically, self-aligning connections 2216 are shaped such that they will slide along self-aligning lift 2218 to guarantee centering when self-aligning lift 2218 is fully extended. By using multiple alignment connections 2216 placed at different angles, growing tray 2202 will align itself with lift 2218 in all six degrees of freedom of a rigid body. This embodiment of the system leads to more accurate placement of growing trays 2202 in that self-alignment guarantees no error occurs from the lift process. Growing trays 2202 are placed at the raw accuracy of the localization system.

The embodiment presented in the section above provides a mechanism to mechanically align a growing tray 2202 with a self-aligning lift 2218, but requires a separate growing tray support 2204 and self-aligning connection 2216 as additional components. This increases the expense of the system as well as the complexity of construction and deployment. To reduce costs and complexity of lifting growing trays 2202, it may be desirable to reduce the number of components required to make the system work.

Figure 22C:
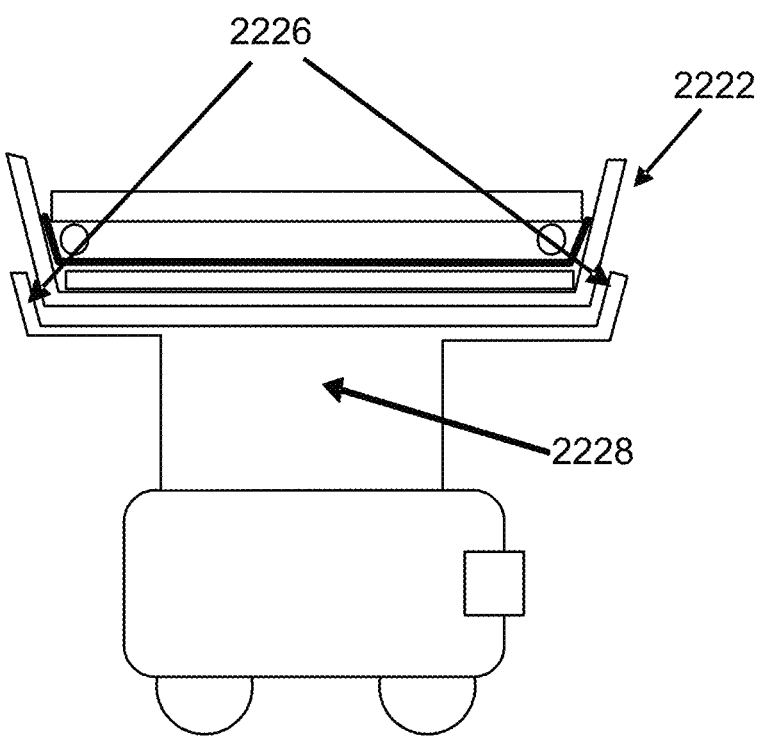

The example embodiment shown in FIG. 22C reduces cost and complexity of the process of lifting a growing tray 2202 by placing a self-aligning connection 2226 on a self-aligning lift 2228 directly rather than on a supporting structure. Self-aligning connection 2226 shown in FIG. 22C is angled and relies on growing tray slope 2222 along with gravity to ensure that growing tray 2202 becomes centered on self-aligning lift 2228. Specifically, as self-aligning lift 2228 extends, growing tray 2202 slides down the sides of self-aligning connection 2226 to a desired and repeatable position. This configuration reduces costs of materials, simplifies the number of components, and produces a system that meets high accuracy requirements that come with transport.

Figure 23:
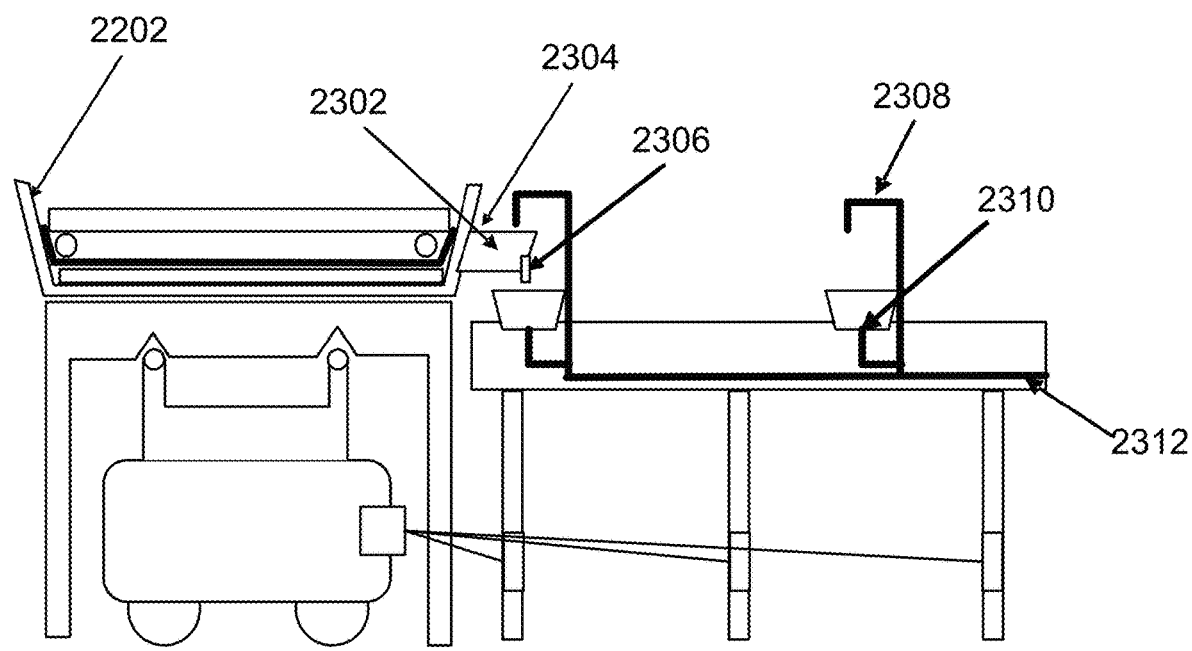
FIG. 23 illustrates a grow system with a passive plumbing connection, in accordance with embodiments of the present disclosure.

According to various embodiments, growing plants often requires plumbing infrastructure to provide water and nutrients. Transporting plants in the presence of such infrastructure with mobile robots 2002 can be challenging and requires that careful thought be given to insertion and removal to avoid splashing or leaks. FIG. 23 illustrates a grow system with a passive plumbing connection. FIG. 23 shows a passive approach to interface with plumbing that requires no mechanical couplings, is inexpensive to implement, and highly reliable when paired with transport via mobile robots 2002.

In FIG. 23, growing tray plumbing 2302 is added to growing tray 2202 where a growing tray inflow 2304 and growing tray outflow 2306 take nutrient water into the tray and allow for water to drain out. Growing tray plumbing 2302 is positioned in such a way that nutrient water can flow into it from growspace plumbing 2312 via growspace plumbing outflow 2308 and drain out of it to growspace plumbing 2312 via growspace plumbing inflow 2310. Enough clearance is left between growing tray plumbing 2302 and growspace plumbing outflow 2308 that when robot lift 2208 is extended the growing tray plumbing 2302 does not hit growspace plumbing outflow 2308. Thus, the passive plumbing connection in FIG. 23 can be considered a water flow alignment, rather than a physical connection.

According to various embodiments, to move a growing tray 2202 that is connected to plumbing, the mobile robot simply lifts it up, tilts the growing tray slightly away from growing tray outflow 2306 to avoid any water sloshing out growing tray outflow 2306 during transport, and backs growing tray 2202 out of its plumbing connection. According to various embodiments, to insert growing tray 2202 back into plumbing, the opposite process is followed where mobile robot 2002 positions growing tray 2202 so that growing tray plumbing 2302 sits under the growspace plumbing outflow 2308, reverses the tilt of growing tray 2202 to be level, and lowers robot lift 2208 to fix growing tray 2202 in place.

Figure 24A:
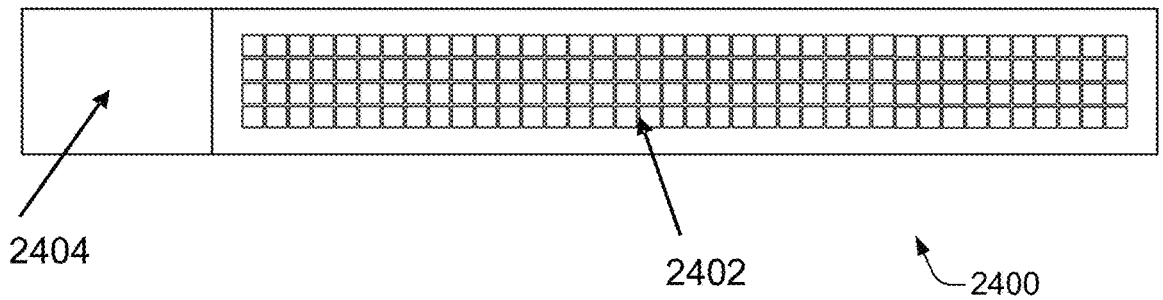
FIGS. 24A-24C show examples of a growspace with a central processing area, in accordance with embodiments of the present disclosure.

According to various embodiments, there are a number of advantages to limiting the amount of human processing and interaction with plants that is done in the growspace. Humans are the most likely vector for pests and contamination and often struggle with challenging ergonomics that come along with performing tasks in an environment engineered for the growing of plants, not for the associated labor that comes with managing them. To address these issues, the example growspaces 2400 illustrated in FIGS. 24A-7C use mobile robots 2002 to move growing trays 2202 out of a growing area 2402 into a central processing area 2404 that is separate and engineered specifically for processing of growing trays 2202. In some embodiments, this configuration allows for central processing area 2404 to be outfitted with specialized equipment to assist in common tasks (e.g. harvesting, transplanting) and to make ergonomics favorable for any human labor that must be performed.

According to various embodiments, controlling pests in a growspace is an important activity that employs both passive and active methods. For passive methods, the growspace is sealed off as much as possible from pests with screens or other barriers. For active methods, pesticides are applied actively to plants in a growspace in order to combat the establishment of pest communities that manage to bypass the passive barriers that are in place. To this point, active management strategies require either automated but large scale application strategies (e.g. growspace wide foggers that spray pesticide) or small scale, but human operated application strategies (e.g. a person with a backpack spraying pesticides) that can be applied in a more targeted fashion. Large scale application has the disadvantage of using more pesticides than needed which can be bad for workers as well as the environment. However, targeted applications often require humans to be in hazardous conditions requiring respiratory protection and are also labor intensive.

Figure 24B:
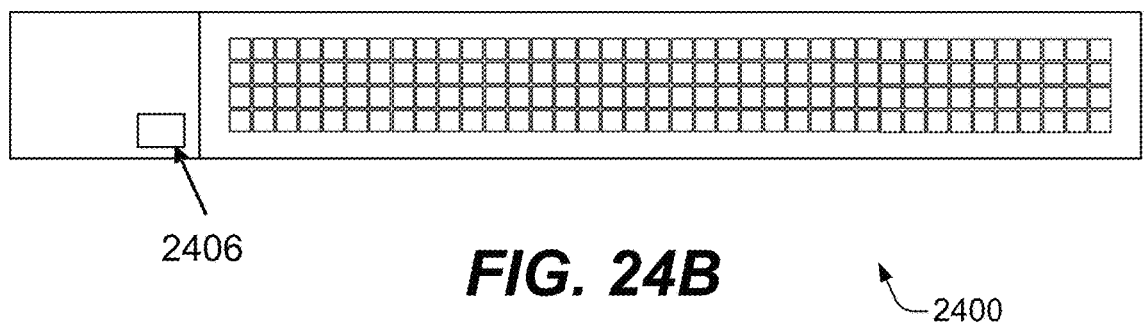

FIG. 24B presents an embodiment of system 2400, in which pest control is performed in an automated fashion by mobile robots while still allowing for targeted action to be taken. In this system, growing trays 2202 are moved by mobile robots 2002 to a designated pest control area 2406. Pest control area 2406 can be separate from main growing area 2402, while being well sealed, well ventilated, and capable of applying pesticides to a small subset of the plants in the full growspace 210. This protects human workers while still giving the advantages that come along with the ability to be prescriptive in pesticide use.

According to various embodiments, high quality and regular data collection is fast becoming an important part of controlled environment agriculture operations. However, collection of this data is often challenging requiring the deployment of expensive sensors (e.g. multispectral imagers, 20D cameras) throughout a large growspace. Not only are the sensors themselves costly to purchase and maintain, but they often require electrical connectivity, calibration, high bandwidth network connections, and other fixed infrastructure to be effective. Furthermore, the quality of the data these sensors produce can be affected by differences in environmental factors in the growspace (e.g. differences in lighting) making it difficult to compare readings from sensors located in different locations.

Figure 24C:
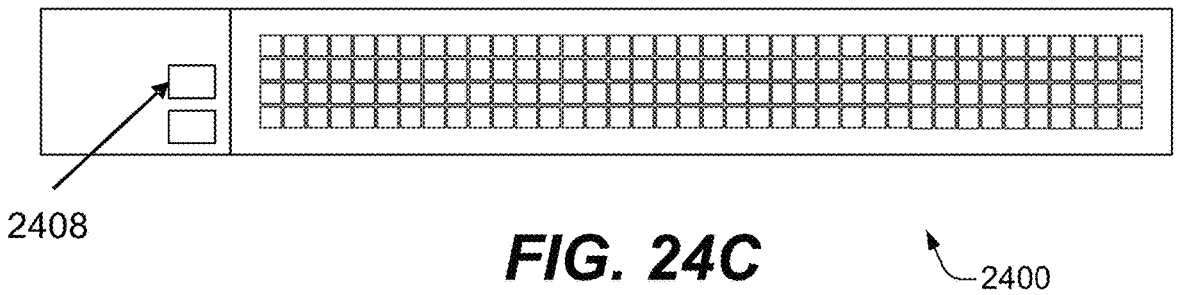

FIG. 24C presents an embodiment of system 2400 that solves this problem by moving plants in growing trays 2202 to a central sensing station 2408 with mobile robots 2002. This sensing station 2408 can control environmental factors like lighting and ensure all data is collected in a uniform environment with a consistent suite of sensors. Centralizing sensing also reduces the cost of sensing for a growspace as less instances of a given sensor are required.

In some embodiments, for some high frequency sensing tasks, bringing growing trays 2202 to a central sensing station 2408 may be prohibitively expensive in terms of the time it takes a mobile robot 2002 to accomplish the transportation. For such tasks, it may be desirable to sense directly in growspace 210 instead of at central sensing station 2408. However, it may also be desirable to avoid the cost and complexity that comes with deploying a wide range of sensors throughout growspace 210 to ensure adequate coverage.

Figure 25:
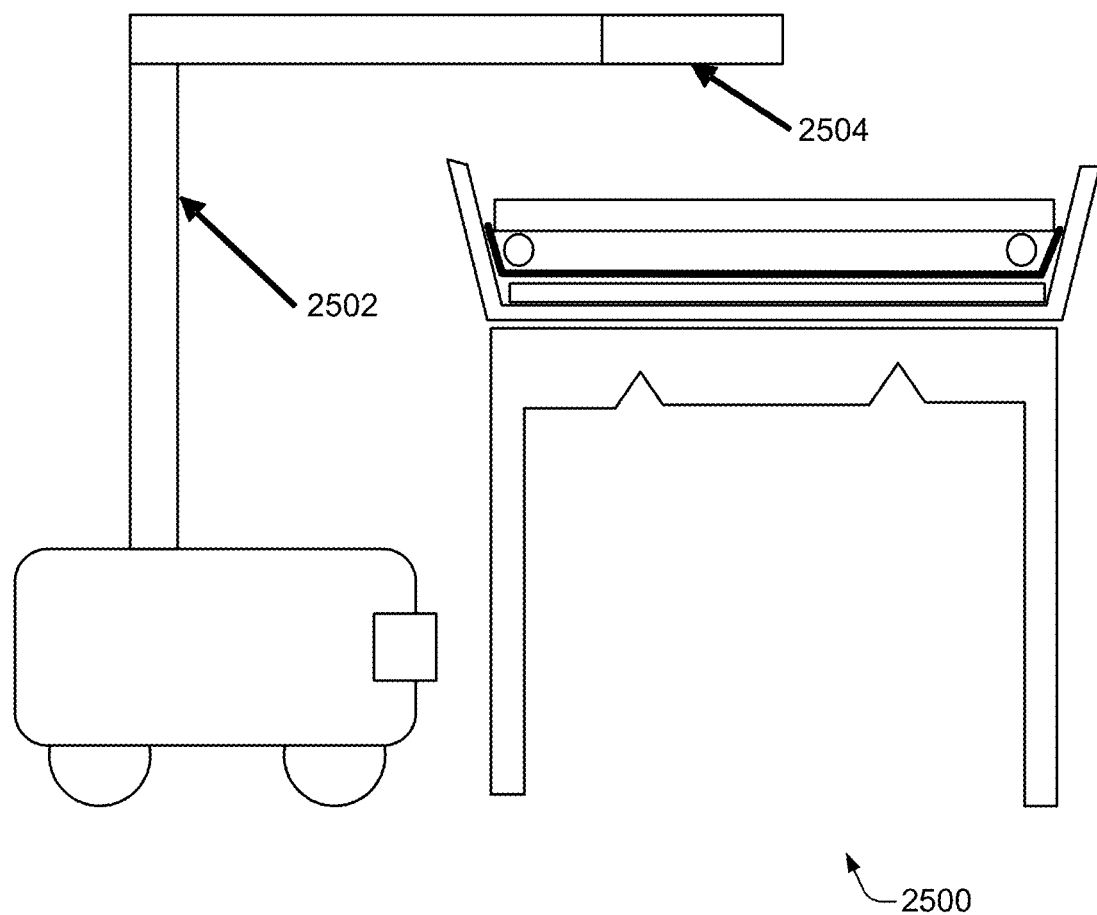
FIG. 25 illustrates an example grow system with robot centric sensing, in accordance with embodiments of the present disclosure.

FIG. 25 presents an example grow system with robot centric sensing. System 2500 includes a sensor fixture 2502 attached to a mobile robot 2002 that navigates a growspace 210 filled with growing trays 2202. As mobile robot 2002 drives through growspace 210, it captures data of growing trays 2202 with a sensor suite 2504 mounted to sensor fixture 2506. This allows mobile robot 2002 to collect large scale data without having to move any growing trays 2202, thereby greatly reducing the time required for collection as compared to a central sensing approach. This embodiment maintains the advantage of requiring a much smaller number of sensors as compared to growspace wide sensor deployments and allows for optimal control and placement of sensor suite 2504 relative to a growing tray 2202.

According to various embodiments, most growspaces use pipes to move nutrient water from one place to another. However, pipes can be expensive to install and maintain and they are relatively inflexible. Moreover, when wishing to deliver many types of nutrient mixes to different areas of growspace 210, a dedicated pipe to each area of growspace 210 is required, dramatically increasing the number of pipes required. The low water requirements for hydroponics allows for piping to be drastically reduced or even eliminated by transporting water with mobile robots 2002.

Figure 26A:
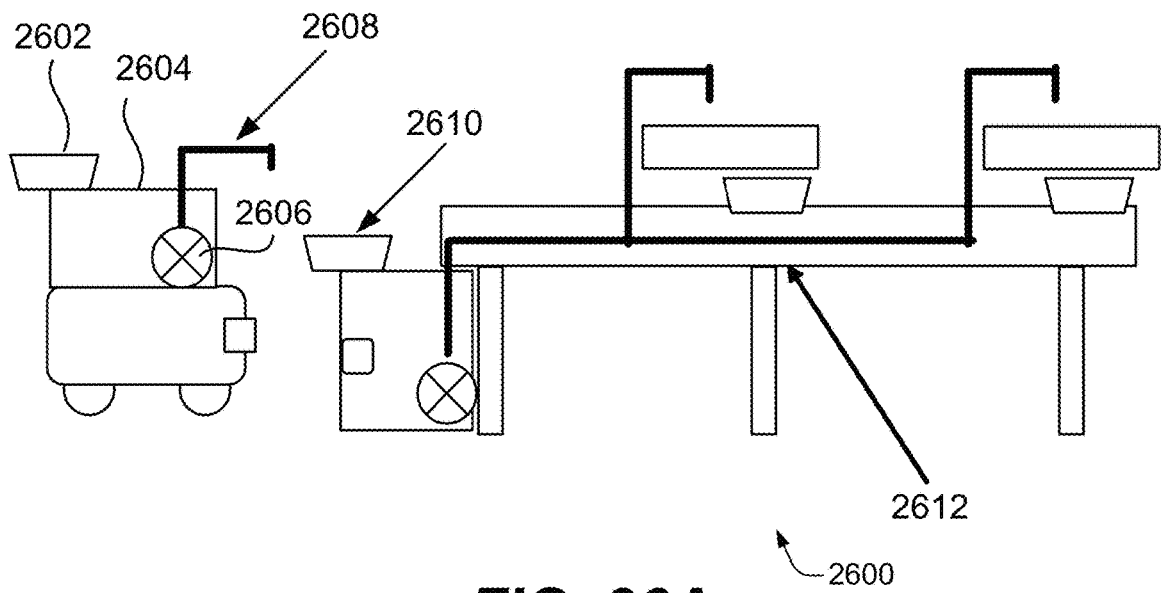
FIGS. 26A-26B illustrate examples of a grow system with mobile robot watering, in accordance with embodiments of the present disclosure.

FIGS. 26A-9B illustrate examples of a grow system with mobile robot watering. FIG. 26A presents an embodiment of a system 2600 that uses mobile robots 2002 to deliver nutrient water to docks 2612 of local plumbing systems connected to growing trays 2202. System 2600 eliminates the need for growspace wide piping systems and instead places a robot reservoir 2604 on mobile robot 2002 that holds nutrient water during transport throughout the growspace. The nutrient water comes into robot reservoir 2604 via the robot inflow 2602. Mobile robot 2002 drives to a desired dock 2612 and uses robot pump 2606 to move water out of robot outflow 2608 and into dock inflow 2610. This system is flexible enough to deliver different nutrient mixes to each dock 2612 within a growspace and drastically reduces the amount of plumbing required in a growspace.

Figure 26B:
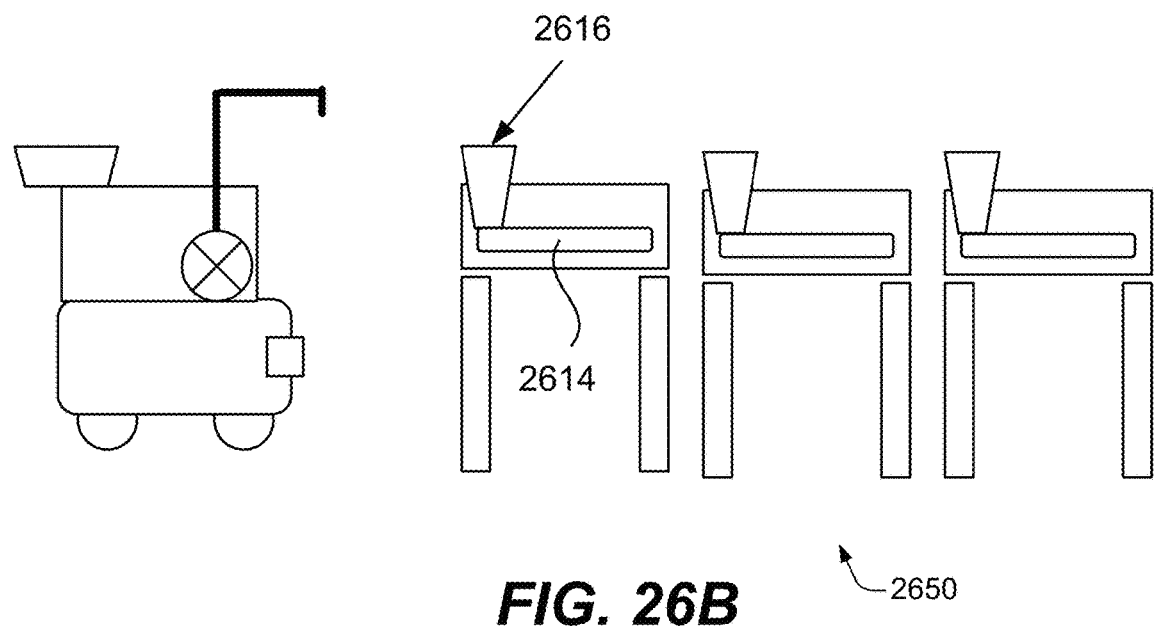

According to various embodiments, tt may be desirable to go even further in the elimination of plumbing and to do away with the concept of even a dock 2612 altogether. FIG. 26B presents an example system 2650 in which mobile robot 2002 delivers nutrient water to growing trays 2202 directly. In system 2650, each growing tray 2202 has a growing tray reservoir 2614 that stores nutrient water for the tray. A mobile robot 2002 can navigate to a given growing tray 2202 and use robot pump 2606 to move water into growing tray inflow 2616. In some embodiments, system 2650 eliminates all plumbing in a growspace which greatly reduces cost and complexity of deployment and operation.

According to various embodiments, one regular though often overlooked component of operating a growspace is a cleaning process. Cleaning reduces the risk of pests and contamination of products and is required by many regulators in order to be certified to operate a growspace. Today, cleaning is also a highly manual operation where human operators hose down and sweep the growspace periodically. This makes it an expensive, time consuming, and error prone process.

Figure 27:
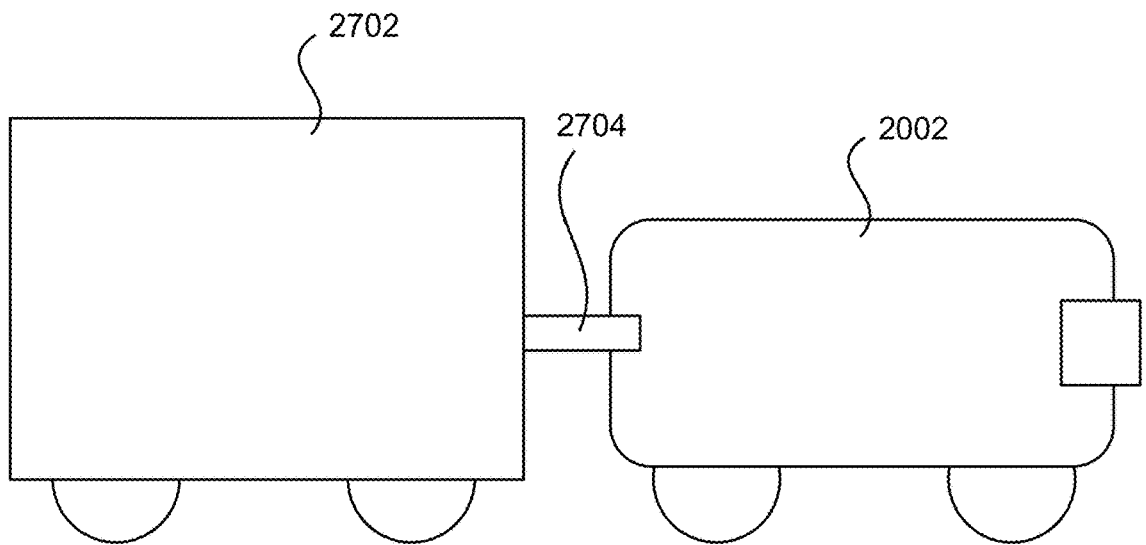
FIG. 27 illustrates an example of a mobile robot configured to clean a growspace, in accordance with embodiments of the present disclosure.

FIG. 27 illustrates an example of a mobile robot configured to clean a growspace. A cleaning attachment 2702 is connected to mobile robot 2002 via an attachment hitch 2704 and towed throughout the growspace cleaning as it goes. This removes the need for human labor to be involved in the cleaning process and allows for strong guarantees to be made about the quality of cleaning that is done. By reducing the cost of cleaning, it also makes it possible to clean a growspace more often thereby improving the effectiveness of the process and reducing risk of pests or contamination.

Figure 28:
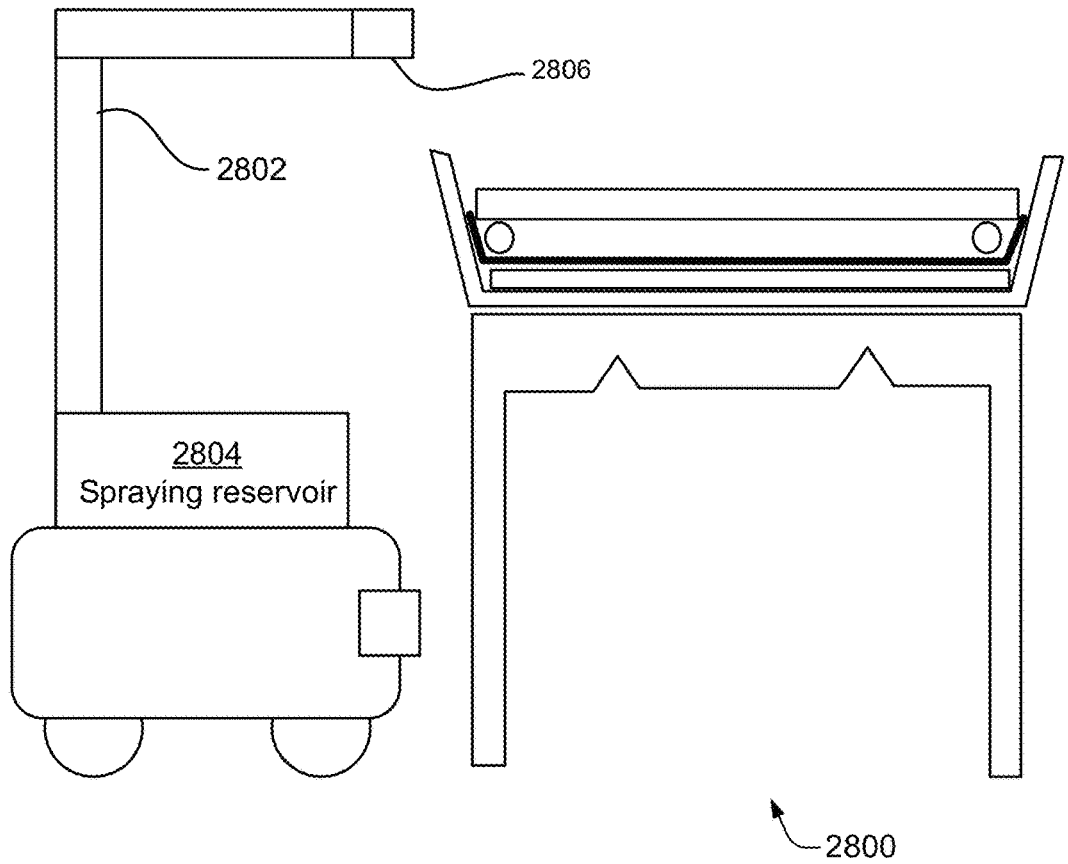
FIG. 28 illustrates an example of a mobile robot configured to perform spray operations in a growspace, in accordance with embodiments of the present disclosure.

FIG. 24B described solutions for pest control that bring growing trays 2202 to a central pest control area 2406 to avoid having to spray the entire growspace 210 with a fogging system or have humans engage in more targeted operations. In some situations where a large percentage of the growspace requires treatment, it may be prohibitive to bring all growing trays 2202 to a central area from a robot time perspective. FIG. 28 illustrates an example of a mobile robot configured to perform spray operations in a growspace.

FIG. 28 presents an embodiment of the present disclosure that allows for mobile robots 2002 to perform pest control or other spraying operations in growspace 210 in an automated fashion that is efficient and requires no human input. System 2800 adds a spraying fixture 2802 to the robot along with a spraying reservoir 2804. As mobile robot 2002 drives through growspace 210, the sprayer 2806 can pull from the spraying reservoir 2804 to spray a desired substance at a particular location. This mechanism can be used to do targeted, growing tray 2202 level deployment of pesticides, $CO_2$, or other materials without requiring transport of growing trays 2202 to a central location.

Increasingly, data and automation are becoming important components for controlled environment agriculture (CEA) grow spaces, biotech facilities, warehouses, data centers, test spaces for experiments, and other control spaces. However, current control space architectures and their associated control systems make it difficult to introduce variability in environmental conditions that lead to a sufficiently rich understanding of how such conditions impact production conditions. This limitation leads to data pipelines that lack information richness and that are challenging to use with modern machine learning tools which require large amounts of labeled, rich, data to function. Furthermore, control space automation and control systems are frequently designed and employed independently from control space sensing which hampers the efficiency of collection.

Figure 29:
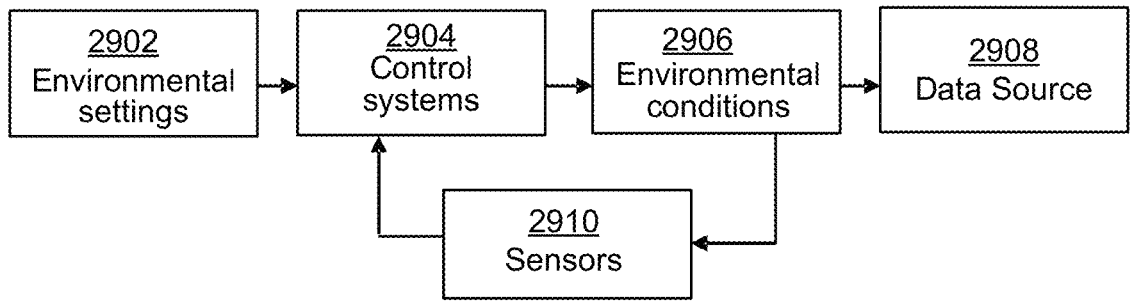
FIG. 29 illustrates a simple diagram showing one example of a typical control space pipeline, in accordance with embodiments of the present disclosure.

FIG. 29 illustrates a simple diagram showing one example of a typical control space pipeline. In FIG. 29, desired environmental settings 2902 are passed to control systems 2904 which use sensors 2910 to attempt to achieve a set of observed environmental conditions 2906 for data sources 2908. The goal of such control pipelines is to ensure that every data source 2908 in the control space experiences environmental conditions 2906 that are as uniform and have as little variability as possible. While this achieves consistent production, it makes it hard to determine whether the environmental settings in use are optimal. Any experiments with environmental settings 2902 become high risk as they impact production of the entire control space. In addition, cycle times are long, as only one experiment can be run at a time. To combat this, control space operators of today often build separate facilities for experimentation or look to findings from scientific/research institutions. However, the scale of these operations leads to insufficient data volume and the pace of innovation is slow. Allowing for more variability in control space operation at scale to provide modern machine learning tools with the data volume and richness they require can greatly increase the speed of innovation in the CEA, biotech, warehousing, data center, and other related spaces which employ environmental controls and sensors.

Figure 30:
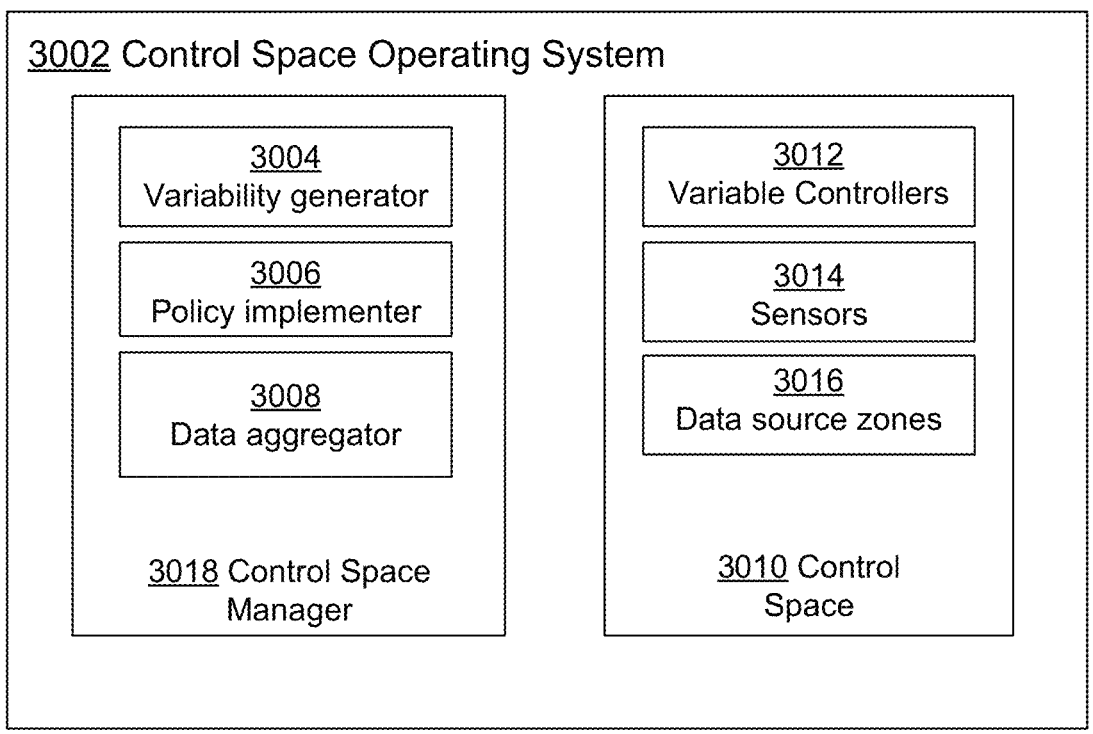
FIG. 30 illustrates a block diagram showing one example of a control space operating system, in accordance with embodiments of the present disclosure.

FIG. 30 presents a control space operating system 3002, where the core components of a control space are designed to work together to allow for flexible and effective data collection, aggregation, and processing and to capture variable, rich, and voluminous data. In system 3002, a data source 3016 is produced in a control space 3010 outfitted with variable controllers 3012 that allow influence over the environment, and sensors 3014 capable of measuring current environmental conditions, as well as the status of data source 3016. Control space 3010 is paired with a control space manager 3018, which is the mechanism by which sufficient data volume, data richness, and policy control are achieved to support advanced machine learning techniques including the training and use of neural networks in control space operations. One example of a control space is a growspace for CEA. In other examples, the control space is a test space or experimental space used to run tests or experiments. In yet other examples, the control space is a data center, biotech production facility or warehouse.

According to various embodiments, in order to ensure data richness and volume, control space manager 3018 employs a variability generator 3004 that works in conjunction with variable controllers 3012 that are specifically designed to have the ability to introduce variability in environmental conditions that data source zones 3016 experience across the control space 3010. In some embodiments, each data source zone 3016 is configured to hold one or more data sources. In some embodiments, this data source is plants. In some embodiments, data sources are bacterial or other biological material. In some embodiments, data sources are servers. In some embodiments, data sources are any type of experimental subjects. In some embodiments, data sources are hardware that must operate under different conditions.

In some embodiments, variability generator 3004 modifies variable controller 3012 settings to run many parallel experiments across control space 3010 to determine how data source production is impacted by environmental parameters. In some embodiments, these parameters include temperature, light, humidity, nutrients, oxygen, carbon dioxide, genetics, etc. In some embodiments, each experiment is tracked by sensors 3014 in control space 3010 and evaluated by data aggregator 3008, which uses machine learning to build a detailed understanding of data source production based on the factors listed above.

According to various embodiments, insights from data aggregator 3008 give policy implementer 3006 information that can be used to implement or generate new policies. These new policies determine variable settings for data source zones 3016 that optimize for volume, production cost, variability, or other desired outcomes for production in control space 3010. In some embodiments, these settings determine starting points for control space 3010 configuration, variable controllers 3012, and data source configurations that are passed to variability generator 3004 to refine its exploration of the parameter space on promising areas.

According to various embodiments, the work of control space manager 3018 components creates a strong feedback loop wherein large amounts of distinct data points or experiments on data source production are generated in parallel. In some embodiments, this data is used to build a detailed understanding of how data source production is impacted by variable settings. In some embodiments, that understanding is used to predict promising policy settings for variables according to a desired optimization criteria. In addition, these predictions are used and perturbed to generate more data focused on an encouraging area of the variable search space. In some embodiments, this feedback loop is the mechanism by which improvements to control space performance can be greatly accelerated compared to approaches employed today.

Figure 31:
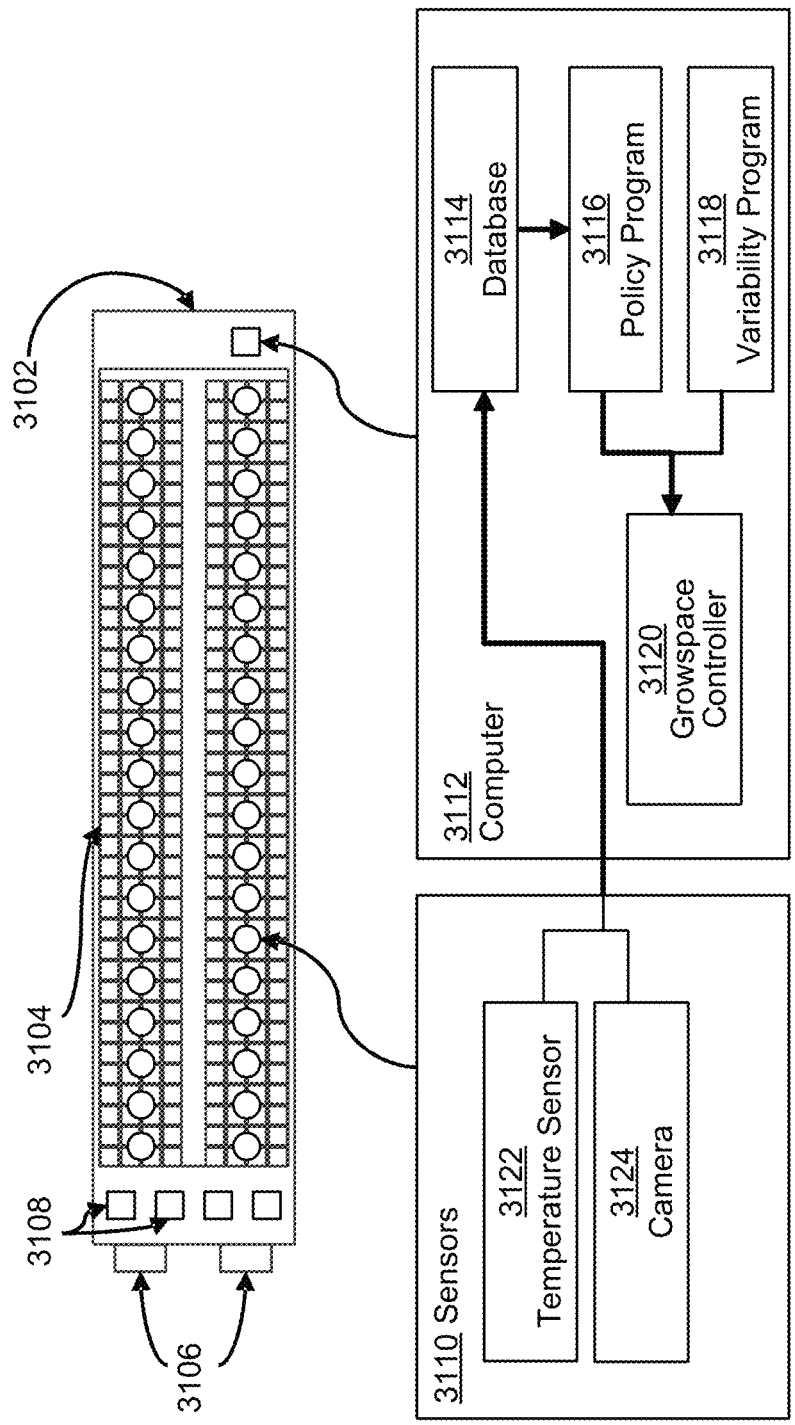
FIG. 31 illustrates an example control space implemented as a growspace, in accordance with embodiments of the present disclosure.

A specific implementation of the general system described above, is shown in FIG. 31. FIG. 31 illustrates an example control space implemented as a growspace 3102. In other words, the control space is embodied by a growspace for plant production in controlled environment agriculture (CEA). In FIG. 31, a growspace 3102 is equipped with fans 3106 and heaters 3108 that can be used to modify the temperature in which plants 3104 are grown.

According to various embodiments, when cooling is desired, fans 3106 move cool air from outside growspace 3102 through the structure creating a temperature gradient where air is cooler closer to the fan side of growspace 3102 compared to the opposite side of growspace 3102. The slope of this gradient (e.g. the difference between the temperature close to and opposite the fans) is determined by the speed at which fans 3106 move air through growspace 3102. When fans 3106 move air slowly, there is more opportunity for radiant energy (e.g. from the sun) to heat air as it moves through growspace 3102, leading to a larger temperature gradient across growspace 3102. When the fans move air quickly, there is less opportunity for air to heat up leading to a smaller temperature gradient across growspace 3102. As such, variability generator 204 can introduce more or less variability in temperature by changing the speed of fans 3106.

According to various embodiments, when heating is desired, heaters 3108 move hot air created by burning natural gas, propane, or other means through growspace 3102. The temperature gradient of air across growspace 3102 is, once again, impacted by the speed at which heaters 3108 output air. If the heaters output air slowly, there is more time for air to lose heat as it moves from the heater side of growspace 3102 to the opposite side, leading to a larger temperature gradient. If the heaters output air quickly, there is less time for air to lose heat as it moves from one side of growspace 3102 to the other leading to a smaller temperature gradient.

According to various embodiments, sensors 3110 placed amongst the plants 3104 are spread throughout the growspace and monitor observed conditions for an area of growspace 3102, while logging their readings to a computer or group of computers 3112, which may be located on site or remotely. In some embodiments, these sensor readings are then sent to database 3114 where they are stored for later processing. In some embodiments, temperature sensors 3122 are used to record the temperature that plants 3104 experience in their region of growspace 3102, while cameras 3124 are used to collect imagery of plant growth over time.

According to various embodiments, once data on a full growth cycle, from seeding to harvest, is collected for a plant 3104, policy program 3116 pulls associated data from database 3114 for processing. Policy program 3116 computes growth curves for plants from imagery taken by camera 3124 and associates this with data from temperature sensor 3122. Policy program 3116 repeats this process for growth cycles of all plants 3104 that have been grown to the current point and compares results, optionally with human input, to determine temperature settings for growspace 3102 that are likely to optimize plant growth.

According to various embodiments, these temperature settings are output from policy program 3116 and passed to growspace controller 3120 which is responsible for controlling fans 3106 and heaters 3108 within growspace 3102 to achieve desired environmental conditions. In addition to these settings, growspace controller 3120 also takes input from a variability program 3118 that outputs a desired variability in temperature range for growspace 3102 (e.g., it requests a 38 degree difference from one side of the growspace to another). In some embodiments, separating policy generation and implementation and desired experimental variability into two separate components is the mechanism by which learning rates in a growspace are greatly accelerated compared to current approaches. Specifically, this decoupling explicitly pursues the variability required for neural networks to effectively explore the impact of environment on plant performance. Traditional growspaces may concern themselves with policy implementation, but not in ensuring the data they generate in production is compatible and effective with modern machine learning techniques. As such, they often lack sufficient data richness and variability for these techniques to be effective.

According to various embodiments, growspace controller 3120 combines the temperature settings specified by policy program 3116 with the desired variability expressed by variability program 3118 to determine the speed at which to run fans 3106 for cooling or heaters 3108 for heating. As described above, the air speed of fans 3106 or heaters 3108 will determine the range of temperatures that plants 3104 will experience in a growspace 3102 centered around the base temperature settings requested by policy program 3116.

According to various embodiments, as the number of growth cycles for plants 3104 increases, the system allows policy program 3116 to receive data from sensors 3110 that contains enough variability (as tuned with variability program 3118) to continuously improve an understanding of plant growth as it relates to temperature. This represents a large increase in data richness as compared to industry operations today, and leads to more rapid learning, insights, and tuning of a growspace 3102.

According to various embodiments, in addition to temperature, humidity plays an important role in plant growth. The example system presented in FIG. 31 does not provide a mechanism to control humidity within a growspace and typical growspace humidity controls suffer from the same problems of traditional temperature controls in that they do not optimize for variability and data richness. Thus, it may be desirable to expand the system presented in FIG. 31 such that it is also capable of providing humidity control that can be varied over the growspace to facilitate experimentation and learning via data pipelines.

Figure 32:
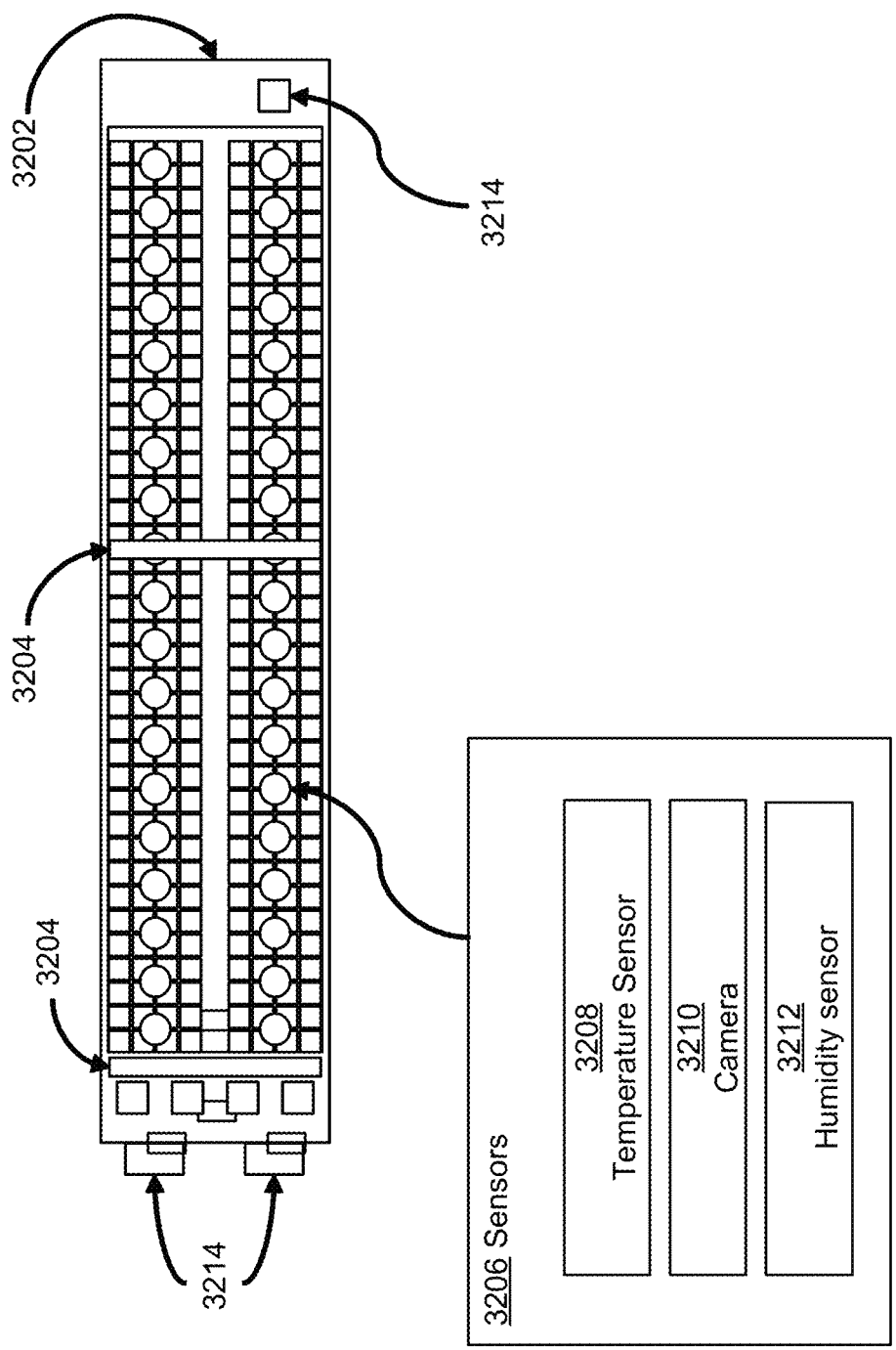
FIG. 32 illustrates an example of a control space with variable humidity control, in accordance with embodiments of the present disclosure.

FIG. 32 presents a system configuration that adds evaporative foggers 3204 to growspace 3202 which add humidity to the air. In some embodiments, the mechanism used to achieve this in FIG. 32 is to spray water at high pressures into the air with evaporative foggers 3204 creating a fine mist that quickly evaporates in the presence of heat. The phase transition from water into water vapor is an endothermic process that increases the humidity of the air while also cooling it. In some embodiments, to control variability of humidity across growspace 3202, the fans' speeds can be used once again to determine how quickly water vapor moves from one side of the growspace to the other. A higher fan speed will decrease the differences in humidity from one side of the growspace to the opposite. A lower fan speed will lead to an increased gradient and associated difference.

According to various embodiments, in addition to evaporative foggers 3204, the system configuration presented here also adds a humidity sensor 3212 in addition to temperature sensor 3208 and camera 3210. In some embodiments, humidity sensors 3212 spread throughout growspace 3202 take localized readings of humidity that are used to report observed conditions to computer 3214. This additional data can then be taken into account by policy program 3116 and variability program 3118 as they determine desired environmental settings and build a detailed understanding of how humidity and temperature impact plant growth. In some embodiments, growspace controller 3120 is also updated to allow control of evaporative foggers 3204 in conjunction with fans 3214 so that it can achieve desired settings for humidity and temperature across growspace 3202 in accordance with the request of the variability and policy programs.

According to various embodiments, light is another important parameter that impacts plant growth within a growspace. In some growspace configurations, e.g., greenhouses, light enters the growspace naturally in the form of sunlight. While this provides a natural energy source for plant growth which can be economically beneficial, it can also be something that is necessary to reduce. For example, there are situations where plants receive too much light. In some embodiments, the system can control the reduction of light within a growspace in a fashion that also allows variability and richness of data across the growspace.

Figure 33:
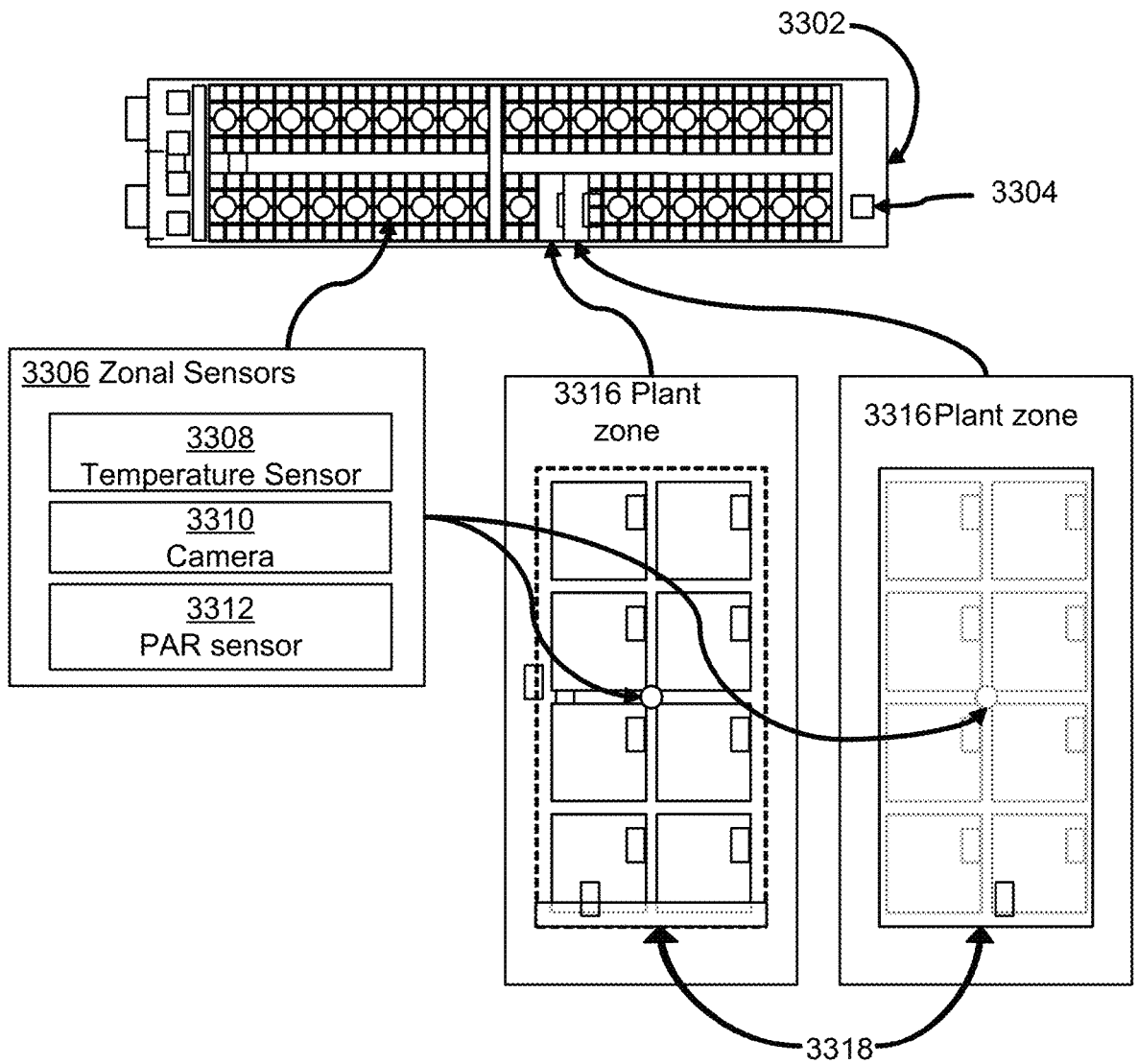
FIG. 33 illustrates an example of a control space with light blocking, in accordance with embodiments of the present disclosure.

FIG. 33 presents an embodiment of the system that allows for light to be blocked within growspace 3302 in a way that supports variation from location to location and which can be used to further data richness. To achieve this, growspace 3302 is separated into distinct plant zones 3316 which contain groups for plants that will experience similar environmental conditions. The greater the number of plant zones 3316 in a growspace, the more variability that can be achieved in the footprint. Each plant zone 3318 has its own zonal sensors 3306 to measure observed conditions. Specifically, each zone has a temperature sensor 3308, camera 3310, and a photosynthetically active radiation (PAR) sensor 3312. PAR sensor 3312 measures photosynthetic light levels in the air and is used to understand how much light plants in a plant zone 3316 have received over time.

According to various embodiments, when it is desirable to remove light from a plant zone 3316 in accordance with a control policy produced by the components running on computer 3304 as described in previous embodiments, zonal shades 3318 installed in each plant zone 3316 can be automatically extended or retracted. Zonal shades 3318 block a percentage of light that enters plant zone 3316 by blocking it with shade cloth thereby decreasing the amount of light received by plants in the plant zone. As each zonal shade 3318 is controlled separately from others in growspace 3302, they provide a mechanism by which light levels can be changed in one plant zone 3316 independent from any other. This, in turn, provides a mechanism for variability program 3118, described in FIG. 31 above, to ensure sufficient data richness from light removal across growspace 3302 when the sun provides light input to growspace 3302.

According to various embodiments, data from the PAR 3312 sensor is fed to computer 3304 in addition to the other zonal sensors 3306 to which allows policy program 3116 to build a model of how temperature and light impact plant growth, which can be used to further improve growspace performance.

According to various embodiments, in certain growspaces where the sun is not present or the amount of sunlight in a day is not sufficient for growth, it is desirable to be able to add light into the growspace.

Figure 34:
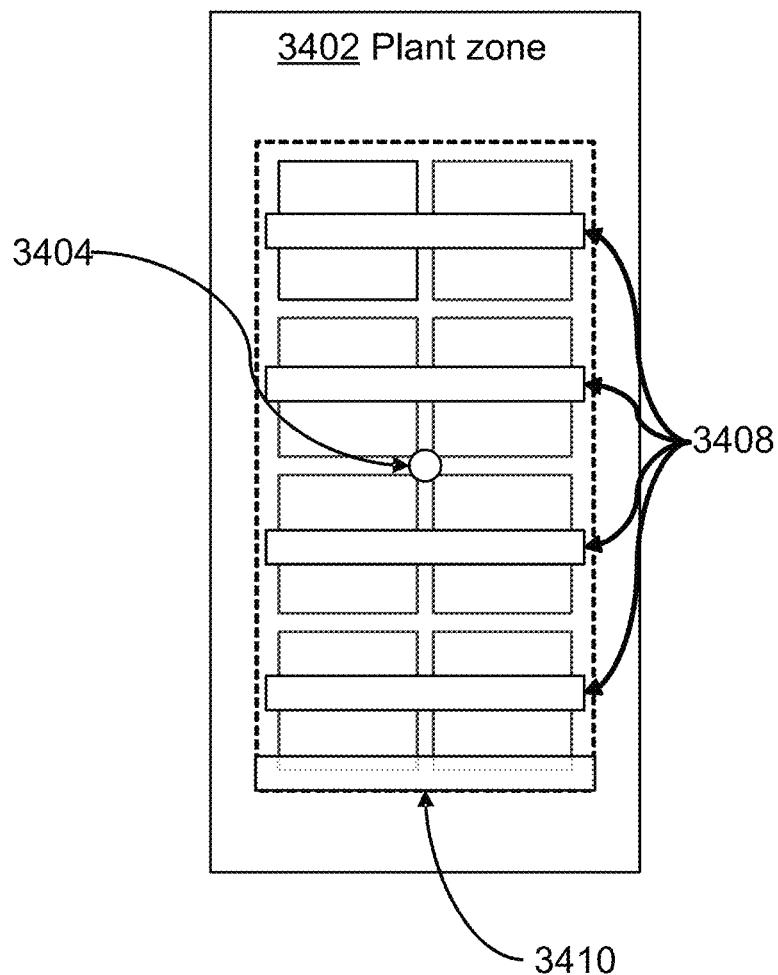
FIG. 34 illustrates an example of a control space with light addition, in accordance with embodiments of the present disclosure.

FIG. 34 presents an embodiment of the system that adds zonal LEDs 3408 to each plant zone 3402 as a mechanism to add light to a growspace. Each zonal LED 3408 can be controlled separately from zonal LEDs 3408 in other plant zones 3402 which allows for variability and data richness across the growspace. PAR sensor 3312 described in FIG. 33 above is also sufficient to monitor and manage control of zonal LEDs 3408 and the combination of zonal shades 3410 with zonal LEDs 3408 allows for full control over the lighting conditions within a growspace. When less light is desired, zonal shades 3410 can be extended. When more light is desired, zonal LEDs 3408 can be turned on.

Carbon dioxide (CO2) is a necessary component for plant growth. There is a naturally occurring amount of CO2 in the atmosphere that is available for plants to take up, but that may not be sufficient to sustain optimal growth. Thus, it may be desirable to develop mechanisms for actively increasing CO2 concentrations in a growspace to achieve optimal performance.

Figure 35:
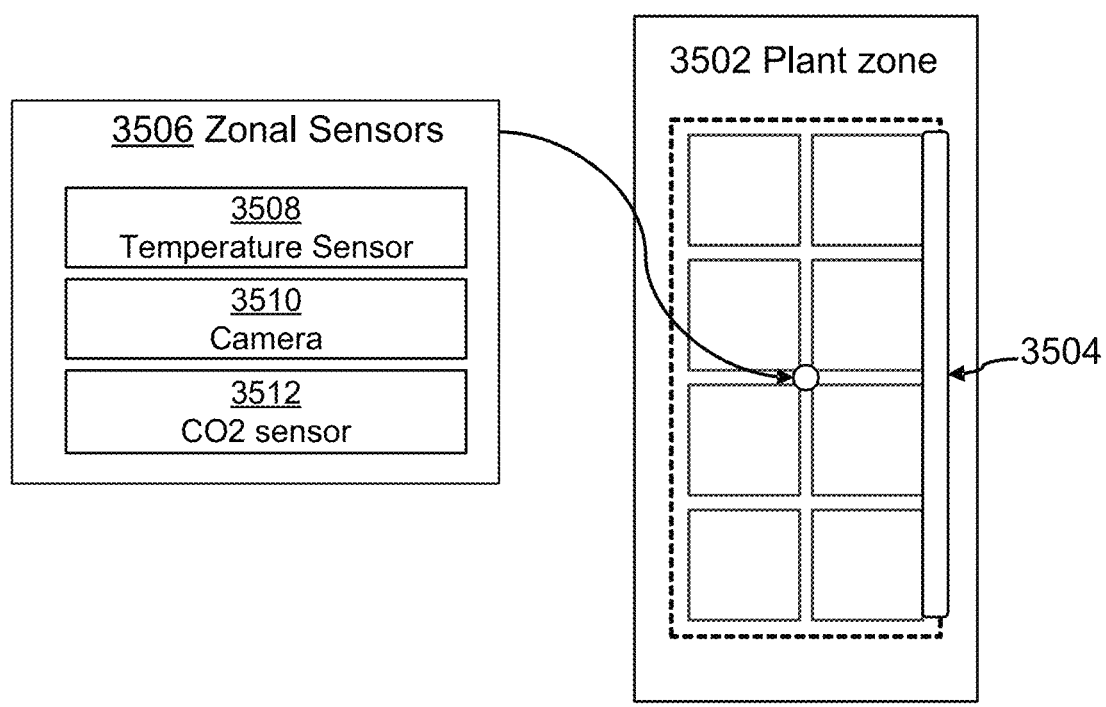
FIG. 35 illustrates an example of a control space with carbon dioxide addition, in accordance with embodiments of the present disclosure.

FIG. 35 presents an embodiment of the system that adds zonal CO2 emitters 3504 to each plant zone 3502. These zonal CO2 emitters distribute carbon dioxide that is stored in compressed form or collected as a bi-product of heating the growspace and release it into the air via nozzles. Each zonal CO2 emitter 3504 is controlled independent from any other in the growspace, which allows for CO2 to be distributed in a targeted fashion per plant zone 3502. To ensure sufficient variability and localized control over CO2 levels, growspace controller 3120 coordinates the use of growspace fans with zonal CO2 emitters. Specifically, zonal CO2 emitters are used only when the fans are off to guarantee that CO2 distributed to a given plant zone 3502 can be absorbed by its associated plants. To measure the amount of CO2 present in a plant zone 3502, a CO2 sensor 3512 is added to a temperature sensor 3508 and camera 3510, which make up the zonal sensors 3506 for that plant zone 3502. This provides yet another input for computer 3304 to use as it builds a detailed understanding of environmental factors and their impact on plant growth.

Nutrition is another important component of plant growth. In current growspace systems, however, it is not possible to vary nutrient mixes given to plants across the growspace as standard hydroponic plumbing systems only allow recirculation of one nutrient mixture at a time across a growspace. To better understand and optimize the impact of nutrition on plant growth, it may be necessary to increase the number of different nutrient mixes that can be deployed to plants throughout the growspace at a given time.

Figure 36:
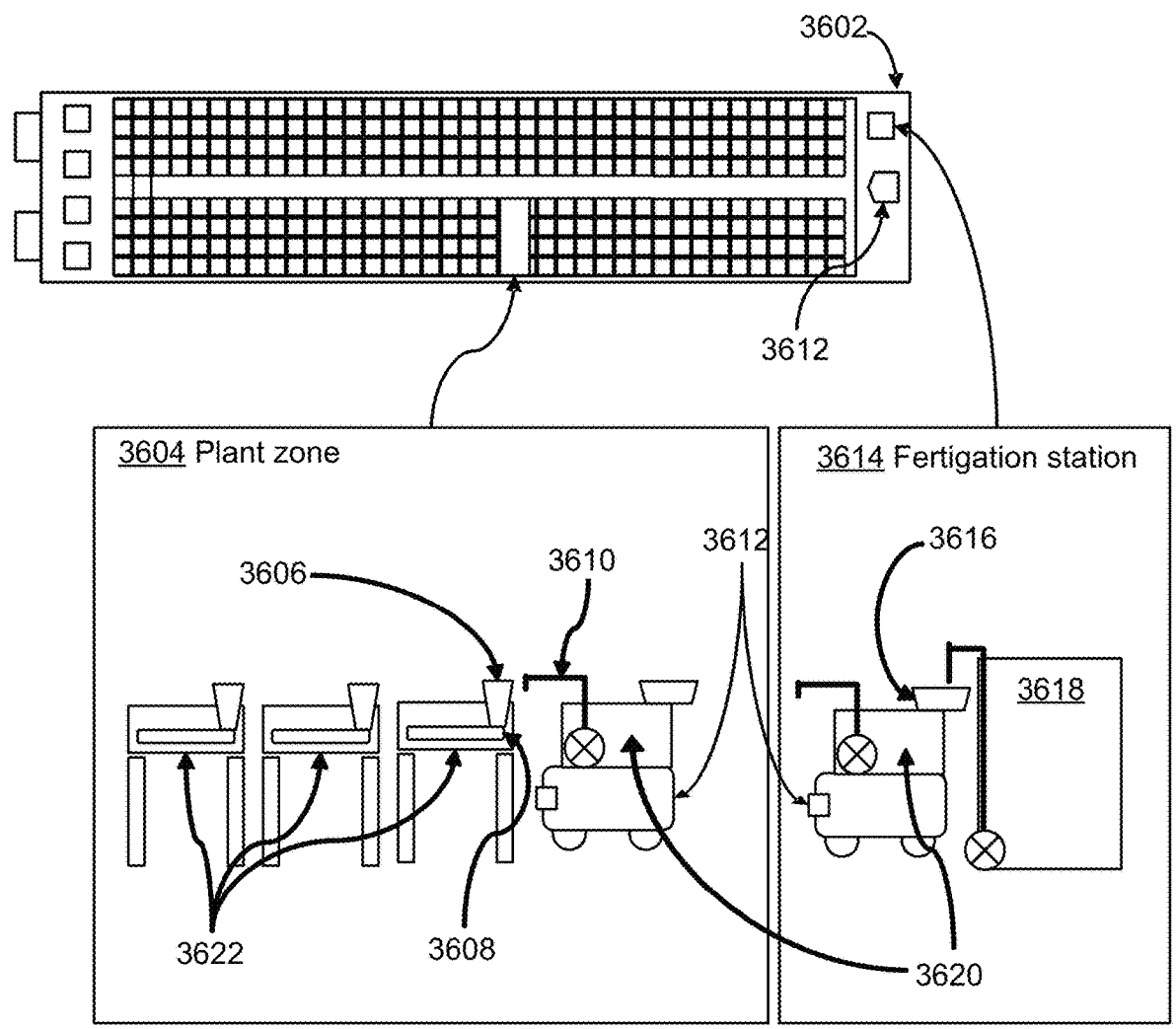
FIG. 36 illustrates an example of a control space with nutrient control, in accordance with embodiments of the present disclosure.

FIG. 36 presents an embodiment of the system that allows for nutrients to be sent to a given plant zone via a robotic plumbing system. Specifically, a robot 3612 is responsible for moving nutrient water created by a fertigation system 3618 within a growspace 3602. Robot 3612, goes to a fertigation station 3614 located in growspace 3602 where fertigation system 3618 pumps nutrient water of a given composition (either pre-mixed or created on demand) into robot inflow 3616 which flows into robot reservoir 3620. With nutrient water now stored for transport, robot 3612 navigates to a given plant zone 3604 within growspace 3602. Each plant zone 3604 contains one or more growing trays 3622 in which plants sit. Each growing tray 3622 has a growing tray reservoir 3608 which provides nutrient water to the plants in that growing tray 3622. When robot 3612 arrives at a given growing tray 3622 in a given plant zone 3604, it pumps water out from robot reservoir 3620 through robot outflow 3610 into growing tray inflow 3606 which feeds growing tray reservoir 3608 for a single growing tray 3622.

According to various embodiments, the ability to move a unique mix of nutrient water from a fertigation system 3618 to any growing tray 3622 in a plant zone 3604 allows nutrients to be tailored to a specific plant zone 3604 or even a single growing tray 3622 within growspace 3602. This greatly increases the level of control and amount of experimentation that can be performed relative to standard hydroponic systems which can only deliver a single nutrient mix per run of plumbing. Achieving such control with traditional plumbing systems is impractical and costly as it requires separate plumbing runs per growing tray 3622 coupled with complex control valves to change the flow of water throughout growspace 3602. Using robot 3612 for nutrient water transport removes the need for plumbing from growspace 3602 altogether while providing a high level of control over what plants receive what nutrients. This allows variability program 3118 and policy program 3116 on computer 3112 to experiment with unique nutrient mixes per growing tray 3622 that also change over time (e.g. a different nutrient mix could be delivered on day 38 of growth as compared to day 39).

The embodiments presented above rely on distributed sensors placed throughout a growspace to record data on environmental conditions as well as plant growth. However, the camera sensors (2D, 31D, multi-spectral, etc.) used to measure plant growth are often expensive and it may be prohibitive to deploy them throughout an entire growspace on cost alone. Furthermore, deploying such sensors through a growspace requires other infrastructure like reliable network connectivity and leads to many different potential points of failure which must be carefully monitored. Therefore, it is desirable to reduce the number of sensors that must be deployed to track plant growth and to perform sensing in a central location.

Figure 37:
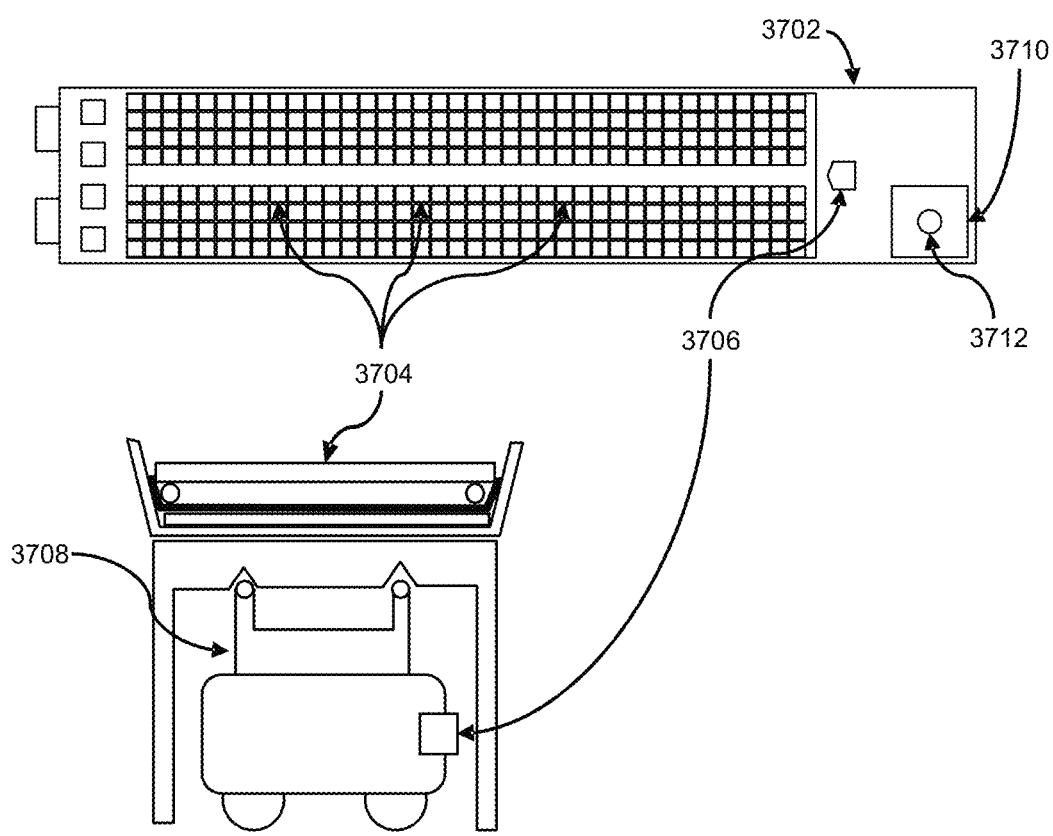
FIG. 37 illustrates an example of a control space with centralized sensing, in accordance with embodiments of the present disclosure.

The example system configuration presented in FIG. 37 facilitates central sensing by transporting growing trays 3704 with plants to a central sensing area 3710 with a robot 3706. To achieve this, robots 3706 are outfitted with robot lifts 3708 that can pick up growing trays 3704 for transport within a growspace 3702. When data on plant growth is desired, robot 3706 moves a selected growing tray 3704 to sensing area 3710 where sensors 3712 (e.g. 2D cameras, 31D cameras, LiDAR, etc.) take measurements of the plants within a growing tray 3704. As all sensing on plant growth happens in sensing area 3710, as opposed to performing sensing out in growspace 3702, the number of expensive sensors required is drastically reduced. Furthermore, sensing area 3710 can be configured to provide the optimal environment for taking sensor readings of plants (e.g. with custom lighting) to ensure uniformity of sensor readings over time.

According to various embodiments, sensing requires either distributed sensors placed throughout the growspace or robot transport of plants in growing trays to a central sensing area. For systems that require distributed sensing, cost and complexity of the sensing system is high. For systems that move plants with robots, many robots are required at large growspace scales to perform sensing tasks as each sensor reading requires moving plants through a growspace for a sensor reading and then transporting them back to their original location. In environments where sensor readings on plant growth are desired frequently, it is desirable to have a sensing configuration that avoids many distributed sensors, but is also time efficient.

Figure 38:
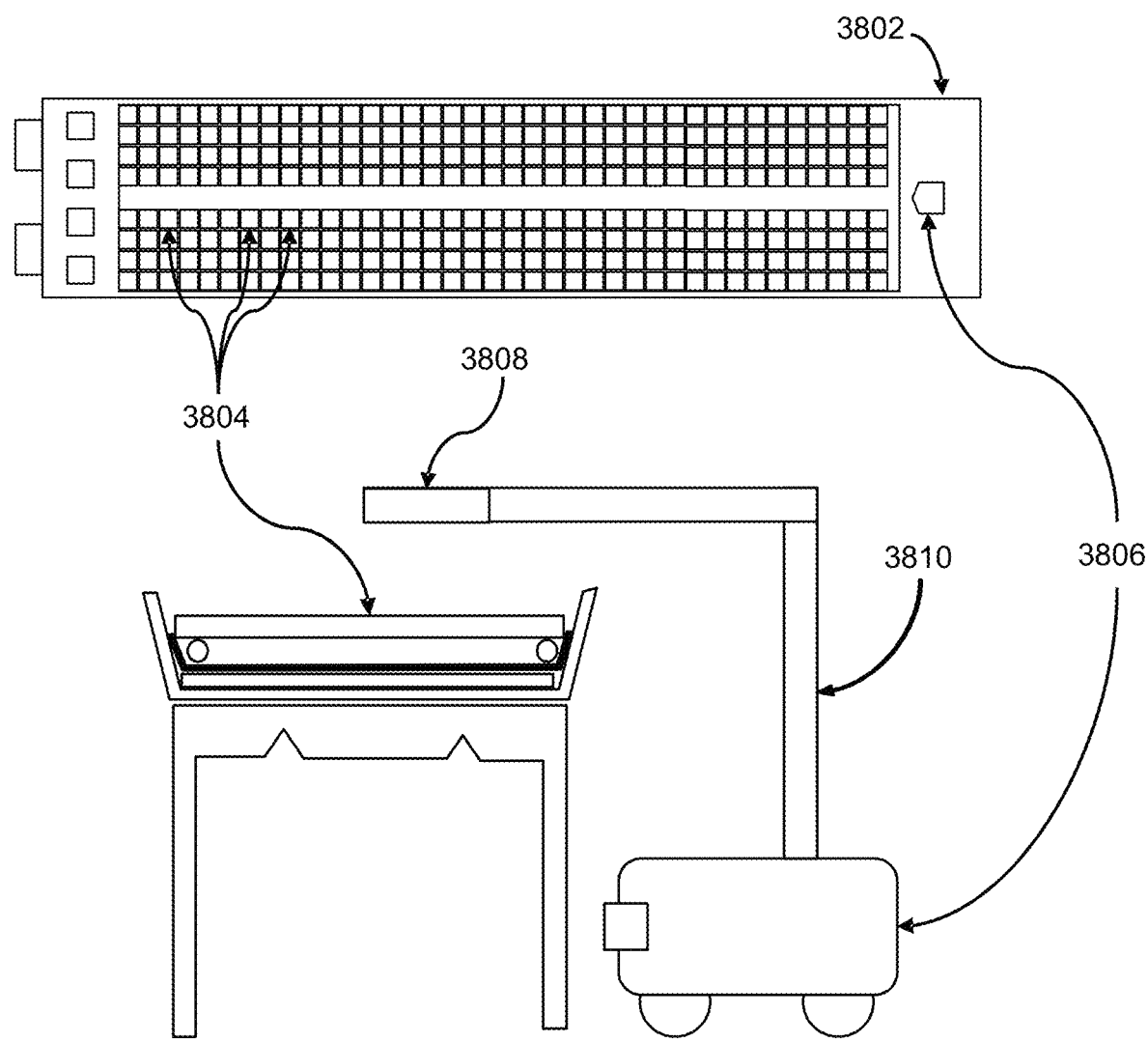
FIG. 38 illustrates an example of a control space with robot based sensing, in accordance with embodiments of the present disclosure.

FIG. 38 presents a system configuration in which a robot 3806 is outfitted with sensors 3808 attached to it via a sensor fixture 3810. Robot 3806 navigates through a growspace 3802 to place its sensors 3808 over growing trays 3804 located throughout the environment. Sensors 3808 then take readings of each growing tray 3804 and store them for processing. This configuration avoids the need for many distributed sensors to be placed in a growspace 3802, while putting them onto a robot instead which allows systems to save on both cost and system complexity. It also removes the need to transport growing trays 3804 directly in order to perform sensing by bringing sensor 3808 to growing trays 3804 via robot 3806 making sensing a time efficient process.

Many growspaces focus on ensuring sufficient variability and richness of environmental data on plants grown within a growspace in order to use the data to optimize production according to a desired criteria, like yield or taste. However, it may also be desirable to optimize for cost, energy, or labor of production where additional data is required to allow for optimal policy selection. Specifically, data on labor costs associated with production must be measured and combined with measured energy costs of growspace controls to determine the cost per unit weight, labor per unit weight, or energy per unit weight of plant produced.

Figure 39:
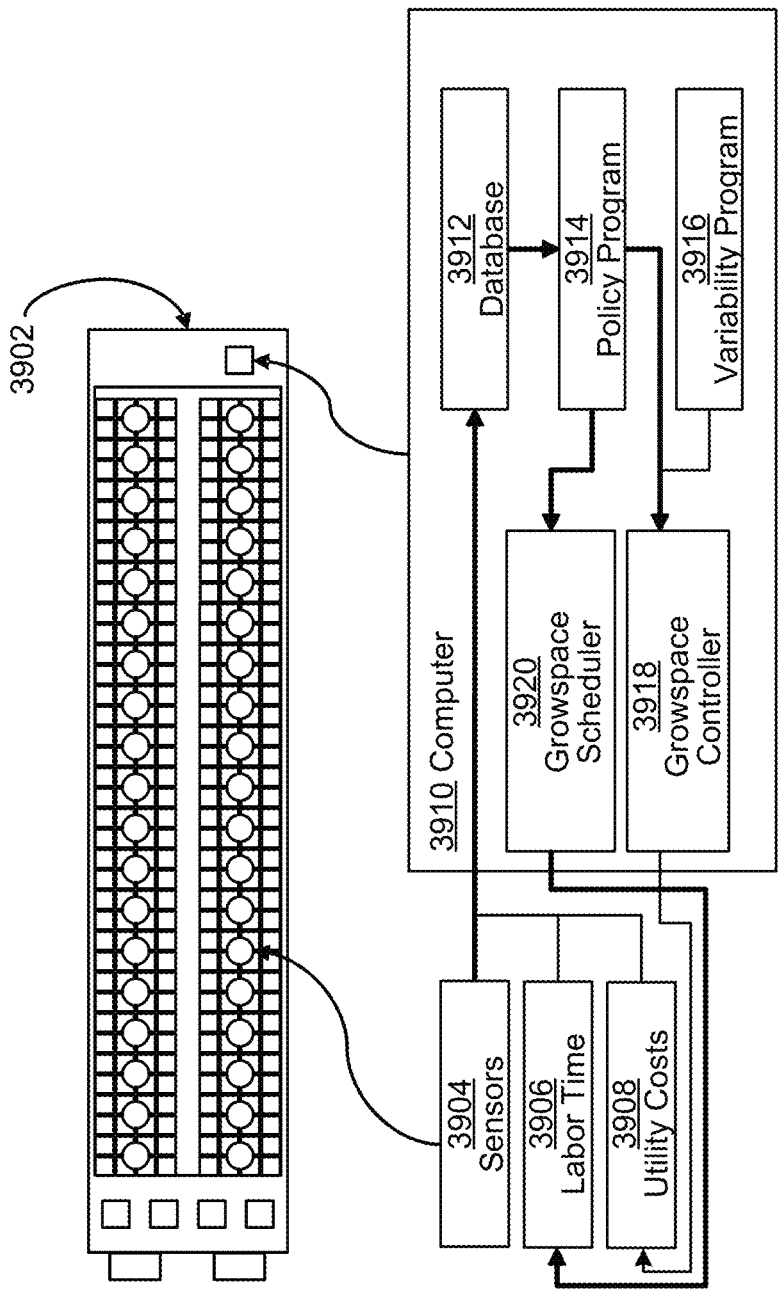
FIG. 39 illustrates an example of a control space with additional factor tracking, in accordance with embodiments of the present disclosure.

FIG. 39 shows an example system that tracks labor time 3906 and utility costs 3908 in addition to data from sensors 3904. These three data signals are fed into a database 3912, which gives policy program 3914, running on computer 3910, vital information about the likely cost of production for a given policy. In some embodiments, to gather data during operations, a growspace scheduler 3920 determines the labor required based on the current policy program 3914 and automatically times all labor operations (automated or human) that occur in growspace 3902 via computer 3910. In addition to this, the actions of growspace controller 3918 are monitored to determine utility costs 3908 of a given policy program 3914 with its associated variability program 3916. Adding labor time 3906 and utility costs 3908 to sensors 3904 deployed throughout growspace 3902 leads to a holistic view of plant production and new options for optimization (cost, energy, and labor) that are not possible in previous embodiments.

According to various embodiments, a policy program is used to optimize a growspace according to a desired optimization criteria. However, it may be desirable to gather data from and optimize multiple growspaces together to create richer and more robust models of operation. Additionally, it may be desirable to have a growspace in one location able to learn from data from growspaces in other locations.

Figure 40:
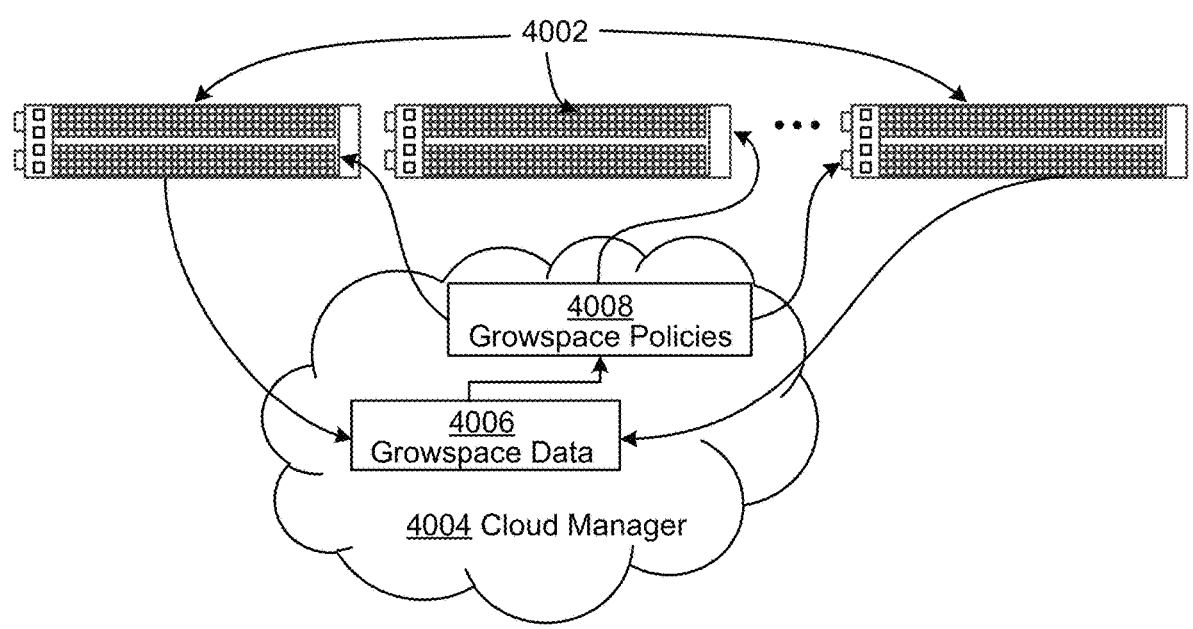
FIG. 40 illustrates an example of a multiple control space operating system, in accordance with embodiments of the present disclosure.

FIG. 40 presents a system configuration that sends growspace data 4006 from one or more growspaces 4002 to a cloud manager 4004 responsible for aggregating data across multiple growspaces 4002. Growspace data 4006 is then used to computer growspace policies 4008 that are passed back to each growspace 4002 for execution. This configuration allows the system to scale to any number of growspaces 4002 where each growspace 4002 also benefits from the data gathered by others in its growspace network.

Figure 41:
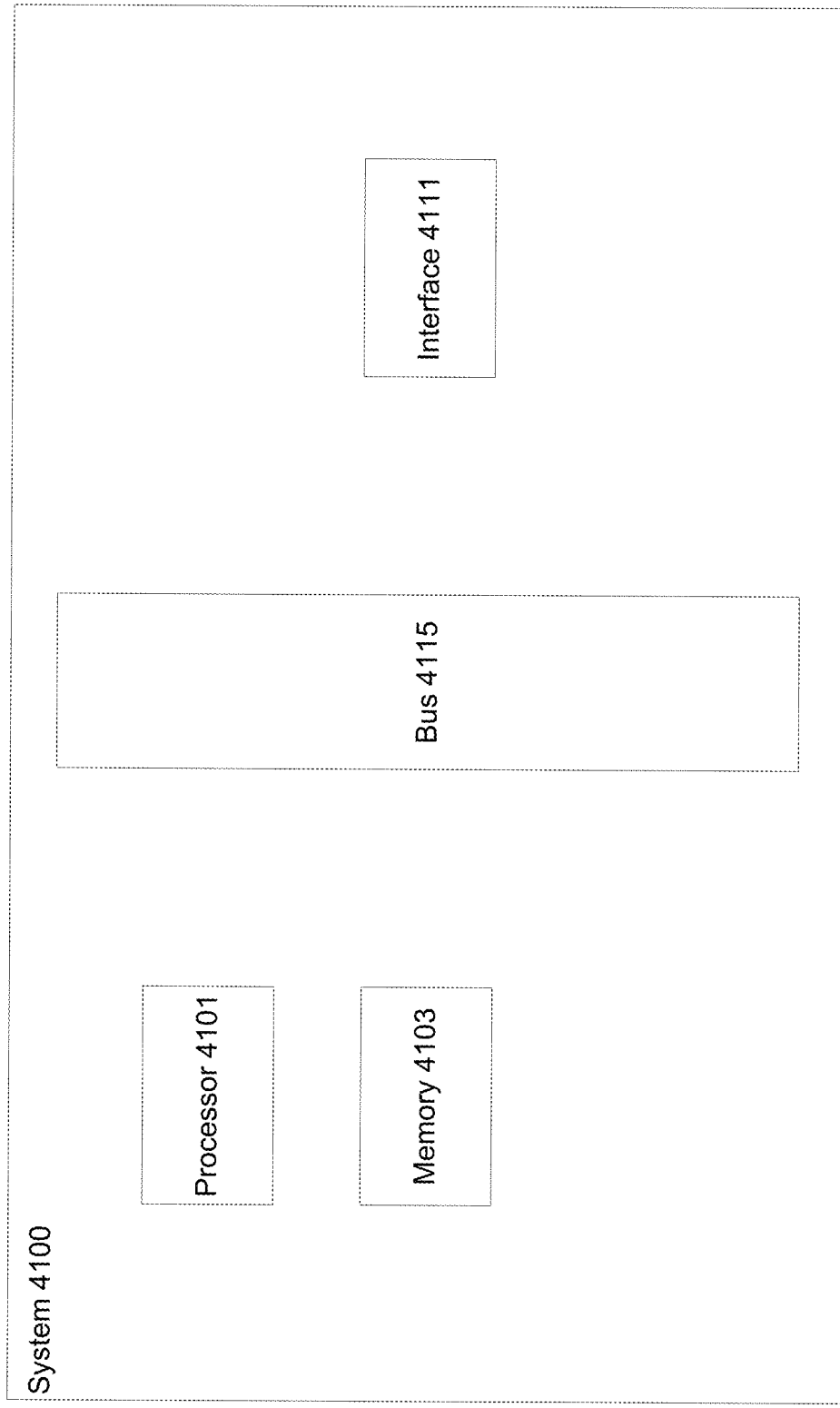
FIG. 41 illustrates an example of a computer system, configured in accordance with one or more embodiments.

The examples described above present various features that utilize a computer system or a robot that includes a computer. However, embodiments of the present disclosure can include all of, or various combinations of, each of the features described above. FIG. 41 illustrates one example of a computer system, in accordance with embodiments of the present disclosure. According to particular embodiments, a system 4100 suitable for implementing particular embodiments of the present disclosure includes a processor 4101, a memory 4103, an interface 4111, and a bus 4115 (e.g., a PCI bus or other interconnection fabric). When acting under the control of appropriate software or firmware, the processor 4101 is responsible for implementing applications such as an operating system kernel, a containerized storage driver, and one or more applications. Various specially configured devices can also be used in place of a processor 4101 or in addition to processor 4101. The interface 4111 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HS SI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 4100 is a computer system configured to run a control space operating system, as shown herein. In some implementations, one or more of the computer components may be virtualized. For example, a physical server may be configured in a localized or cloud environment. The physical server may implement one or more virtual server environments in which the control space operating system is executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A system comprising:
a grow module;
a plumbing infrastructure including:
   a global water source;
   a water transport mechanism; and
   a local buffer configured to create a local water source to be used by the grow module, the local water source being decoupled from the global water source such that cross-contamination of water from the local water source and the global water source is prevented;
a grow space including:
   one or more variable controllers configured for adjusting one or more variables in the grow space;
   one or more sensors for gathering data;
   a data source zone configured to house the grow module; and
      a grow space manager configured to determine degrees of adjustment to the one or more variables for the data source zone;
      wherein the grow space manager is further configured to collect or store data gathered from the one or more sensors; and
a mobile robot configured to perform transport or task automation within the grow space, the mobile robot including:
   one or more sensors;

a mobility mechanism;
a processor; and
memory.

2. The system of claim 1, wherein the grow module includes a water intake mechanism.

3. The system of claim 1, wherein the grow module includes a growing surface.

4. The system of claim 1, wherein the grow module includes a top cover.

5. The system of claim 1, wherein the grow module includes a grow medium.

6. The system of claim 1, wherein the plumbing infrastructure includes a one way water transport mechanism.

7. The system of claim 1, wherein the plumbing infrastructure includes a fertigation system that creates nutrient mixes with a desired nutrient composition on demand.

8. The system recited in claim 1, wherein plumbing infrastructure includes a water transport mechanism using the mobile robot instead of plumbing pipes for transporting water from the global water source to the grow module.

9. The system of claim 1, wherein the plumbing infrastructure is configured to deliver different nutrient mixes to different grow modules in the grow space.

10. The system of claim 1, wherein the grow space manager is further configured to determine an optimal policy for a specified criteria.

11. The system of claim 1, wherein the plumbing infrastructure is further configured to create custom nutrient mixtures.

12. The system of claim 1, wherein the data source zone is configured to allow full control over lighting conditions in the data source zone, independent of other data source zones.

13. The system of claim 1, further comprising a database configured to store labor time, utility cost, and sensor data to feed into a policy program.

14. The system of claim 1, wherein the grow space includes multiple data source zones.

15. The system of claim 1, wherein the mobile robot includes a localization module.

16. The system of claim 1, wherein the mobile robot includes a path planning module.

17. The system of claim 1, wherein the mobile robot includes a motion control module.

18. The system of claim 1, wherein the mobile robot is configured to transport a growing tray around the growspace.

19. The system of claim 1, wherein the mobile robot is configured to capture data from grow trays as the mobile robot navigates around the growspace.

20. The system of claim 1, wherein the mobile robot is configured to perform spray operations in the growspace.

* * * * *